(12) United States Patent  
Morishima et al.

(10) Patent No.: US 6,506,539 B2
(45) Date of Patent: Jan. 14, 2003

(54) DYE COMPLEX AND OPTICAL INFORMATION RECORDING MEDIUM

(75) Inventors: Shinichi Morishima, Kanagawa (JP); Takashi Usami, Tokyo (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 102 days.

(21) Appl. No.: 09/827,359

(22) Filed: Apr. 6, 2001

(65) Prior Publication Data

US 2002/0025491 A1 Feb. 28, 2002

(30) Foreign Application Priority Data

| Apr. 6, 2000 | (JP) | 2000-105103 |
| May 29, 2000 | (JP) | 2000-158842 |
| Aug. 15, 2000 | (JP) | 2000-246405 |
| Aug. 29, 2000 | (JP) | 2000-258729 |
| Jan. 31, 2001 | (JP) | 2001-024006 |
| Mar. 2, 2001 | (JP) | 2001-058778 |

(51) Int. Cl.⁷ ............... G11B 7/24; C07C 50/06; C07C 323/09
(52) U.S. Cl. ............ 430/270.19; 430/270.16; 430/270.21; 430/270.2; 430/945; 428/64.8; 428/913; 552/303; 552/307; 552/309; 552/310; 558/44; 558/55
(58) Field of Search .......... 430/270.19, 270.16, 430/945, 270.2, 270.21; 428/64.8, 913; 552/303, 307, 309, 310; 558/44, 55

(56) References Cited

U.S. PATENT DOCUMENTS

| 3,115,506 A | * | 12/1963 | Acker et al. | 552/303 |
| 3,162,641 A | * | 12/1964 | Acker et al. | 552/303 |
| 3,408,367 A | * | 10/1968 | Andreades | 552/303 |
| 3,687,987 A | * | 8/1972 | Martin | 552/303 |
| 4,758,381 A | * | 7/1988 | Suga et al. | 549/35 |
| 4,950,774 A | * | 8/1990 | Kawabata et al. | 552/303 |
| 5,281,730 A | * | 1/1994 | Zambounis | 552/303 |
| 5,312,714 A | * | 5/1994 | Ogawa | 430/945 |
| 5,574,715 A | * | 11/1996 | Namba et al. | 430/270.19 |
| 5,579,150 A | * | 11/1996 | Cho et al. | 430/270.19 |
| 5,776,656 A | * | 7/1998 | Shinkai et al. | 430/270.19 |
| 5,998,094 A | * | 12/1999 | Ishida et al. | 430/270.19 |
| 6,203,876 B1 | * | 3/2001 | Morishima et al. | 430/945 |
| 6,358,509 B1 | * | 7/2001 | Usami et al. | 430/270.19 |

FOREIGN PATENT DOCUMENTS

| JP | 63-064794 | * | 3/1988 |
| JP | 7-056369 | * | 3/1995 |

OTHER PUBLICATIONS

Vorob'eva et al., "Synthesis of surfactant tetracyanoanthra-quoinodimethanes for conducting langmuir–Blodgett Films", J. Chem. Soc., Perkins. Trans., 2 pp. 1133–1336 (1992).*

* cited by examiner

Primary Examiner—Martin Angebranndt
(74) Attorney, Agent, or Firm—Sughrue Mion, PLLC

(57) ABSTRACT

A complex of a dye cation and an anionic TCNQ derivative of the formula (I):

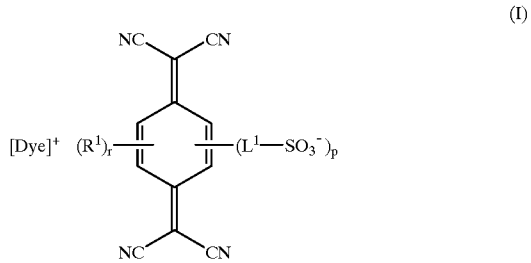

in which $[Dye]^+$ is a dye cation, $L^1$ is a linking group, $R^1$ is a substituent group, p is an integer of 1–4, and r is an integer of 0–3 under the condition of $1<p+r<4$, is favorably employable as a dye compound for preparing a recording layer of CD-R or DVD-R.

24 Claims, No Drawings

DYE COMPLEX AND OPTICAL INFORMATION RECORDING MEDIUM

FIELD OF THE INVENTION

The present invention relates to a dye complex and an optical information recording medium of heat mode type on which information can be recorded by means of a laser beam. Further, the invention relates to a novel water-soluble tetracyanoquinodimethane derivative. Furthermore, the invention relates to novel cyanine dyes which are favorably employable as material of a recording layer of a heat more optical information recording medium.

BACKGROUND OF THE INVENTION

An information recording medium on which information can be recorded by means of a laser beam is known as a recordable compact disc (CD-R) or a recordable digital versatile disc (DVD-R).

The recordable optical disc generally has a multi-layer structure typically comprising a disc-shaped transparent substrate (support), a recording layer comprising an organic dye, a light-reflecting metal layer, and a resinous protective layer overlaid in order.

The recordable optical disc is desired to have high light-resistance after recording, high sensitivity and high information reproductivity.

It is known that a tetracyanoquinodimethane (TCNQ) or a derivative thereof can enhance the light-resistance of the recording dye layer when it is incorporated into the dye layer.

U.S. Pat. No. 5,579,150 describes an optical recording medium using a charge transfer complex of cyanine-TCNQ.

TCNQ and derivatives thereof are also employable as electron acceptors of charge transfer complexes for preparing organic electroconductive materials.

It is an object of the present invention to provide a complex comprising a dye cation and a anionic tetracyanoquinodimethane derivative which is easily dissolved in various polar solvents and further shows increased light-resistance and therefore which is favorably employable for preparing a recording dye layer of a recordable optical medium.

It is another object of the invention to provide an optical information recording medium having a recording dye layer which shows increased light-resistance and a high sensitivity.

It is a further object of the invention to provide novel water-soluble tetracyanoquinodimethanes which are favorably employable as electron acceptors.

It is a further object of the invention to provide novel cyanine dye cations which show a high sensivitity in a wide wavelength range.

SUMMARY OF THE INVENTION

The present invention resides a complex comprising a dye cation and an anionic tetracyanoquinodimethane derivative having the following formula (I):

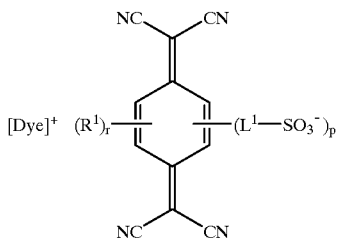

in which [Dye]$^+$ represents a dye cation, $L^1$ is a linking group containing at least one methylene group, $R^1$ is a substituent group, p is an integer of 1 to 4, and r is an integer of 0 to 3 under the condition of 1<p+r<4, provided that a cationic charge of the dye cation and an anionic charge of the anionic tetracyanoquinodimethane derivative are adjusted to make the complex neutral.

In the formula (I), the group of —$L^1$—$SO_3$— is preferably represented by the formula of —O—$R^2$—O—$L^2$—$SO_3$— or —O—$R^2$—$OSO_3$— in which $R^2$ is an alkylene group which may have one or more substituent groups, and $L^2$ is a divalent linking group.

In the complex of the formula (I), the dye cation preferably is a dye cation having the following formula (II):

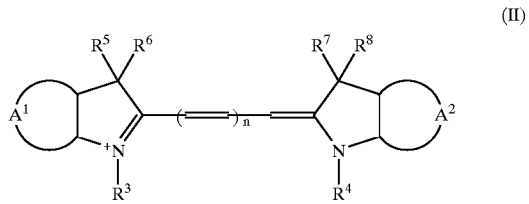

wherein each of $A^1$ and $A^2$ independently represents a benzene or naphthalene ring which has no substituent group or which has one or more substituent groups, n is an integer of 0 to 2, each of $R^3$ and $R^4$ independently represents a hydrogen atom, an alkyl group, an aralkyl group, or a heterocyclic group, and each of $R^5$, $R^6$, $R^7$ and $R^8$ independently represents an alkyl group which has no substituent group or has one or more substituent groups, provided that the methine group has no substituent group or has one or more substituent groups.

The present invention further resides in an optical information recording medium comprising a substrate and a recording layer on which information is recordable by irradiation with a laser beam, wherein said recording layer comprises a complex of a dye cation and an anionic tetracyanoquinodimethane derivative having the aforementioned formula (I).

The present invention further resides in a complex of a cation and an anionic tetracyanoquinodimethane derivative having the following formula (IX):

(IX)

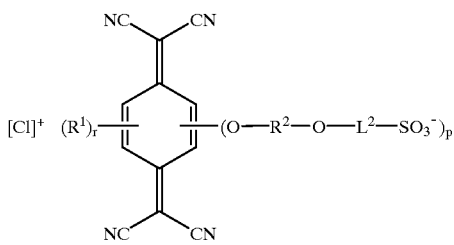

(V)

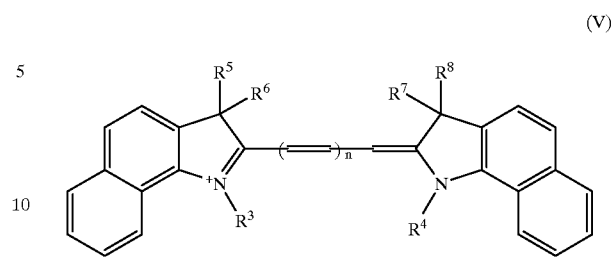

in which [CI]⁺ represents a cation, $R^1$ is a substituent group, $R^2$ is an alkylene group which has one or more substituent groups or has no substituent groups, $L^2$ is a single bond or a divalent linking group, p is an integer of 1 to 4, and r is an integer of 0 to 3 under the condition of $1<p+r<4$, provided that a cationic charge of the cation and an anionic charge of the anionic tetracyanoquinodimethane derivative are adjusted to make the complex neutral.

The invention furthermore resides in cationic cyanine dye/anion complexes having one of the following formulas (III) to (VIII):

in which n is 0, 1 or 2, each of $R^3$ and $R^4$ independently represents a hydrogen atom, an alkyl group containing 1 to 6 carbon atoms, or an aralkyl group having an alkyl moiety of 1 to 3 carbon atoms, and each of $R^5$, $R^6$, $R^7$ and $R^8$ represents a methyl group, provided that where n is 1 or 2, alkyl, halogen, methoxy, phenyl or 4-pyridyl can be attached to a meso position at the center of the methine chain, where n is 1, there is no case where both of $R^3$ and $R^4$ are methyl, and where n is 2, at least one of $R^3$ and $R^4$ is hydrogen;

(III)

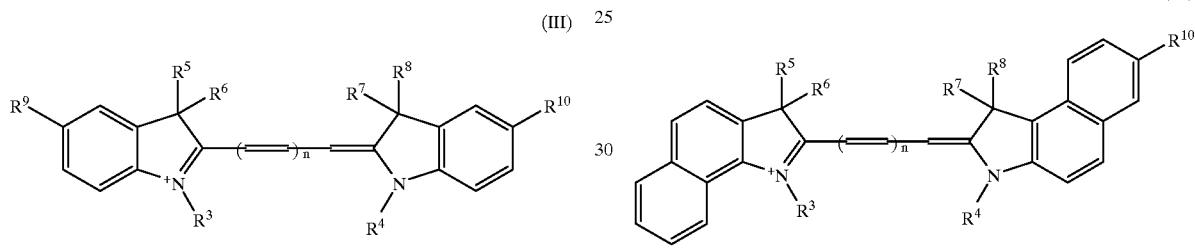

(VI)

in which n is 0, 1 or 2, $R^3$ represents a hydrogen atom, an alkyl group containing 1 to 6 carbon atoms, or an aralkyl group having an alkyl moiety of 1 to 3 carbon atoms, $R^4$ represents a hydrogen atom, each of $R^5$, $R^6$, $R^7$ and $R^8$ represents a methyl group, and each of $R^9$ and $R^{10}$ independently represents a hydrogen atom, an alkyl group containing 1 to 6 carbon atoms, a halogen atom, or an alkoxy group containing 1 to 6 carbon atoms, provided that where n is 1 or 2, alkyl, halogen, methoxy, phenyl or 4-pyridyl can be attached to a meso position at the center of the methine chain;

in which n is 0, 1 or 2, each of $R^3$ and $R^4$ independently represents a hydrogen atom, an alkyl group containing 1 to 6 carbon atoms, or an aralkyl group having an alkyl moiety of 1 to 3 carbon atoms, each of $R^5$, $R^6$, $R^7$ and $R^8$ represents a methyl group, and $R^{10}$ represents a hydrogen atom, an alkyl group containing 1 to 6 carbon atoms, a halogen atom, or an alkoxy group containing 1 to 6 carbon atoms, provided that where n is 1 or 2, alkyl, halogen, methoxy, phenyl or 4-pyridyl can be attached to a meso position at the center of the methine chain;

(IV)

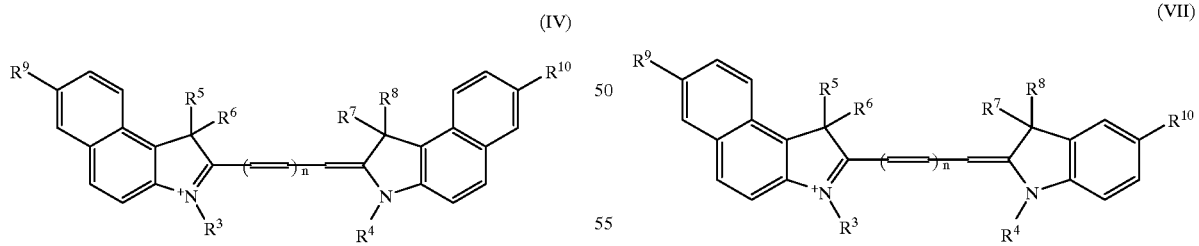

(VII)

in which n is 0, 1 or 2, $R^3$ represents a hydrogen atom, an alkyl group containing 1 to 6 carbon atoms, or an aralkyl group having an alkyl moiety of 1 to 3 carbon atoms, $R^4$ represents a hydrogen atom, each of $R^5$, $R^6$, $R^7$ and $R^8$ represents a methyl group, and each of $R^9$ and $R^{10}$ independently represents a hydrogen atom, an alkyl group containing 1 to 6 carbon atoms, a halogen atom, or an alkoxy group containing 1 to 6 carbon atoms, provided that where n is 1 or 2, alkyl, halogen, methoxy, phenyl or 4-pyridyl can be attached to a meso position at the center of the methine in which n is 0, 1 or 2, each of $R^3$ and $R^4$ independently represents a hydrogen atom, an alkyl group containing 1 to 6 carbon atoms, or an aralkyl group having an alkyl moiety of 1 to 3 carbon atoms, each of $R^5$, $R^6$, $R^7$ and $R^8$ represents a methyl group, and each of $R^9$ and $R^{10}$ independently represents a hydrogen atom, an alkyl group containing 1 to 6 carbon atoms, a halogen atom, or an alkoxy group containing 1 to 6 carbon atoms, provided that where n is 1 or 2, alkyl, halogen, methoxy, phenyl or 4-pyridyl can be attached to a meso position at the center of the methine chain, and where both of $R^9$ and $R^{10}$ are hydrogen, at least one of $R^3$ and $R^4$ is hydrogen;

(VIII)

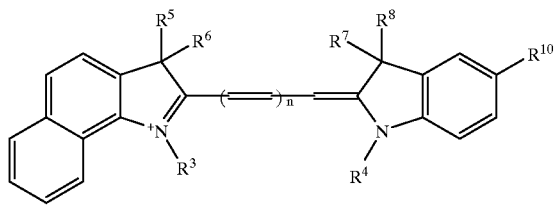

in which n is 0, 1 or 2, each of $R^3$ and $R^4$ independently represents a hydrogen atom, an alkyl group containing 1 to 6 carbon atoms, or an aralkyl group having an alkyl moiety of 1 to 3 carbon atoms, each of $R^5$, $R^6$, $R^7$ and $R^8$ represents a methyl group, and $R^{10}$ represents a hydrogen atom, an alkyl group containing 1 to 6 carbon atoms, a halogen atom, or an alkoxy group containing 1 to 6 carbon atoms, provided that where n is 1 or 2, alkyl, halogen, methoxy, phenyl or 4-pyridyl can be attached to a meso position at the center of the methine chain, and where $R^{10}$ is hydrogen, at least one of $R^3$ and $R^4$ is hydrogen

DETAILED DESCRIPTION OF THE INVENTION

In one aspect, the invention resides in a complex comprising a dye cation and an anionic tetracyanoquinodimethane derivative of the aforementioned formula (I).

In the formula (I), $[Dye]^+$ represents a dye cation such as a cyanine dye cation.

$L^1$ is a linking group containing at least one methylene group, such as a inking group represented by the formula of —$OR^2$—O—$L^2$—, in which $R^2$ is an alkylene group which may have one or more substituent groups, and $L^2$ is a divalent linking group.

In the formula of —$OR^2$—O—$L^2$—, the alkylene group of $R^2$ is a linear or cyclic alkylene group containing 1 to 20 carbon atoms (e.g., methylene, ethylene, n-propylene, isopropylene, or n-butylene).

The substituent group of $R^2$ can be a linear, branched chain or cyclic alkyl group containing 1 to 20 carbon atoms (e.g., methyl, ethyl, n-propyl, isopropyl, or n-butyl), an aryl group containing 6 to 18 carbon atoms which may have one or more substituent groups selected from the group consisting of a halogen atom, an alkyl group having 1 to 6 carbon atoms, and an alkoxy group having 1 to 6 carbon atoms (e.g., phenyl, chlorophenyl, anisyl, toluyl, or 2,4-di-t-amyl-1-naphthyl), an aralkyl group containing 7 to 19 carbon atoms which may have one or more substituent groups selected from the group consisting of a halogen atom, an alkyl group having 1 to 6 carbon atoms and an alkoxy group having 1 to 6 carbon atoms (e.g., benzyl or phenylethyl), an alkenyl group containing 2 to 20 carbon atoms (e.g., vinyl or 2-methylvinyl), an alkynyl group containing 2 to 20 carbon atoms (e.g., ethynyl, 2-methylethynyl, or 2-phenylethynyl), a halogen atom (e.g., F, Cl, Br, I), a cyano group, a hydroxyl group, a carboxyl group, a sulfo group, an acyl group having 2 to 12 carbon atoms (e.g., acetyl, benzoyl, salicyloyl, or pivaloyl), an alkoxy group having 1 to 12 carbon atoms (e.g., methoxy, butoxy, cyclohexyloxy, 2-hydroxyethoxy, 2-carboxyethoxy, 2-acetoxyethoxy, 2-methoxycarbonylethoxy, or benzyloxy), an aryloxy group having 6 to 14 carbon atoms (e.g., phenoxy or naphthoxy), an alkylthio group having 1 to 12 carbon atoms (e.g., methylthio, butylthio, benzylthio, or 3-methoxypropylthio), an arylthio group having 6 to 14 carbon atoms (e.g., phenylthio or 4-chlorothio), an alkyl-sulfonyl group having 1 to 6 carbon atoms (e.g., methanesulfonyl or butanesulfonyl), an arylsufonyl group having 6 to 14 carbon atoms (e.g., benzenesulfonyl or p-toluenesulfonyl), a carbamoyl group having 1 to 10 carbon atoms, an amide group having 1 to 10 carbon atoms, an imide group having 2 to 12 carbon atoms, an acyloxy group having 2 to 10 carbon atoms, an alkoxycarbonyl group having 2 to 10 carbon atoms, and a heterocyclic group having 3 to 12 carbon atoms (e.g., aromatic heterocyclic group such as pyridyl, thienyl, furyl, thiazolyl, imidazolyl, or pyrazolyl, or aliphatic heterocyclic group such as pyrrolidine ring, piperidine ring, morpholine ring, pyran ring, thiopyran ring, dioxane ring, or dithiorane ring).

Preferred substituent groups are alkyl, aryl, alkoxy, hydroxyl, amino, and halogen. More preferred are alkyl having 1–6 carbon atoms, aryl having 6–10 carbon atoms (particularly, phenyl), alkoxy having 1 to 10 carbon atoms, hydroxyl, amino, and halogen.

The divalent linking groups of $L^2$ preferably contains 1 to 20 carbon atoms. Exiles include alkylene (e.g., methylene, ethylene, propylene, butylene, or pentylene), arylene (e.g., phenylene or naphthylene), alkenylene (e.g, ethenylene or propenylene), alkynylene (e.g., ethynylene), amide, ester, sulfonamide, sulfonic ester, ureide, sulfonyl, sulfinyl, thioether, ether, carbonyl, —N(Rq)— [Rq is hydrogen, substituted or unsubstituted alkyl, or substituted or unsubstituted aryl], and divalent heterocycles (e.g., 6-chloro-1,3, 5-triazine-2,4-diyl, pyrimidine-2,4-diyl, and quinoquixane-2,3- diyl), and combinations thereof.

The preferred divalent linking groups of $L^2$ is represented by the formula of —CO—G— in which G is a divalent group selected from the group consisting of an alkylene group, an arylene group, an alkenylene group, a alkynylene group, or a combination thereof. In the groups, the alkylene group preferably contains 1 to 4 carbon atoms (e.g, methylene, ethylene, propylene, or butylene), the arylene group preferably contains 6 to 10 carbon atoms (e.g., phenylene or naphthylene), an alkenylene group preferably contains 2 to 4 carbon atoms (e.g., ethenylene or propenylene), and an alkynylene group preferably contains 2 to 4 carbon atoms (ethynylene). These groups can be combined to form the divalent linking group.

Preferred are methylene, ethylene, propylene, butylene, and phenylene.

The divalent linking group may have one or more substituents such as those described for the substituent groups which may be attached to $R^2$.

$R^1$ is a substituent group such as that selected from those described for the substituent groups which may be attached to $R^2$.

In the formula (1), p is an integer of 1 to 4, preferably 2, and r is an integer of 0 to 3, preferably 0, under the condition of 1<p+r<4, provided that a cationic charge of the dye cation and an anionic charge of the anionic tetracyanoquinodimethane derivative are adjusted to make the complex neutral.

Representative examples of the anionic tetracyanoquinodimethane derivative of the formula (I) are described below, in the form of a neutral compound form in which the dye cation of $[Dye]^+$ is replaced with one or more of hydrogens.

(1) 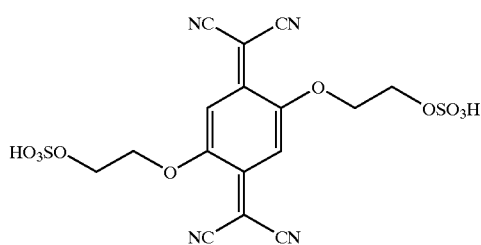
(2) 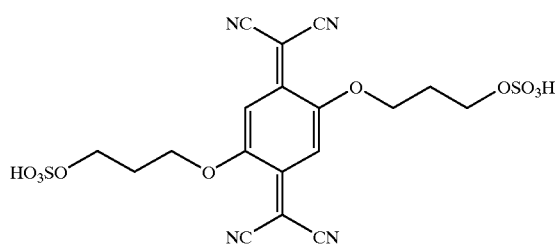
(3) 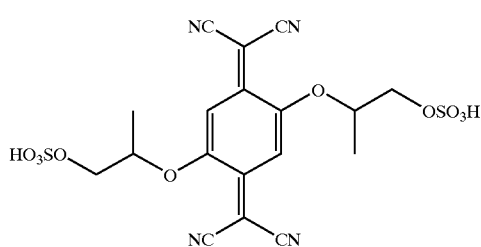
(4) 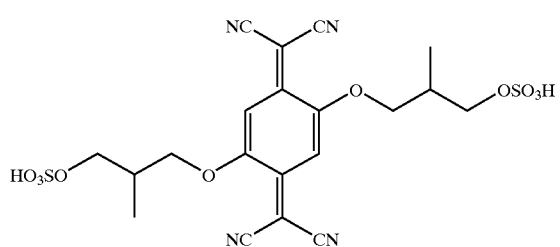
(5) 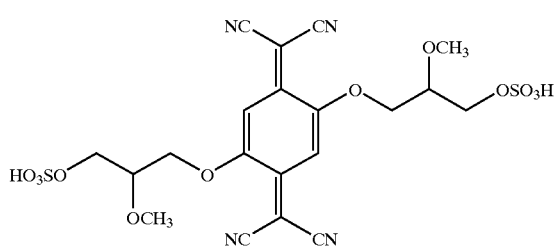
(5) 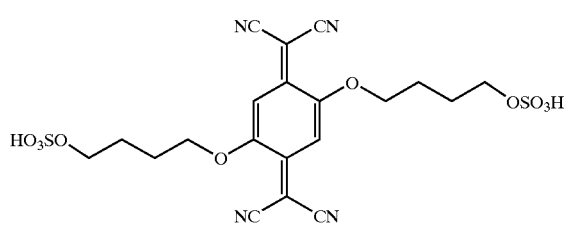
(7) 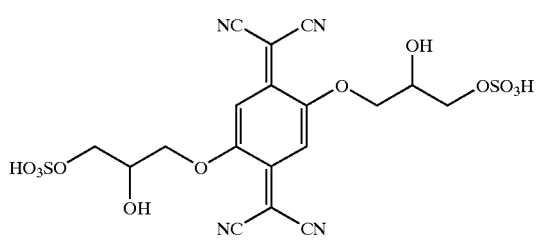
(8) 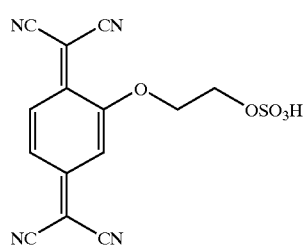
(9) 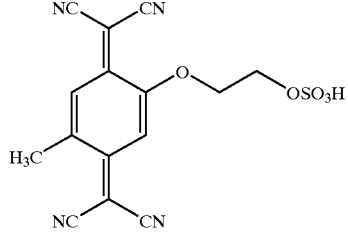
(10) 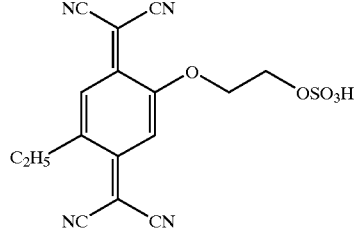
(11) 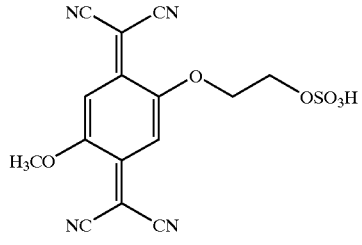
(12) 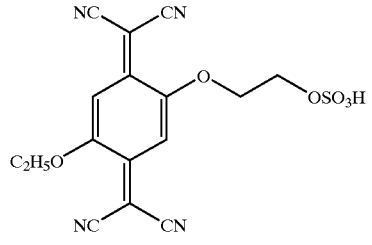

-continued
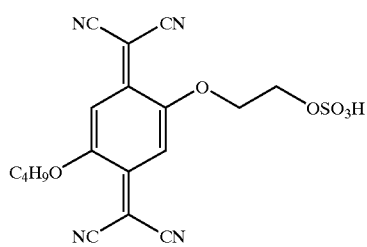 (13)
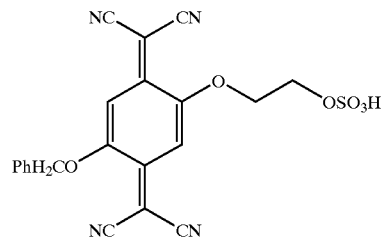 (14)
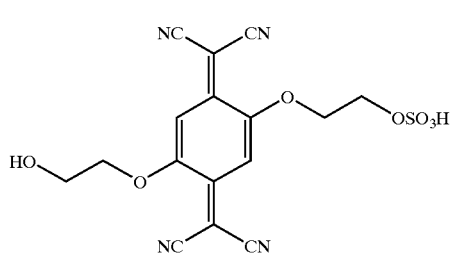 (15)
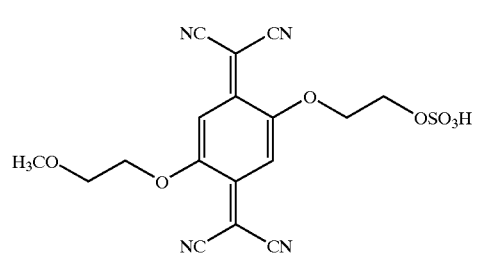 (16)
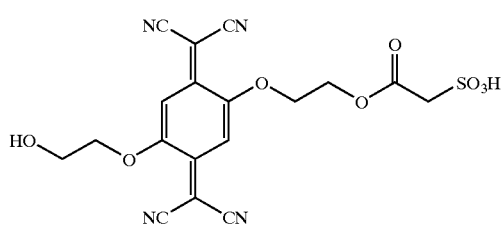 (17)
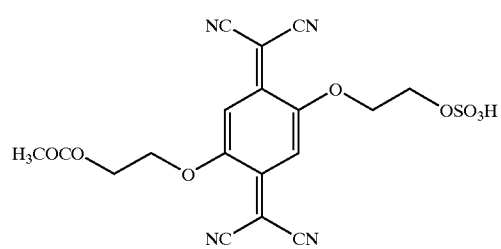 (18)
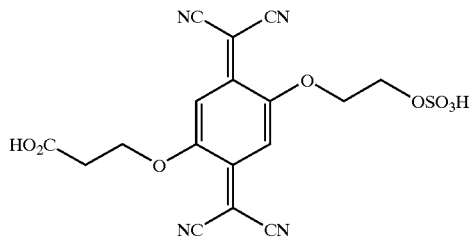 (19)
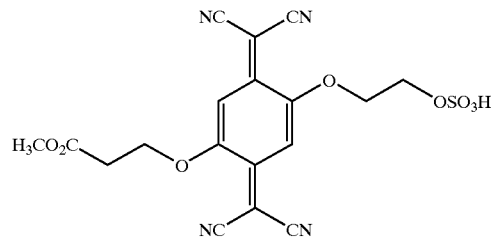 (20)
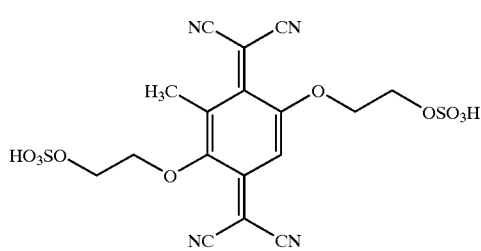 (21)
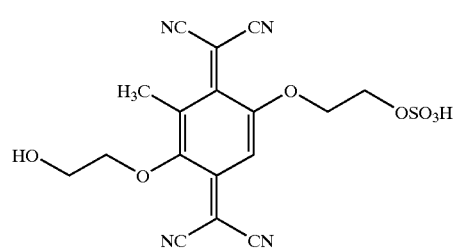 (22)

(23)
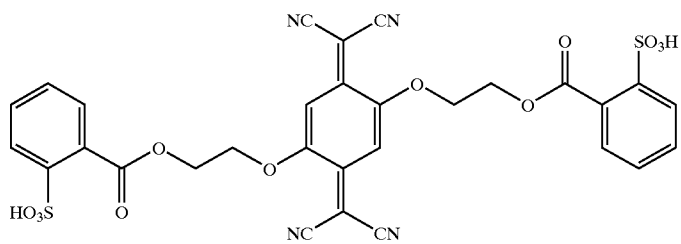
(24)
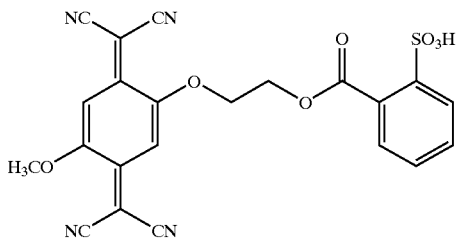
(25)
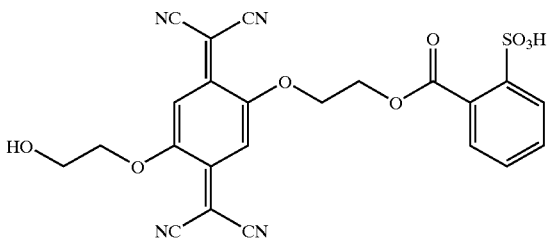
(26)
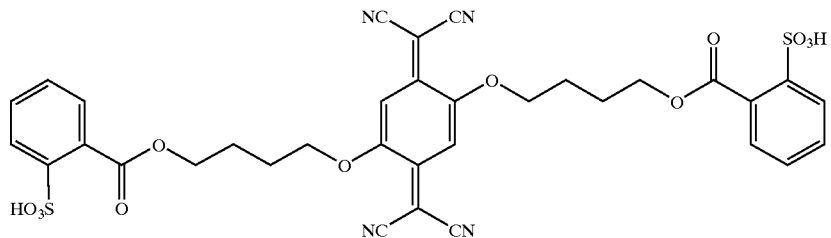
(27)
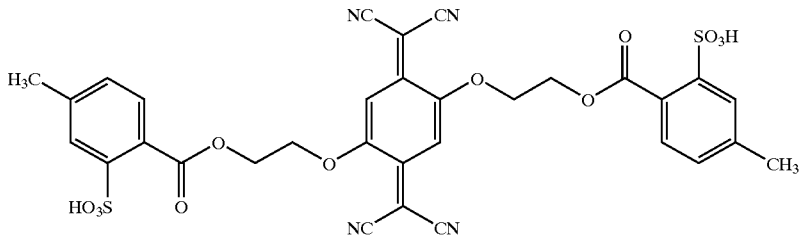
(28)
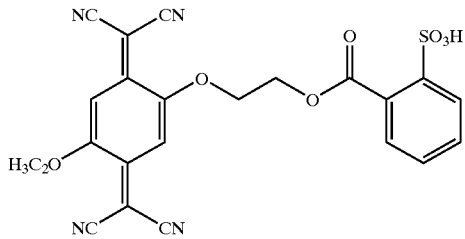

-continued
(29)
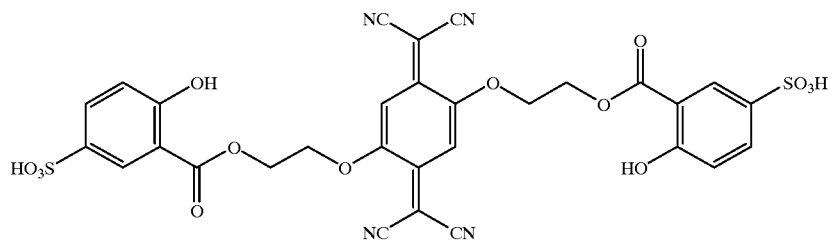
(30)
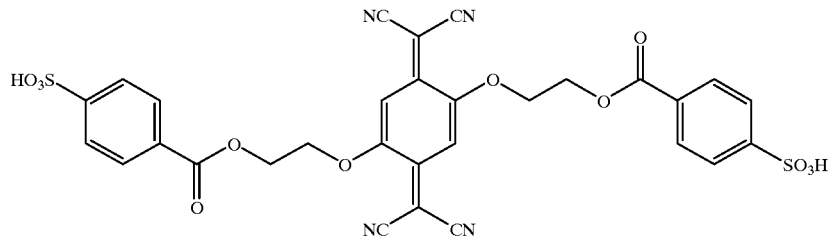
(31)
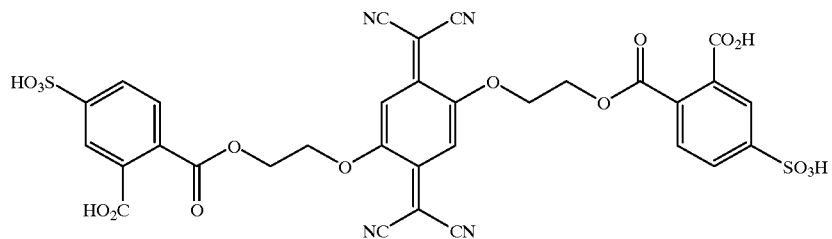
(32)
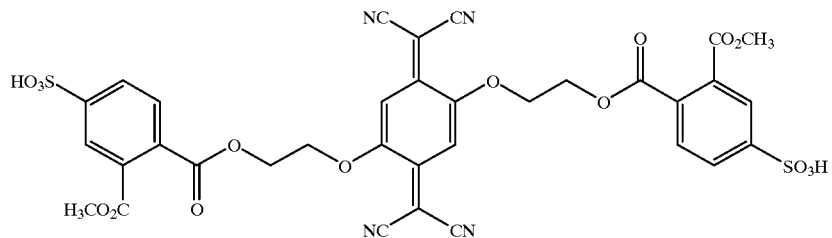
(33)
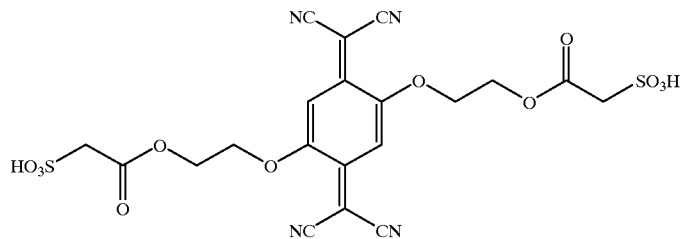
(34)
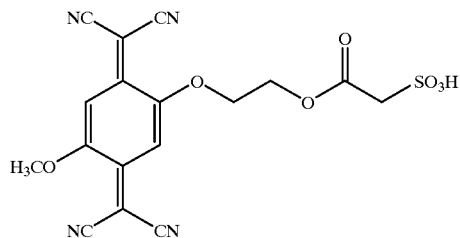

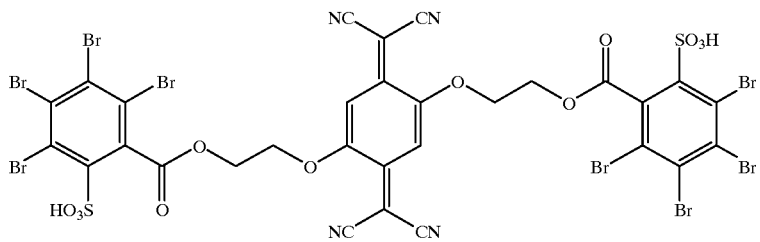 (35)
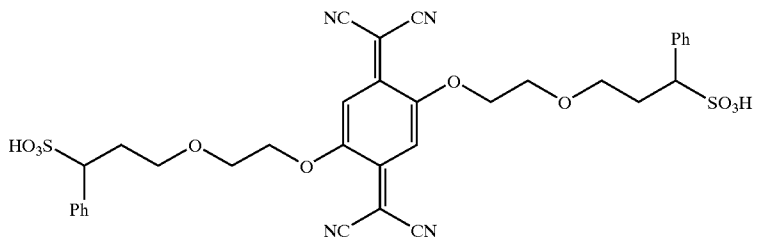 (36)
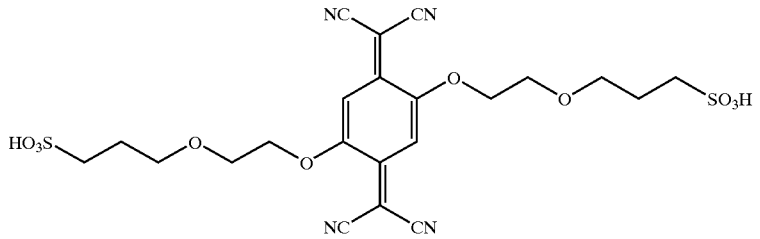 (37)
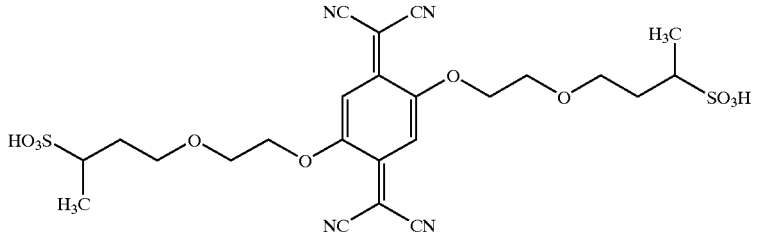 (38)
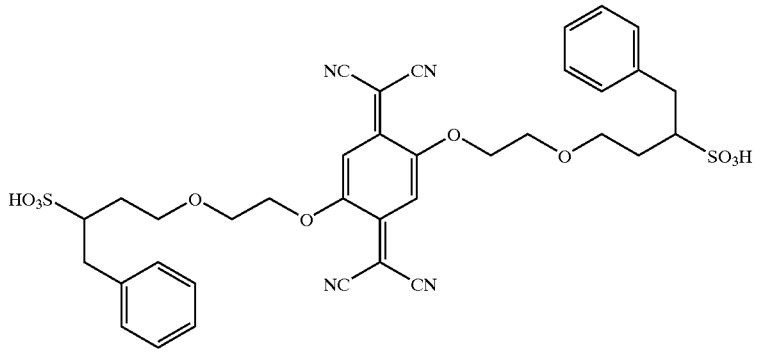 (39)
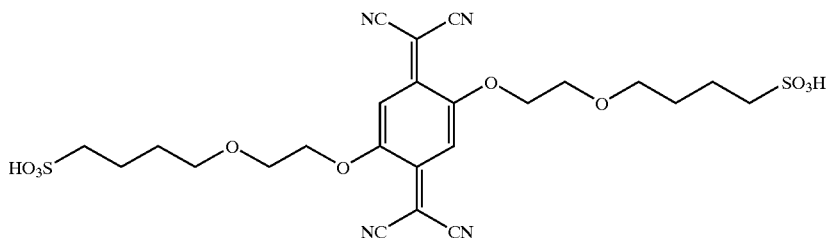 (40)

In the formula (I), the dye cation of [Dye]⁺ preferably is a cyanine dye cation such as that represented by the formula (II):

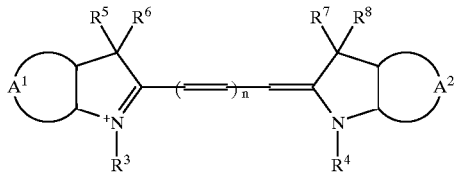

(II)

In the formula (II), each of $A^1$ and $A^2$ independently represents a benzene or naphthalene ring which may have one or more substituent groups such as those described hereinbefore for the substituent groups which may be attached to $R^2$.

In the formula (II), n is an integer of 0 to 2, and each of $R^3$ and $R^4$ preferably represents a hydrogen atom, an alkyl group, an aralkyl group, or a heterocyclic group. Examples of these groups are those described hereinbefore. Each of $R^5$, $R^6$, $R^7$ and $R^8$ preferably represents an alkyl group which may have one or more substituent groups. Examples of the alkyl groups are those described hereinbefore. The methine group may have one or more substituent groups. Examples of the substituent groups are those described for the substituent groups which may be attached to $R^2$.

Examples of the cyanine dye cations represented by the formula (II) are described below:

Formula (III)

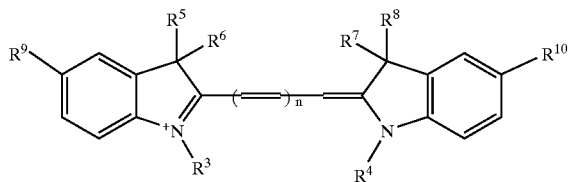

in which each of $R^3$, $R^4$, $R^5$, $R^6$, $R^7$, $R^8$, and n has the same meaning as defined for the formula (II), and each of $R^9$ and $R^{10}$ independently represents a hydrogen atom, an alkyl group containing 1 to 6 carbon atoms, an alkoxy group containing 1 to 6 carbon atoms, or a halogen atom;

Formula (IV)

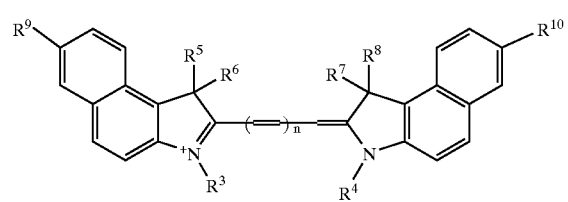

in which each of $R^3$, $R^4$, $R^5$, $R^6$, $R^7$, $R^8$, and n has the same meaning as defined for the formula (II), and each of $R^9$ and $R^{10}$ independently represents a hydrogen atom, an alkyl group containing 1 to 6 carbon atoms, an alkoxy group containing 1 to 6 carbon atoms, or a halogen atom;

Formula (V)

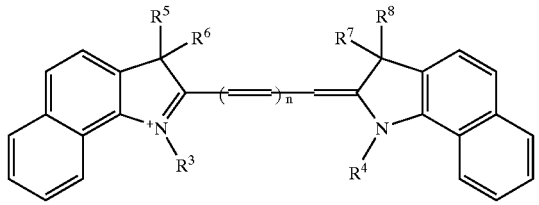

in which each of $R^3$, $R^4$, $R^5$, $R^6$, $R^7$, $R^8$, and n has the same meaning as defined for the formula (II);

Formula (VI)

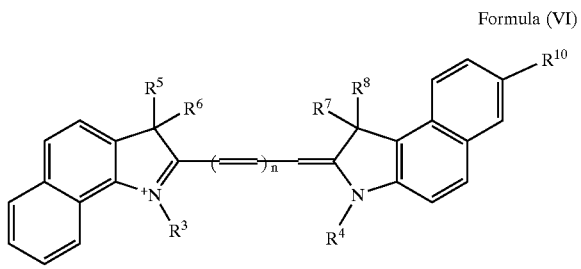

in which each of $R^3$, $R^4$, $R^5$, $R^6$, $R^7$, $R^8$, and n has the same meaning as defined for the formula (II), and $R^{10}$ represents a hydrogen atom, an alkyl group containing 1 to 6 carbon atoms, an alkoxy group containing 1 to 6 carbon atoms, or a halogen atom;

Formula (VII)

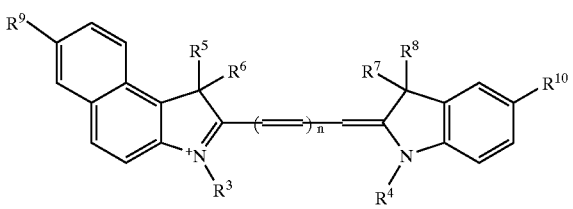

in which each of $R^3$, $R^4$, $R^5$, $R^6$, $R^7$, $R^8$, and n has the same meaning as defined for the formula (II), and each of $R^9$ and $R^{10}$ independently represents a hydrogen atom, an alkyl group containing 1 to 6 carbon atoms, an alkoxy group containing 1 to 6 carbon atoms, or a halogen atom; and Formula (VIII)

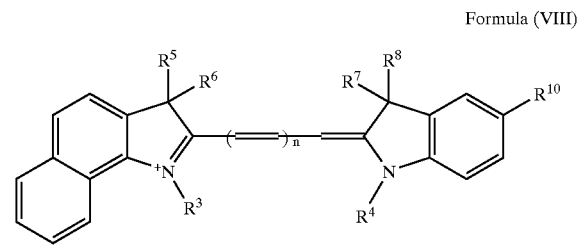

in which each of $R^3$, $R^4$, $R^5$, $R^6$, $R^7$, $R^8$, and n has the same meaning as defined for the formula (II), and $R^{10}$ represents a hydrogen atom, an alkyl group containing 1 to 6 carbon atoms, an alkoxy group containing 1 to 6 carbon atoms, or a halogen atom.

It should be noted that the cyanine dye cation of the formula (II), for instance, a cyanie dye cation of the formula (III), exists under the following equilibrium state when it is present in combination with an anion X⁻:
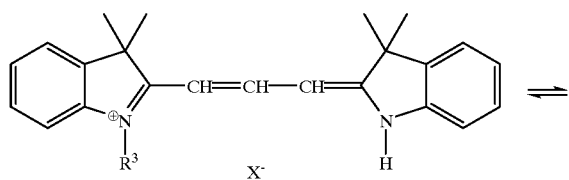
⇌
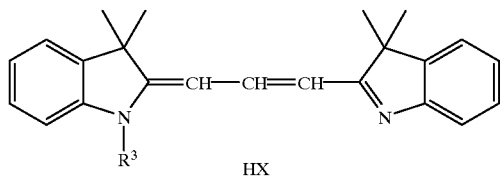
Examples of the cyanine-TCNQ derivative complexs of the formula (I) according to the invention are illustrated below:
II-1
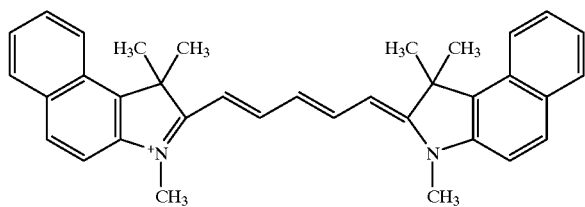
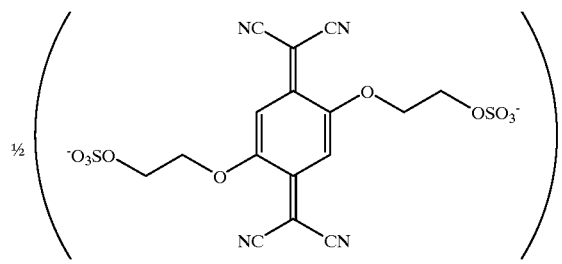
II-2
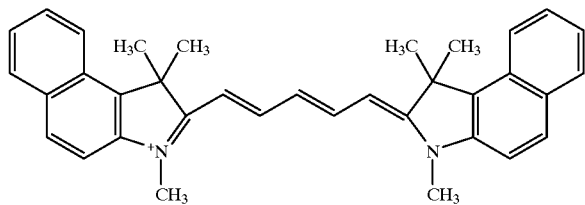
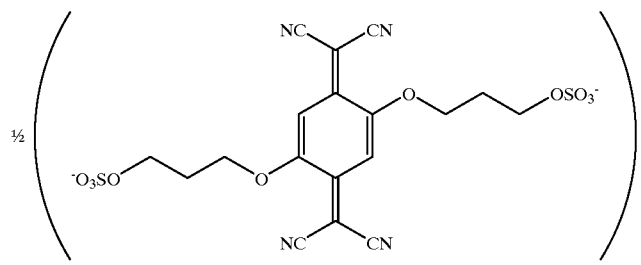
II-3
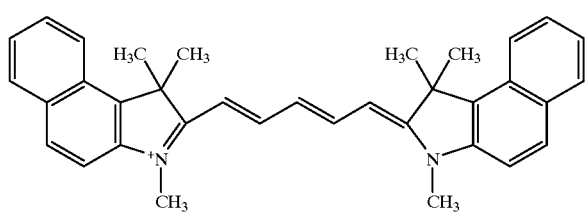
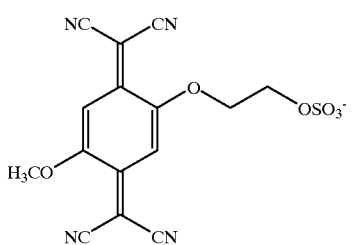

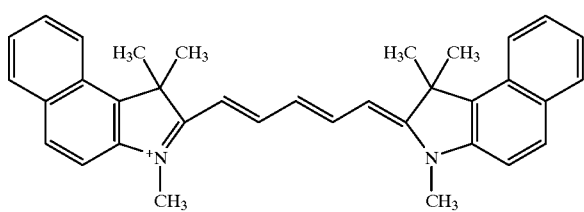
II-4
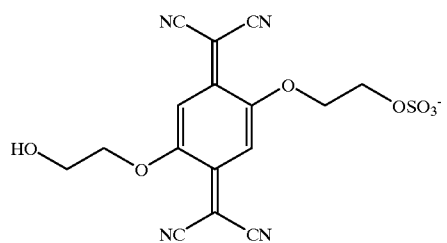
II-5
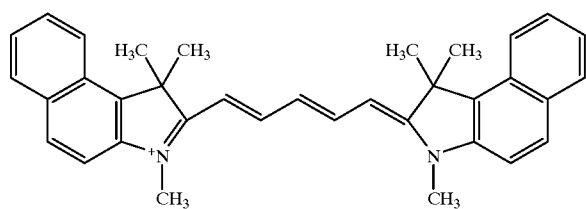
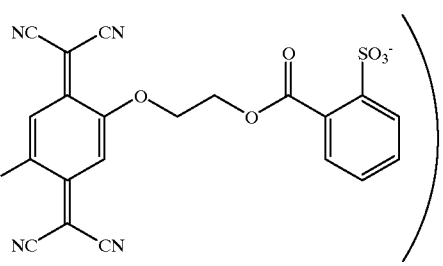
II-6
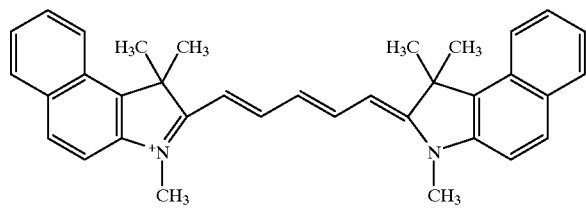
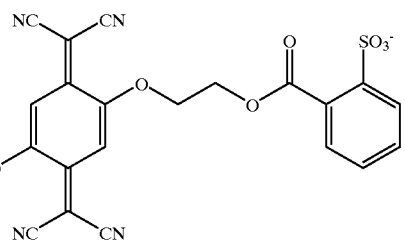
II-7
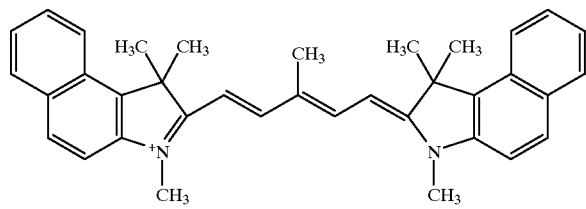
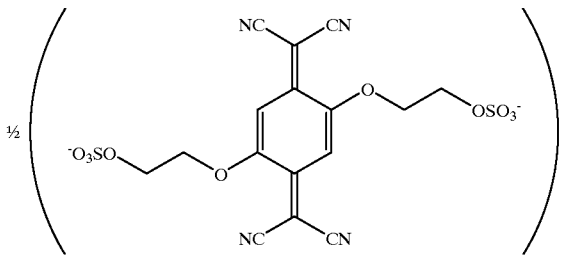

-continued
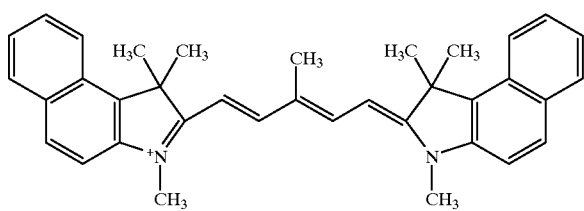
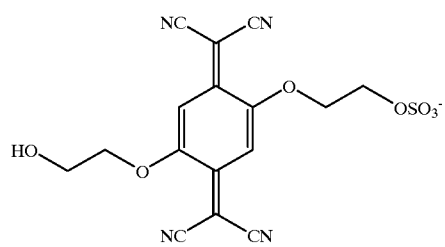
II-8
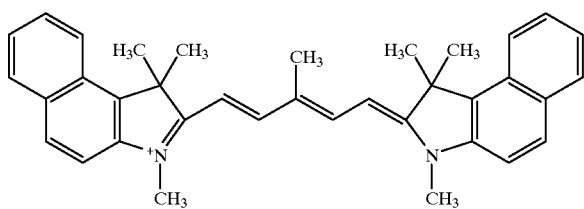
II-9
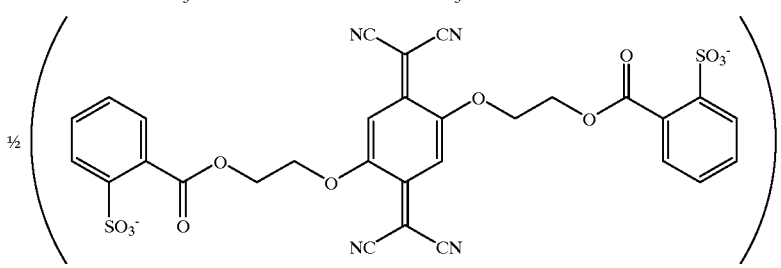
II-10
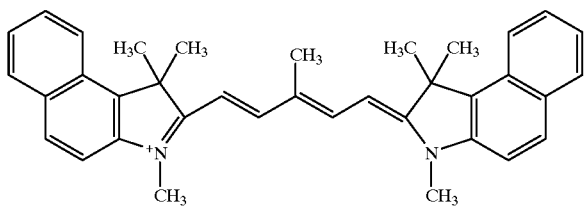
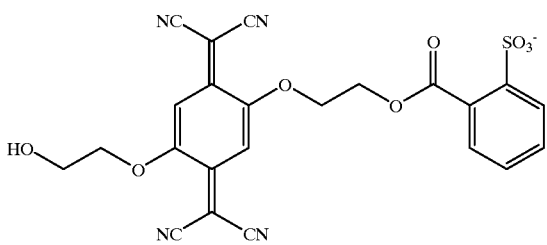
II-11
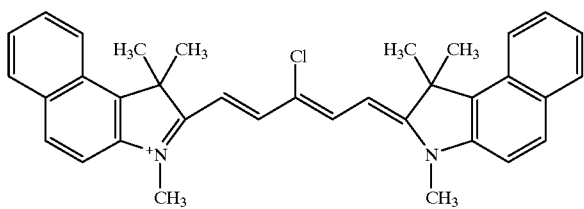
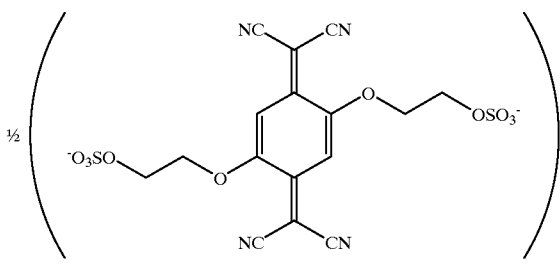

-continued
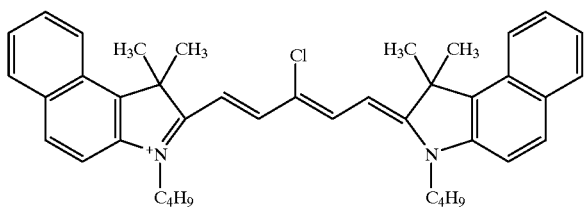
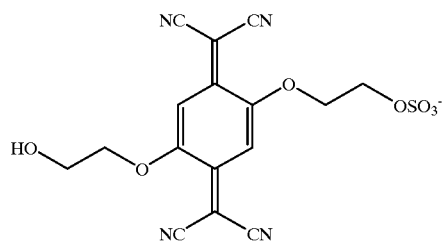
II-12
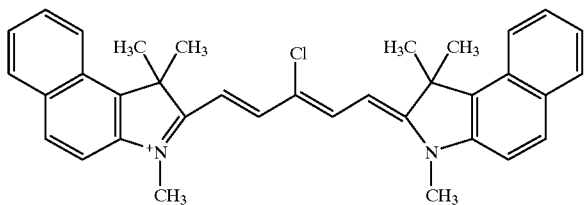
II-13
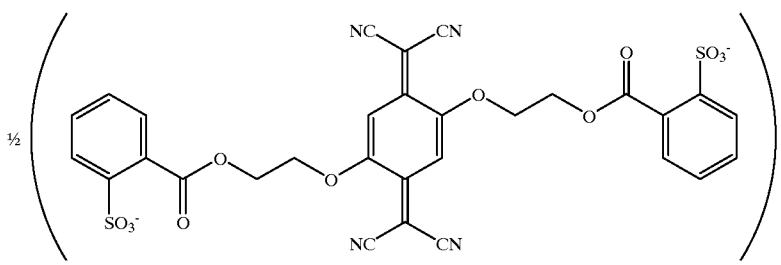
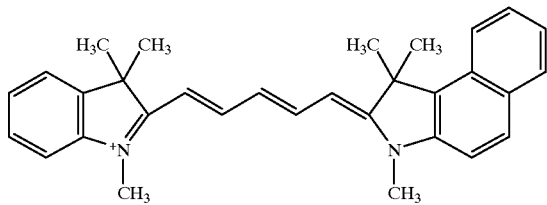
II-14
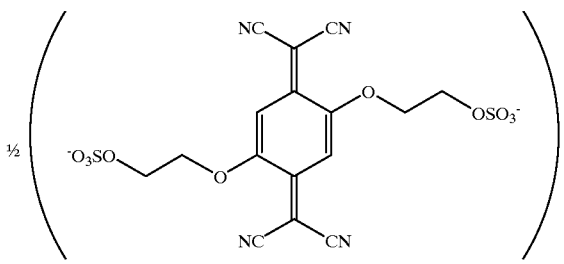
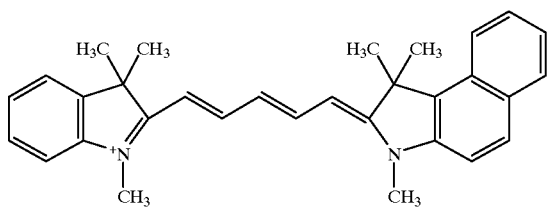
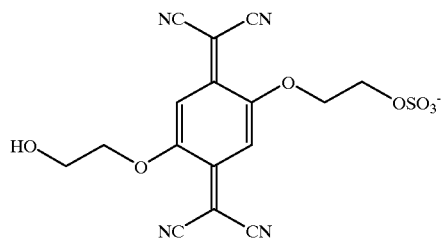
II-15

II-16
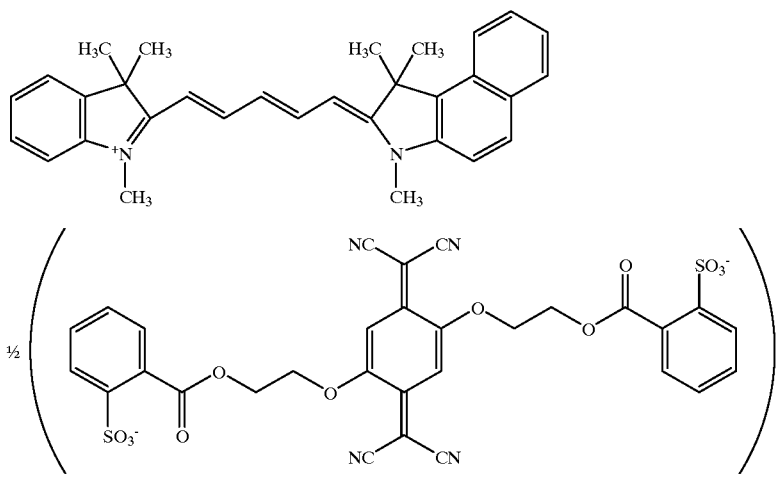
II-17
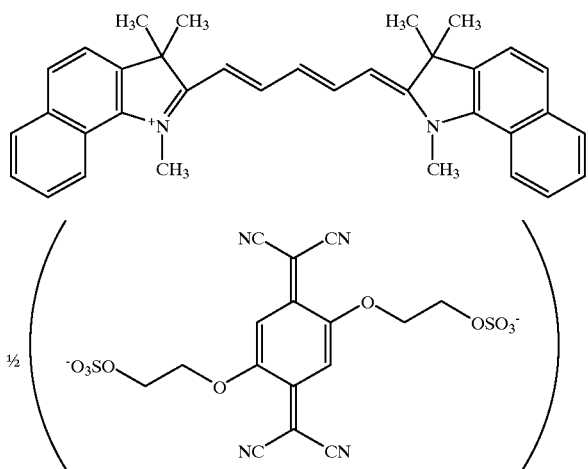
II-18
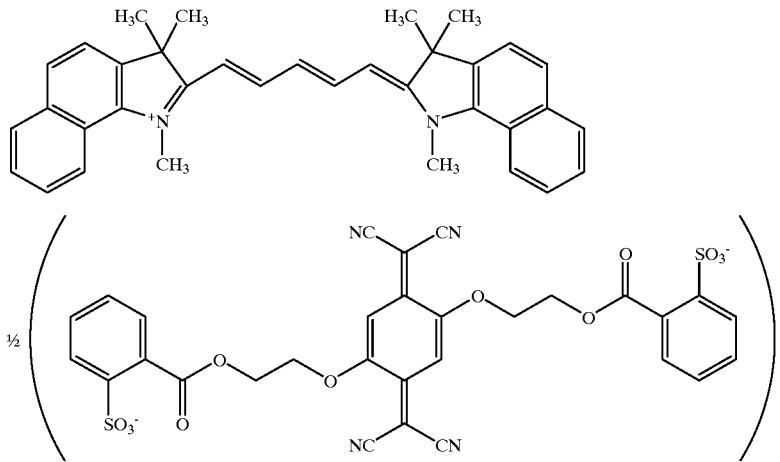
II-19
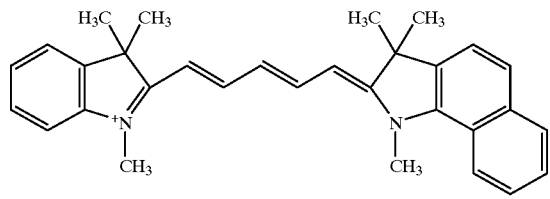

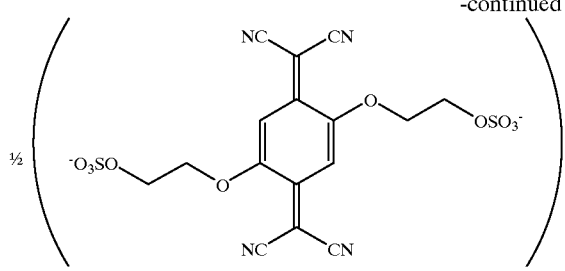
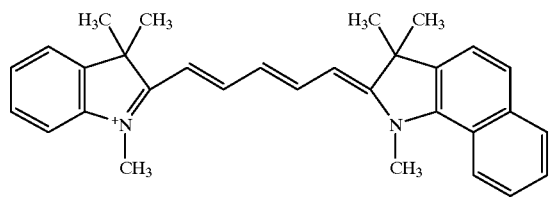
II-20
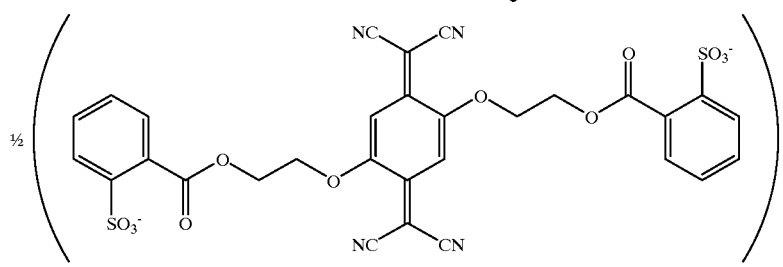
II-21
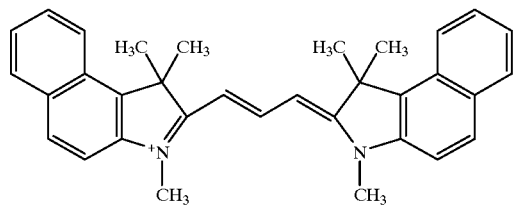
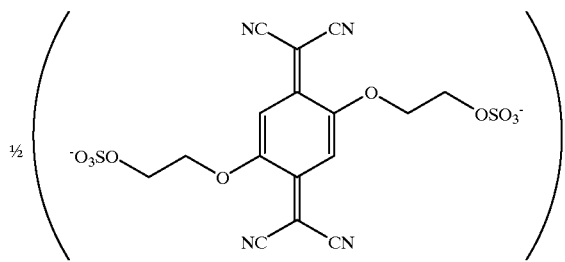
II-22
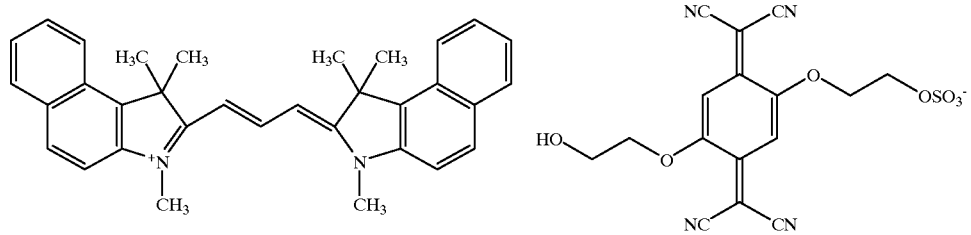
II-23
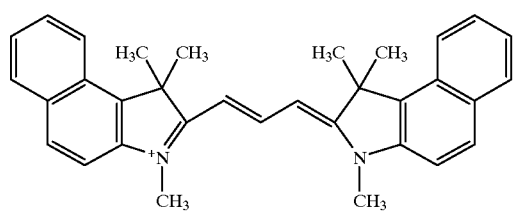

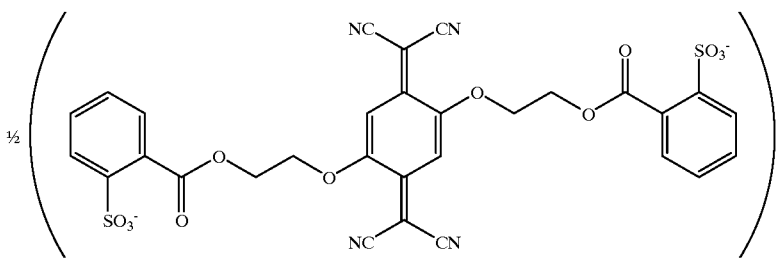
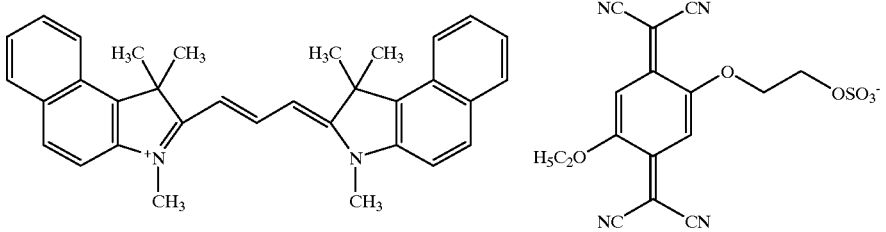
II-24
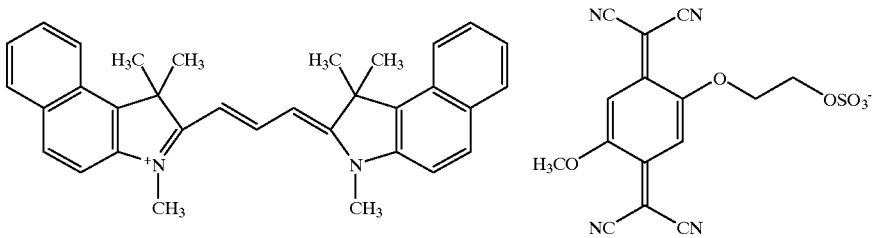
II-25
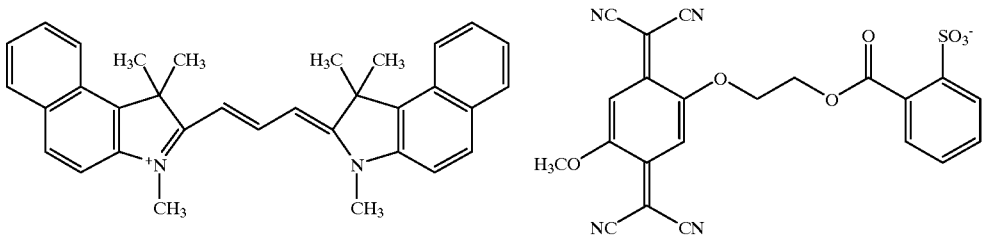
II-26
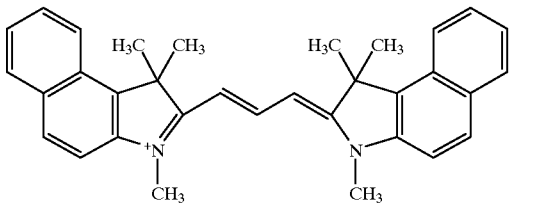
II-27
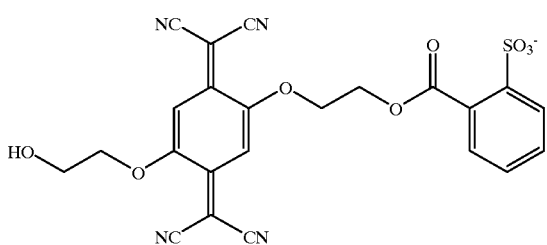

II-28
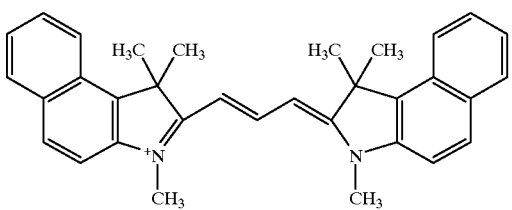
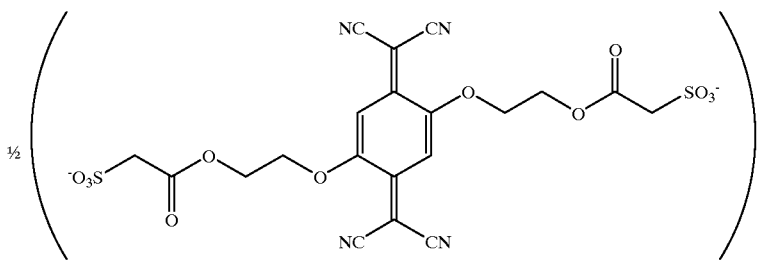
II-29
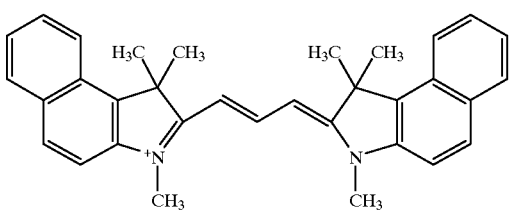
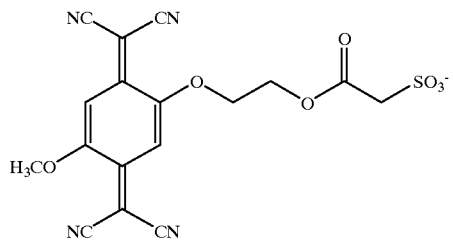
II-30
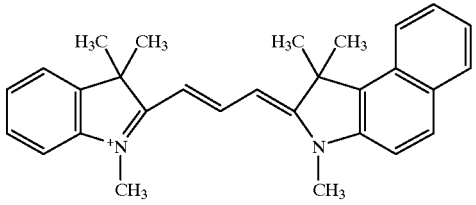
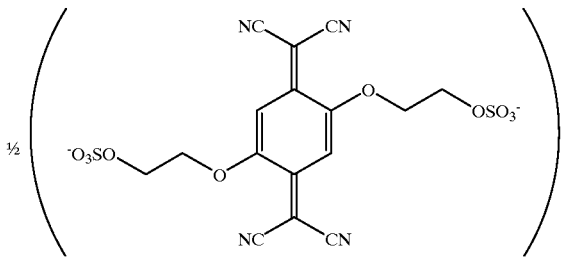
II-31
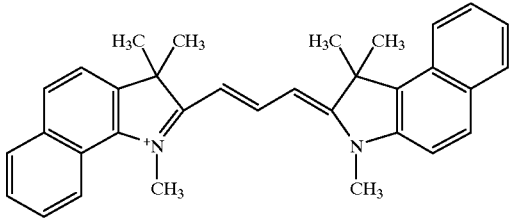

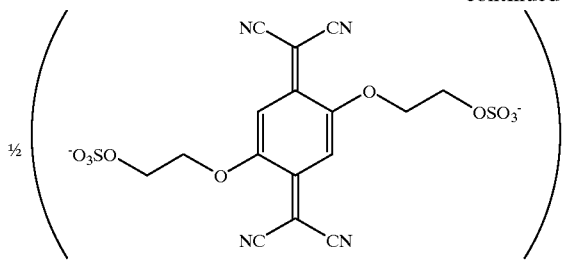
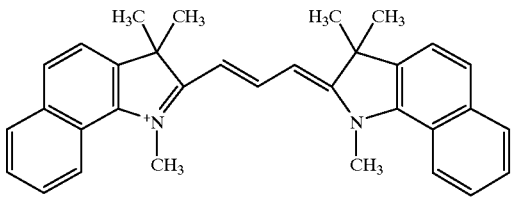
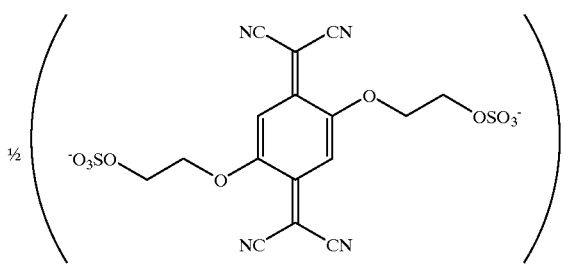
II-32
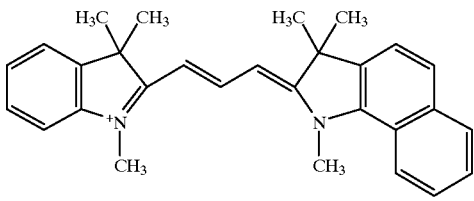
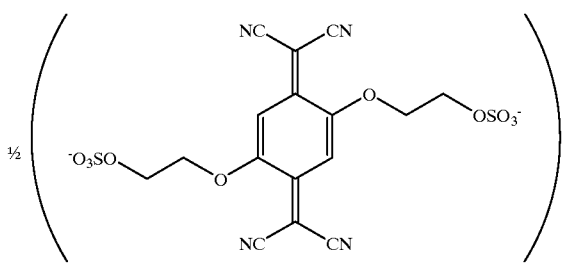
II-33
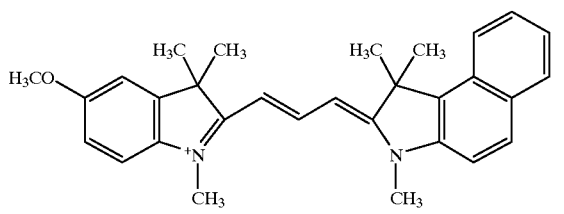
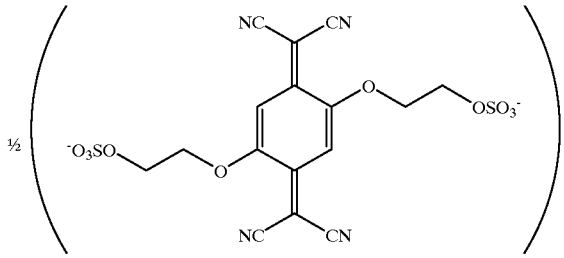
II-34

II-35
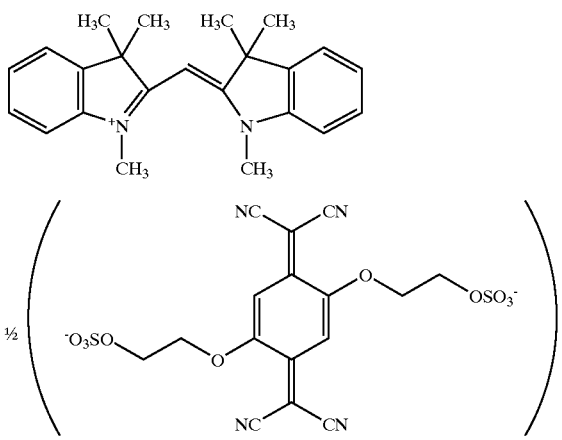
II-36
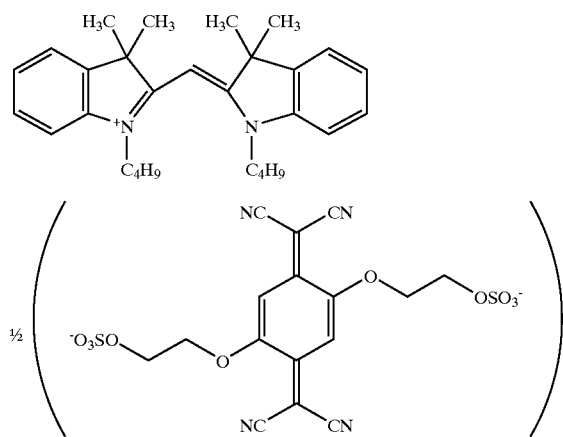
II-37
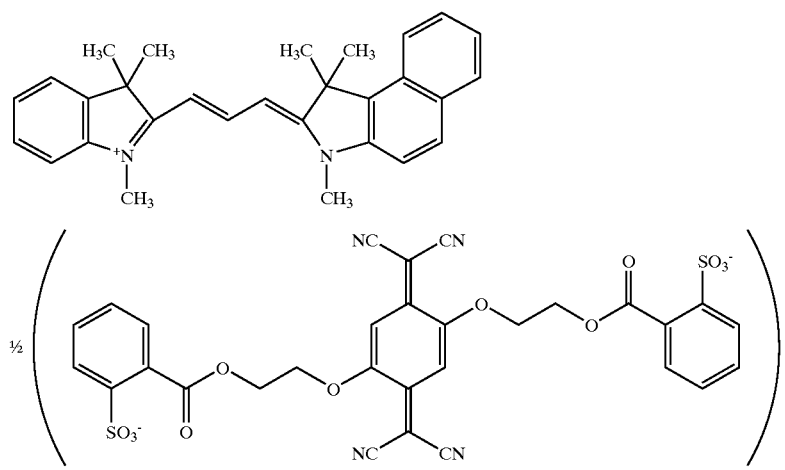
II-38
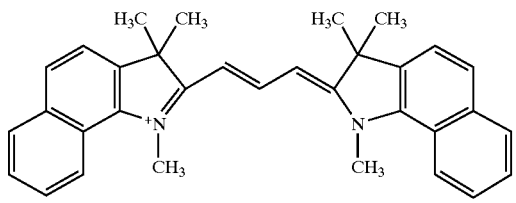

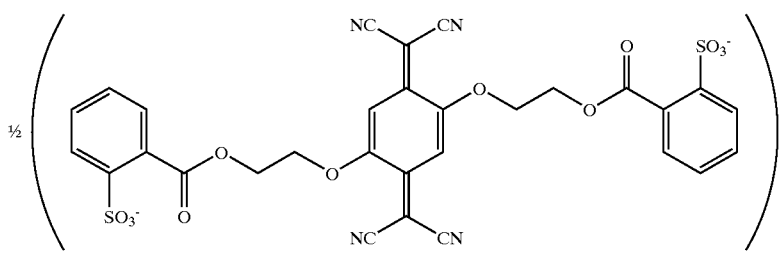
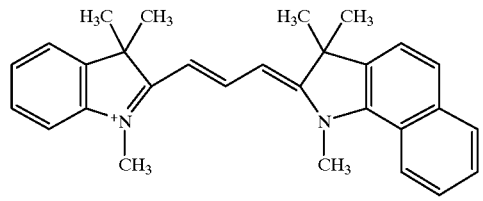
II-39
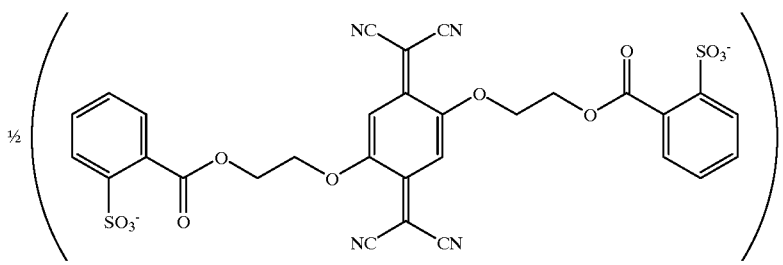
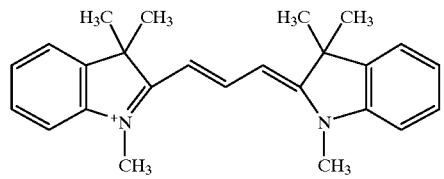
II-40
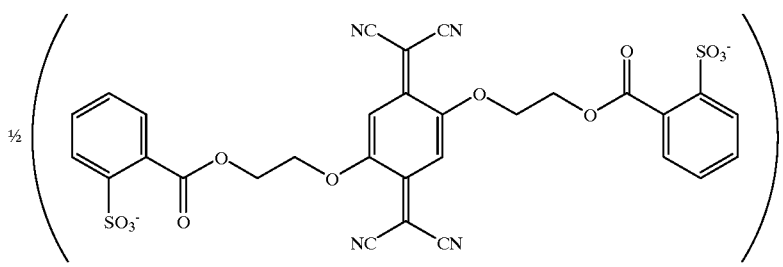
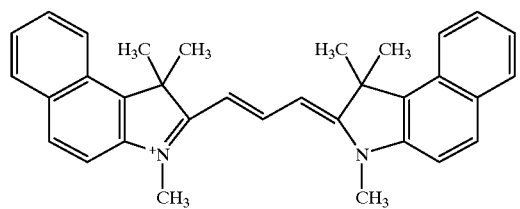
II-41
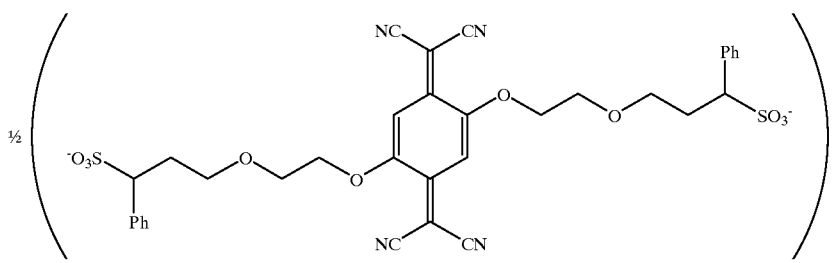

-continued
II-42
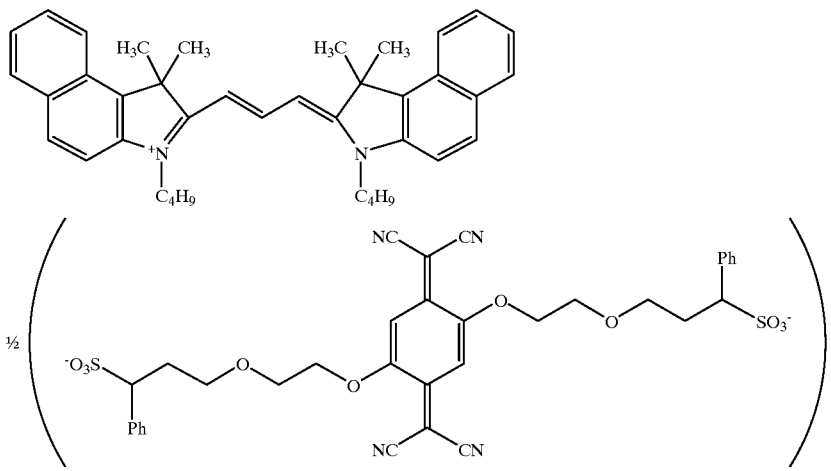
II-43
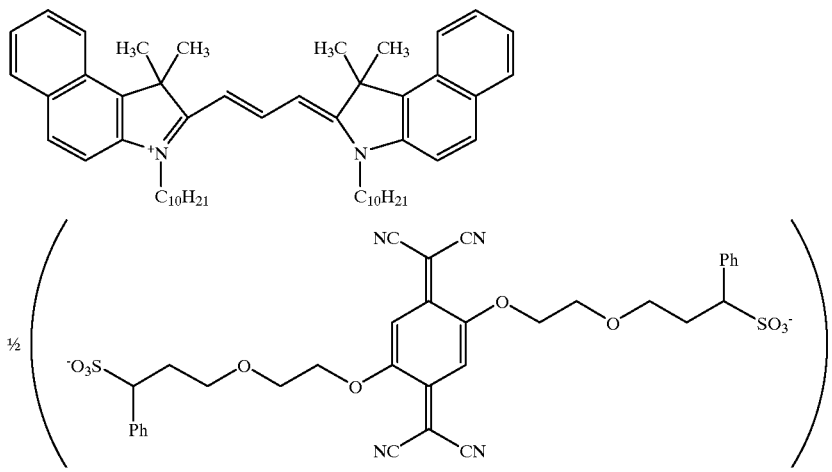
II-44
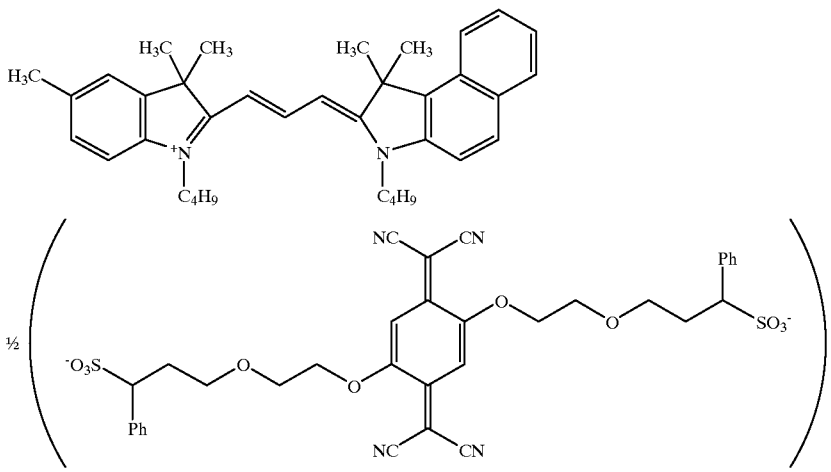
II-45
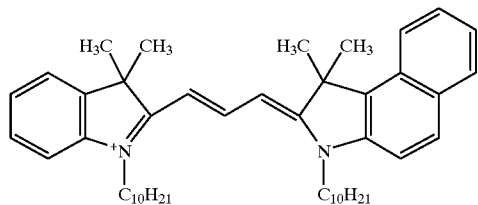

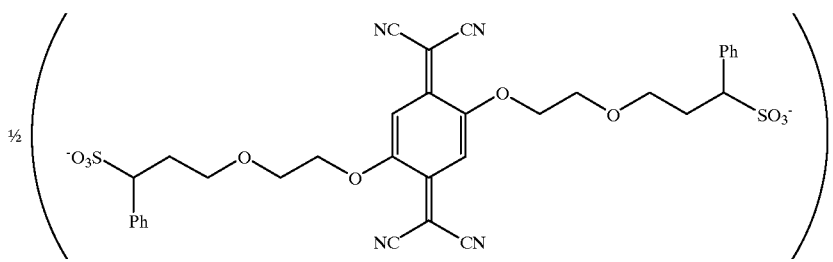
II-46
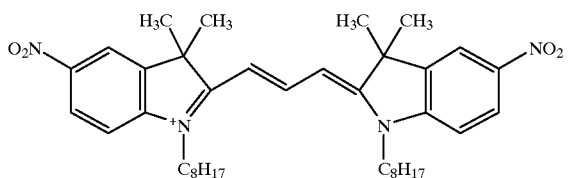
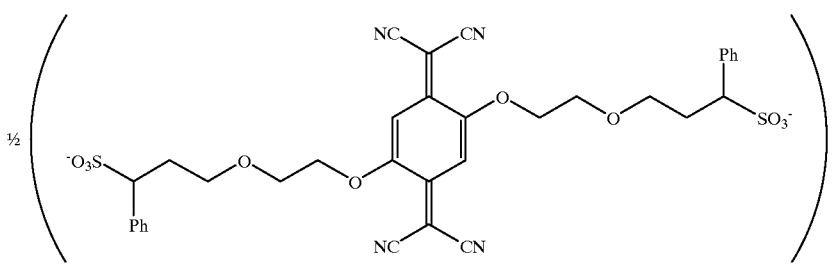
II-47
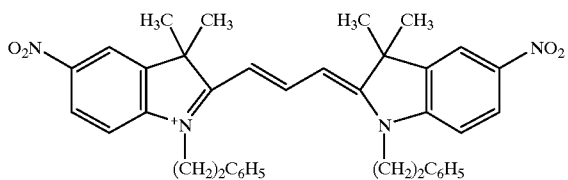
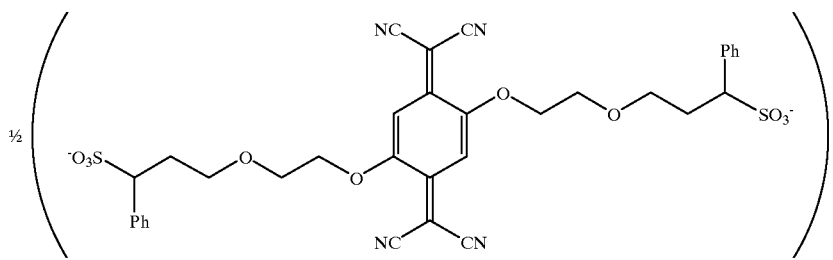
II-48
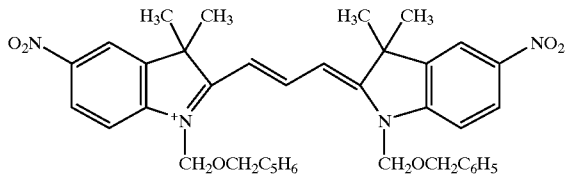
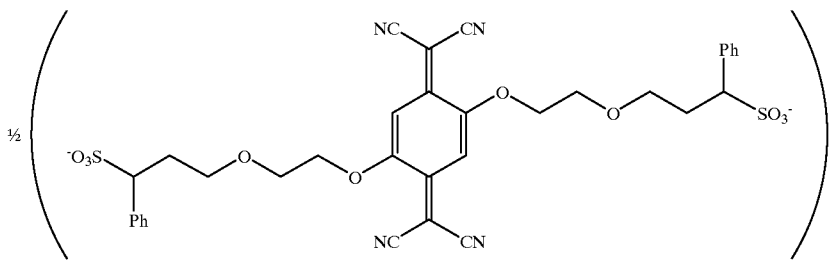

II-49
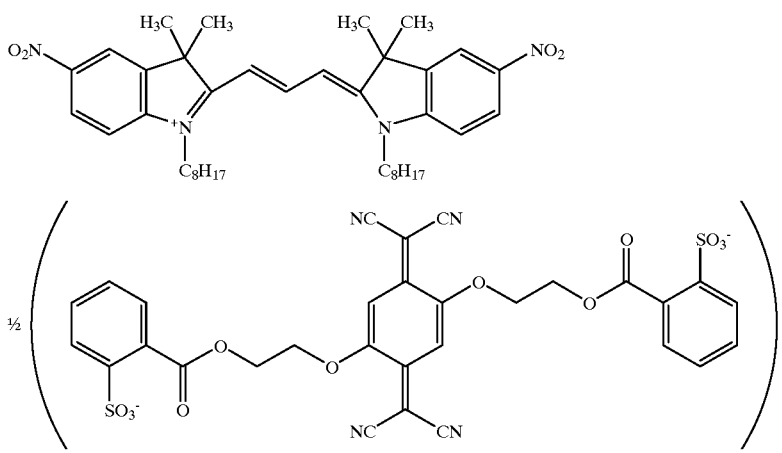
II-50
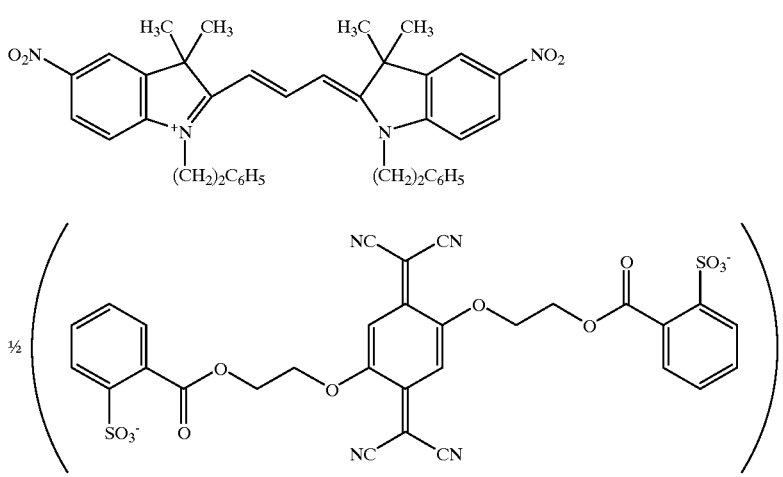
II-51
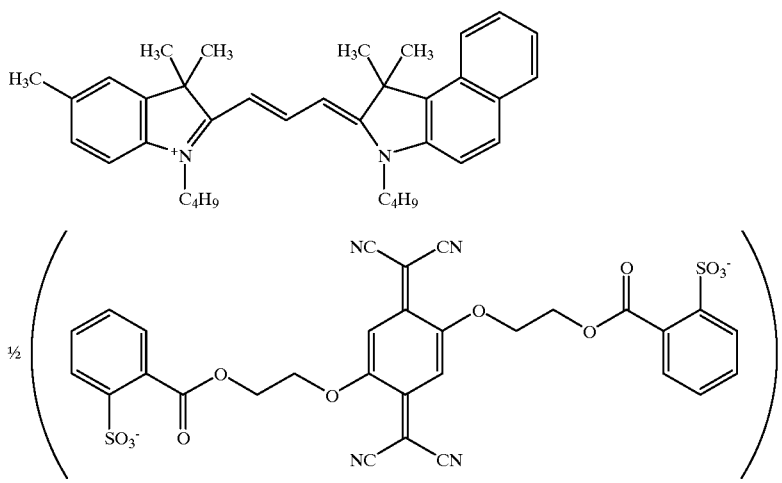
II-52
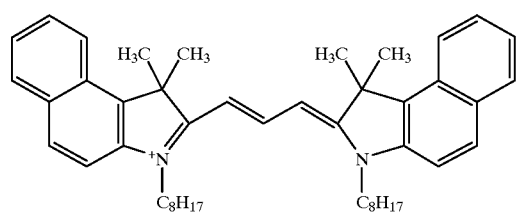

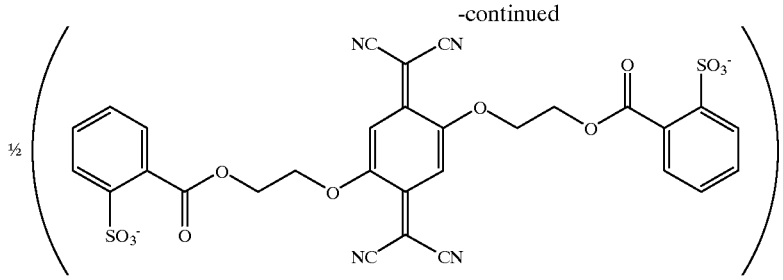
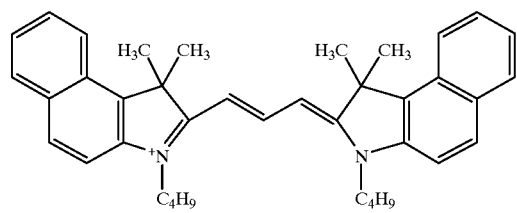
II-53
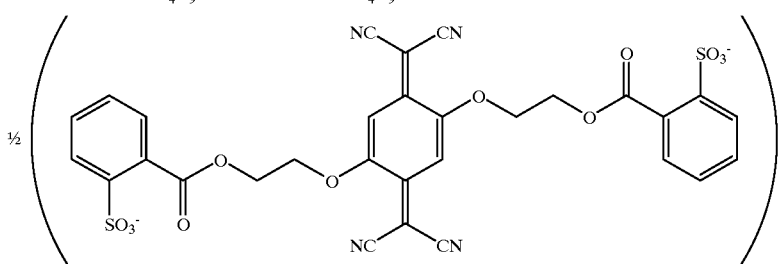
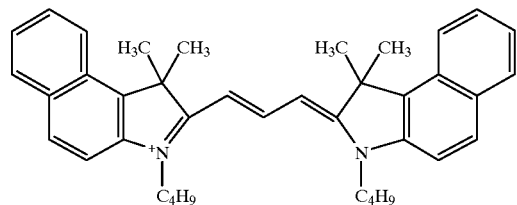
II-54
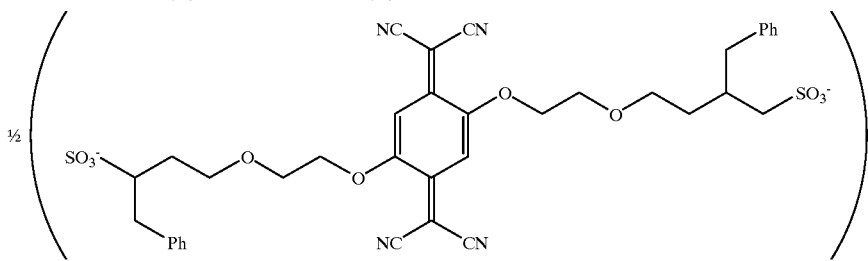
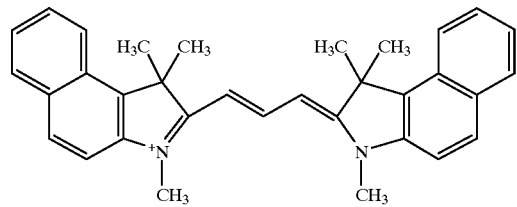
II-55
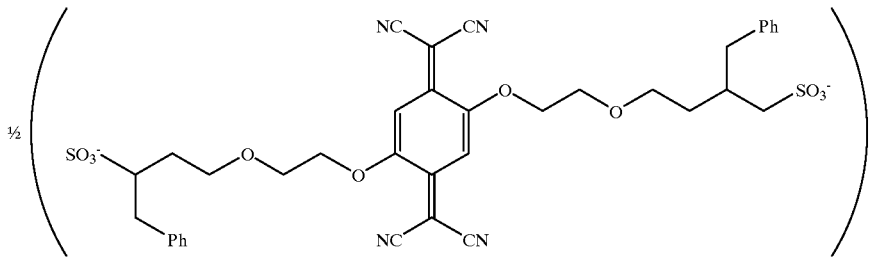

-continued
II-56
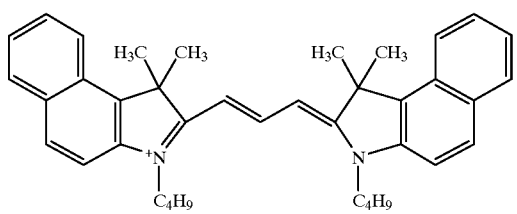
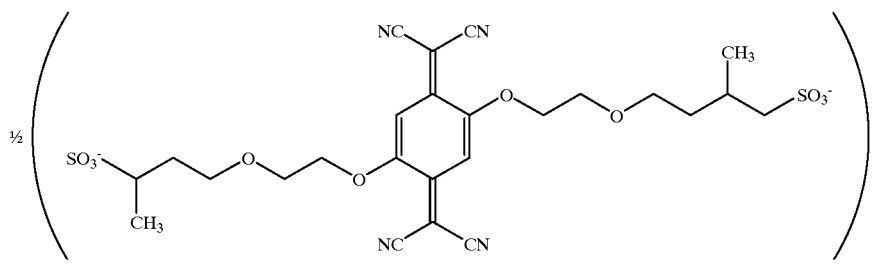
II-57
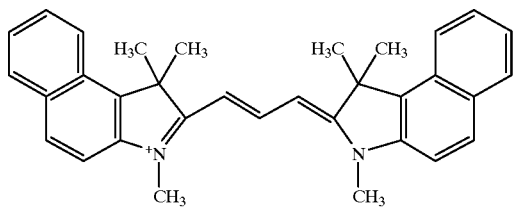
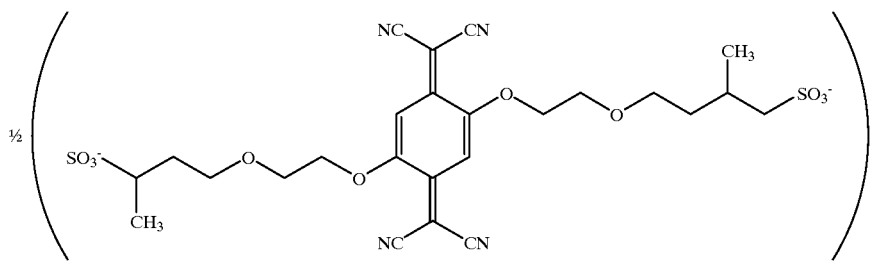
II-58
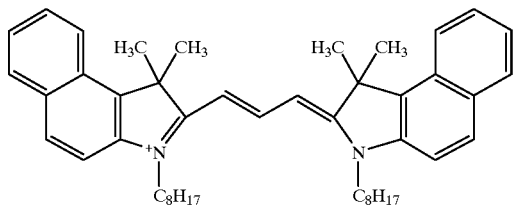
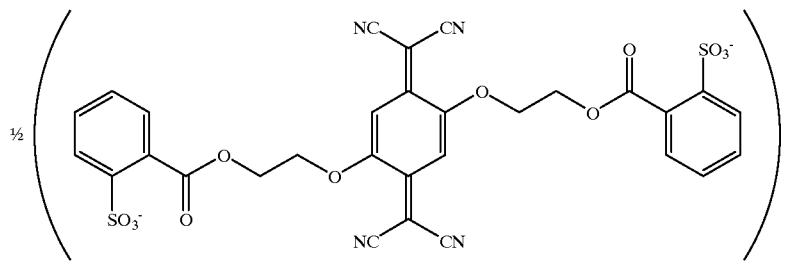

II-59
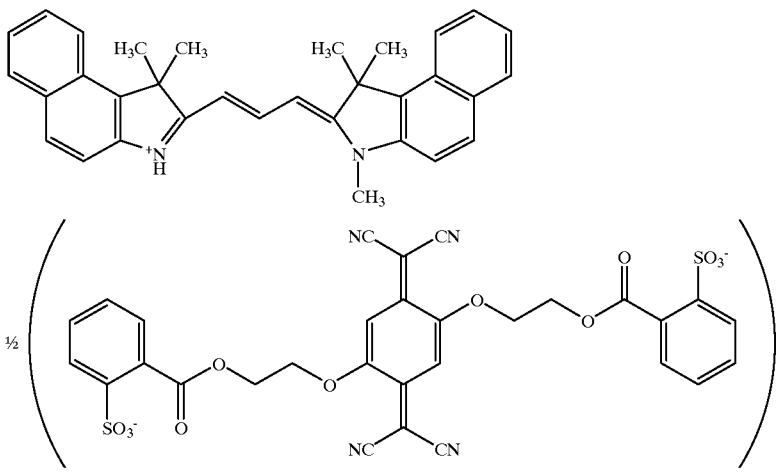
II-60
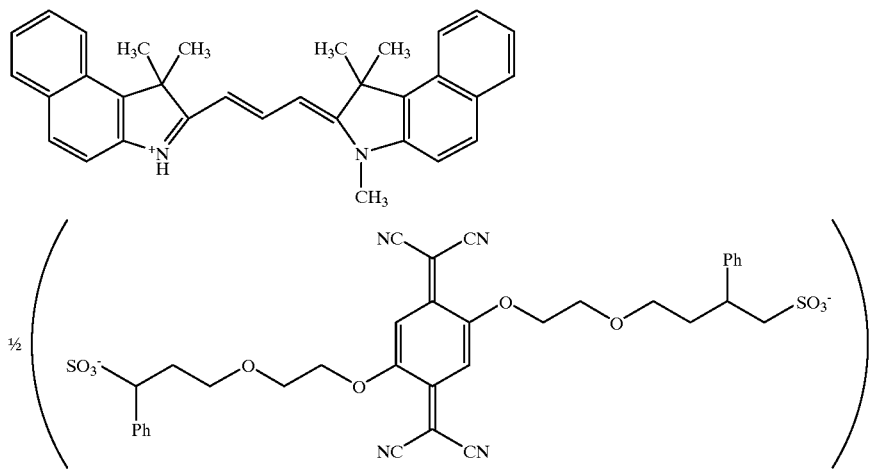
II-61
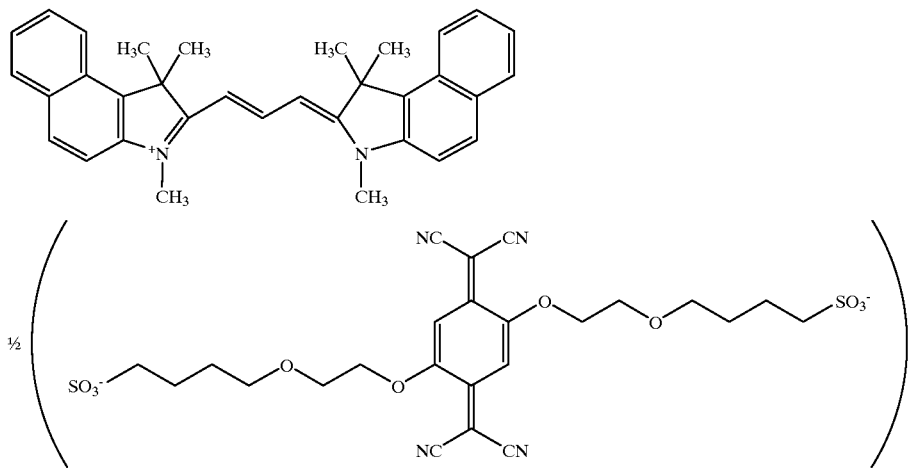
II-62
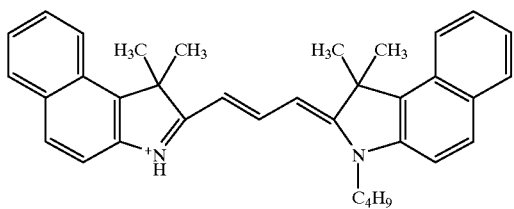

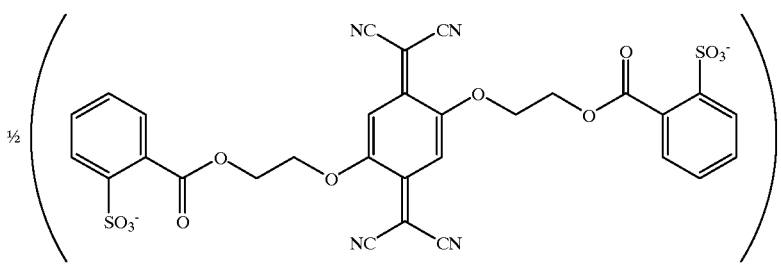
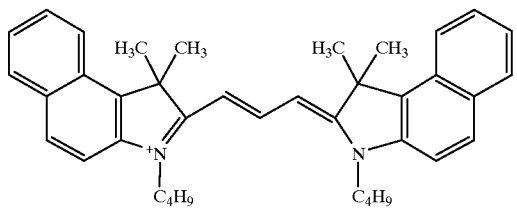
II-63
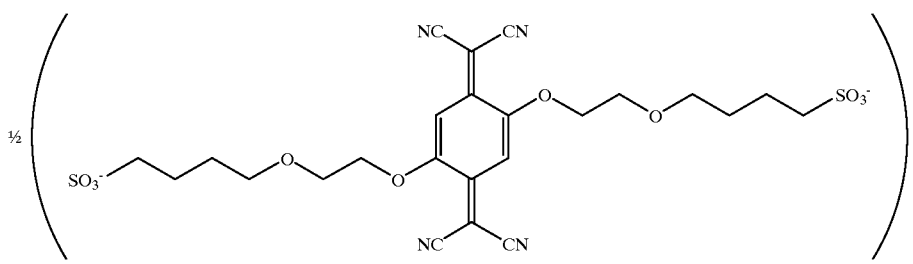
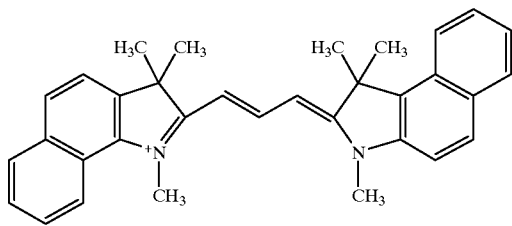
II-64
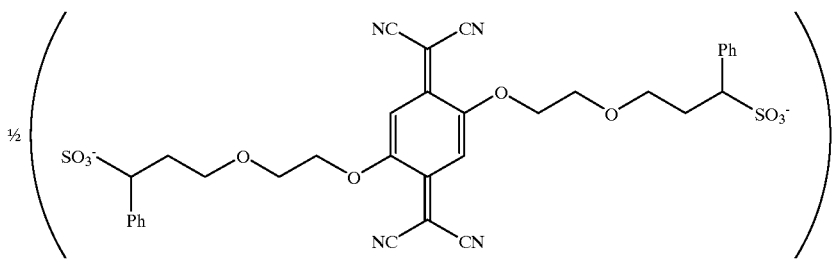
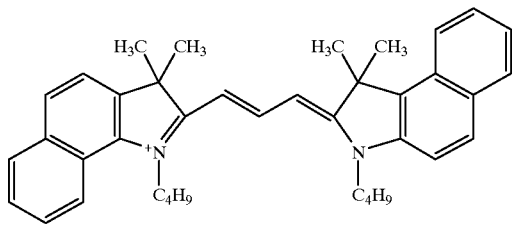
II-65

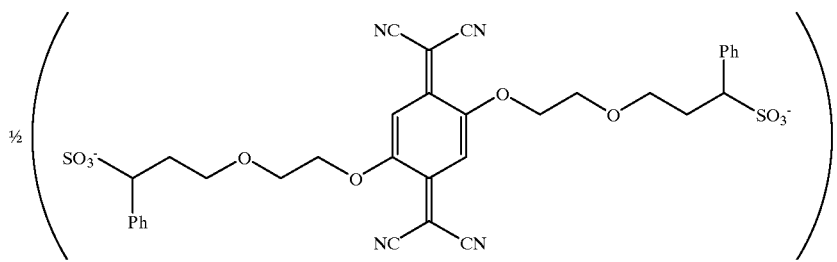
II-66
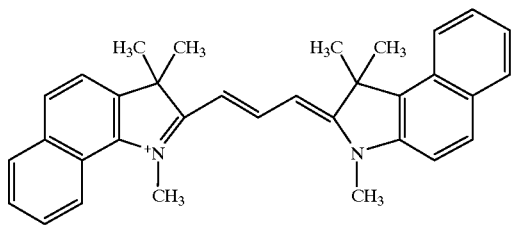
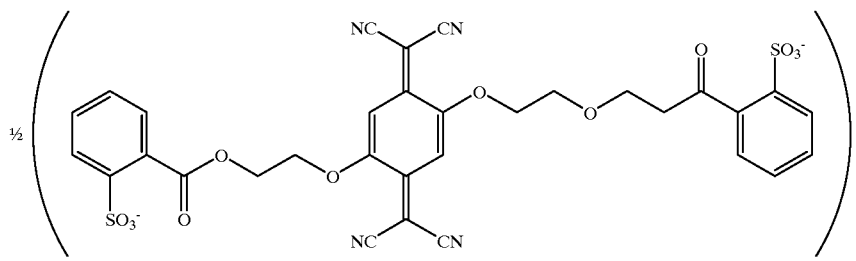
II-67
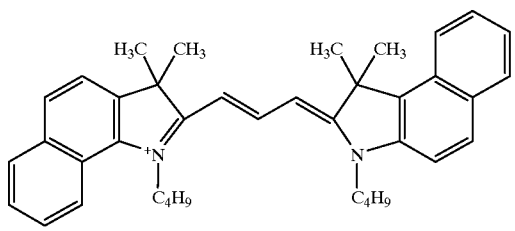
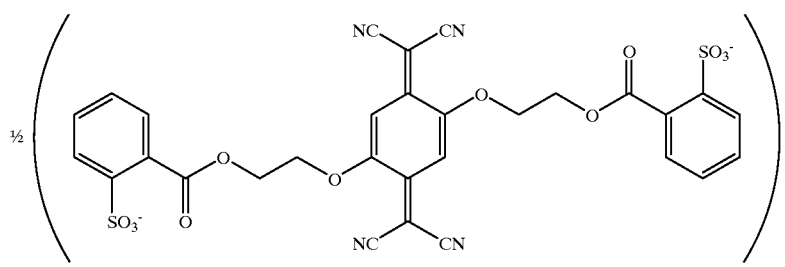
II-68
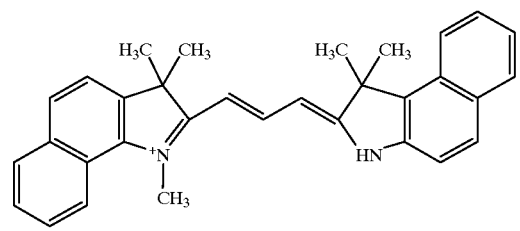

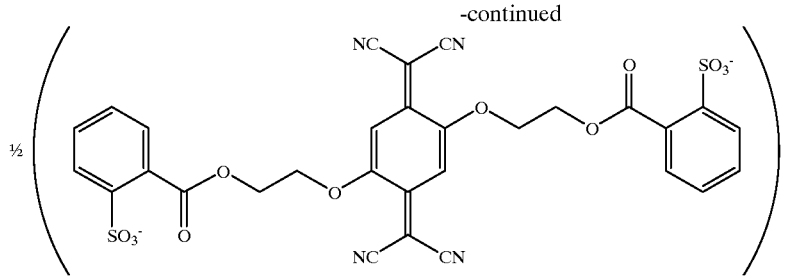
II-69
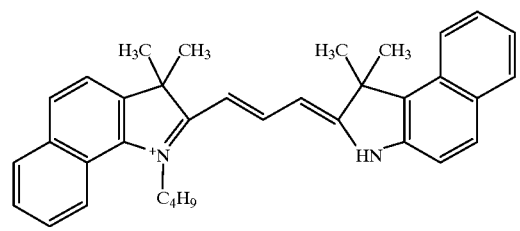
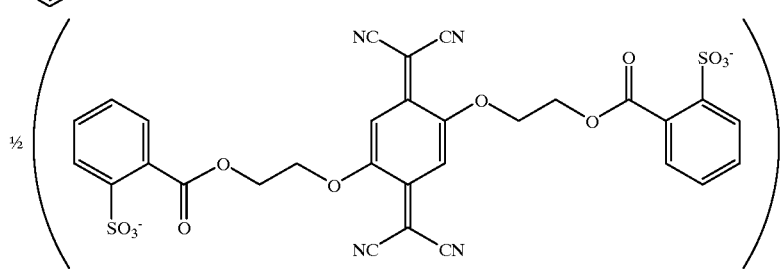
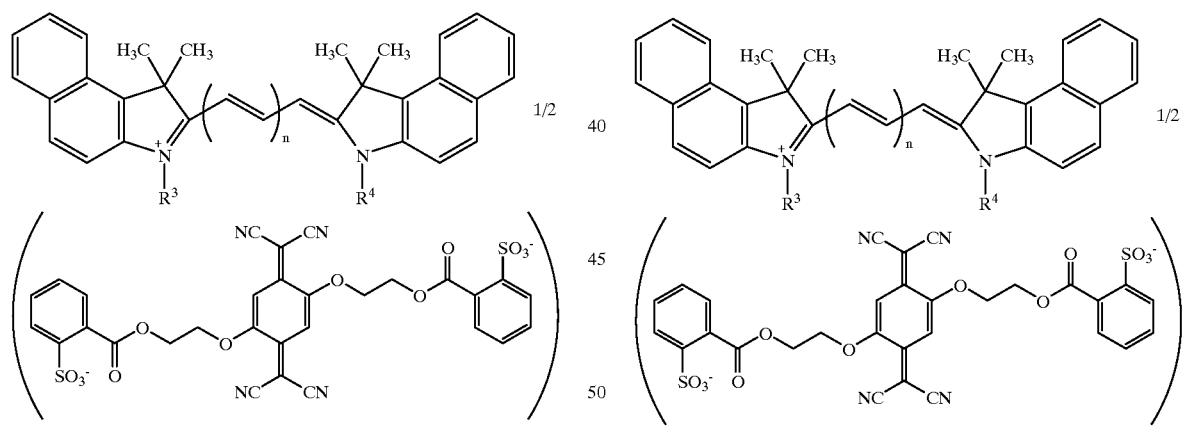
| Complex No. | n | R³ | R⁴ |
|---|---|---|---|
| II-70 | 1 | Et | Et |
| II-71 | 1 | Pr | Pr |
| II-72 | 1 | Pen | Pen |
| II-73 | 1 | Me | Et |
| II-74 | 1 | Me | Pr |
| II-75 | 1 | Me | Bu |
| II-76 | 1 | Me | Pen |
| II-77 | 1 | Et | Pr |
| II-78 | 1 | Et | Bu |
| II-79 | 1 | Et | Pen |
| II-80 | 1 | Pr | Bu |
| II-81 | 1 | Pr | Pen |
| II-82 | 1 | Bu | Pen |
| II-83 | 2 | Et | Pr |
| II-84 | 2 | Pr | Pr |
| II-85 | 2 | Bu | Bu |
| II-86 | 2 | Pen | Pen |
| II-87 | 2 | Me | Et |
| II-88 | 2 | Me | Pr |
| II-89 | 2 | Me | Bu |
| II-90 | 2 | Me | Pen |
| II-91 | 2 | Et | Pr |
| II-92 | 2 | Et | Bu |
| II-93 | 2 | Et | Pen |
| II-94 | 2 | Pr | Bu |
| II-95 | 2 | Pr | Pen |
| II-96 | 2 | Bu | Pen |
Remarks: Me = CH₃, Et = C₂H₅, Pr = C₃H₇, Bu = C₄H₉, Pen = C₅H₁₁

-continued

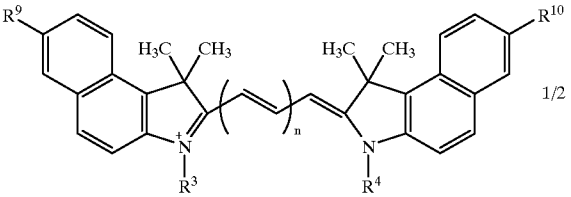

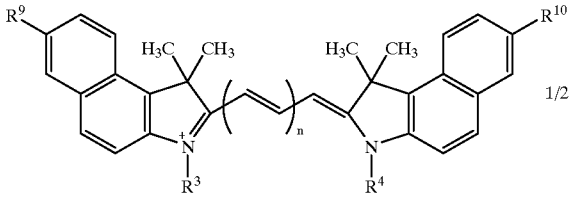

| Complex No. | n | R³ | R⁴ | R⁹ | R¹⁰ |
|---|---|---|---|---|---|
| II-97 | 1 | Me | Me | MeO | MeO |
| II-98 | 1 | Et | Et | MeO | MeO |
| II-99 | 1 | Pr | Pr | MeO | MeO |
| II-100 | 1 | Bu | Bu | MeO | MeO |
| II-101 | 1 | Pen | Pen | MeO | MeO |
| II-102 | 1 | Me | Et | MeO | MeO |
| II-103 | 1 | Me | Pr | MeO | MeO |
| II-104 | 1 | Me | Bu | MeO | MeO |
| II-105 | 1 | Me | Pen | MeO | MeO |
| II-106 | 1 | Et | Pr | MeO | MeO |
| II-107 | 1 | Et | Bu | MeO | MeO |
| II-108 | 1 | Et | Pen | MeO | MeO |
| II-109 | 1 | Pr | Bu | MeO | MeO |
| II-110 | 1 | Pr | Pen | MeO | MeO |
| II-111 | 1 | Bu | Pen | MeO | MeO |
| II-112 | 1 | Me | Me | H | MeO |
| II-113 | 1 | Et | Et | H | MeO |
| II-114 | 1 | Pr | Pr | H | MeO |
| II-115 | 1 | Bu | Bu | H | MeO |
| II-116 | 1 | Pen | Pen | H | MeO |
| II-117 | 1 | Me | Et | H | MeO |
| II-118 | 1 | Me | Pr | H | MeO |
| II-119 | 1 | Me | Bu | H | MeO |
| II-120 | 1 | Me | Pen | H | MeO |
| II-121 | 2 | Me | Me | MeO | MeO |
| II-122 | 2 | Et | Et | MeO | MeO |
| II-123 | 2 | Pr | Pr | MeO | MeO |
| II-124 | 2 | Bu | Bu | MeO | MeO |
| II-125 | 2 | Pen | Pen | MeO | MeO |
| II-126 | 2 | Me | Et | MeO | MeO |
| II-127 | 2 | Me | Pr | MeO | MeO |
| II-128 | 2 | Me | Bu | MeO | MeO |
| II-129 | 2 | Me | Pen | MeO | MeO |
| II-130 | 2 | Me | Me | H | MeO |
| II-131 | 2 | Bu | Bu | H | MeO |
| II-132 | 2 | Me | Bu | H | MeO |
| II-133 | 1 | Me | Me | Me | Me |
| II-134 | 1 | Me | Me | H | Me |
| II-135 | 1 | Bu | Bu | Me | Me |
| II-136 | 1 | Bu | Bu | H | Me |
| II-137 | 1 | Me | Bu | Me | Me |
| II-138 | 1 | Me | Bu | Me | H |
| II-139 | 1 | Me | Me | Cl | Cl |
| II-140 | 1 | Me | Me | H | Cl |
| II-141 | 1 | Bu | Bu | Cl | Cl |
| II-142 | 1 | Bu | Bu | H | Cl |
| II-143 | 1 | Me | Bu | Cl | Cl |
| II-144 | 1 | Me | Bu | Cl | H |
| II-145 | 1 | Me | Me | Br | Br |
| II-146 | 1 | Me | Me | H | Br |
| II-147 | 1 | Bu | Bu | Br | Br |
| II-148 | 1 | Bu | Bu | H | Br |
| II-149 | 1 | Me | Bu | Br | Br |
| II-150 | 1 | Me | Bu | Br | H |
| II-151 | 2 | Me | Me | Me | Me |
| II-152 | 2 | Me | Me | H | Me |
| II-153 | 2 | Bu | Bu | Me | Me |
| II-154 | 2 | Bu | Bu | H | Me |
| II-155 | 2 | Me | Bu | Me | Me |
| II-156 | 2 | Me | Bu | Me | H |
| II-157 | 2 | Me | Me | Cl | Cl |
| II-158 | 2 | Me | Me | H | Cl |
| II-159 | 2 | Bu | Bu | Cl | Cl |
| II-160 | 2 | Bu | Bu | H | Cl |
| II-161 | 2 | Me | Bu | Cl | Cl |
| II-162 | 2 | Me | Bu | Cl | H |
| II-163 | 2 | Me | Me | Br | Br |
| II-164 | 2 | Me | Me | H | Br |
| II-165 | 2 | Bu | Bu | Br | Br |
| II-166 | 2 | Bu | Bu | H | Br |
| II-167 | 2 | Me | Bu | Br | Br |

Remarks: Me = CH₃, Bu = C₄H₉

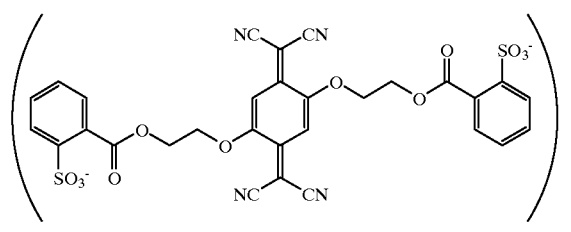

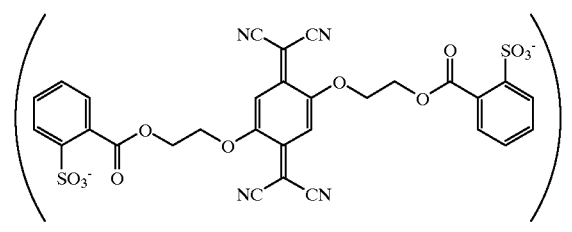

| Complex No. | n | R³ | R⁴ |
|---|---|---|---|
| II-168 | 1 | Et | Et |
| II-169 | 1 | Pr | Pr |
| II-170 | 1 | Pen | Pen |
| II-171 | 1 | Et | Me |
| II-172 | 1 | Pr | Me |
| II-173 | 1 | Bu | Me |
| II-174 | 1 | Pen | Me |
| II-175 | 1 | Me | Et |
| II-176 | 1 | Pr | Et |

-continued

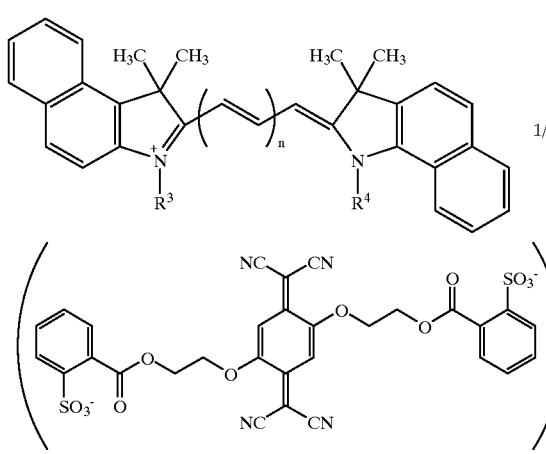

| Complex No. | n | R³ | R⁴ |
|---|---|---|---|
| II-177 | 1 | Bu | Et |
| II-178 | 1 | Pen | Et |
| II-179 | 1 | Me | Pr |
| II-180 | 1 | Et | Pr |
| II-181 | 1 | Bu | Pr |
| II-182 | 1 | Pen | Pr |
| II-183 | 1 | Me | Bu |
| II-184 | 1 | Et | Bu |
| II-185 | 1 | Pr | Bu |
| II-186 | 1 | Pen | Bu |
| II-187 | 1 | Me | Pen |
| II-188 | 1 | Et | Pen |
| II-189 | 1 | Pr | Pen |
| II-190 | 1 | Bu | Pen |
| II-191 | 2 | Et | Et |
| II-192 | 2 | Pr | Pr |
| II-193 | 2 | Pen | Pen |
| II-194 | 2 | Et | Me |
| II-195 | 2 | Pr | Me |
| II-196 | 2 | Bu | Me |
| II-197 | 2 | Pen | Me |
| II-198 | 2 | Me | Et |
| II-199 | 2 | Pr | Et |
| II-200 | 2 | Bu | Et |
| II-201 | 2 | Pen | Et |
| II-202 | 2 | Me | Pr |
| II-203 | 2 | Et | Pr |
| II-204 | 2 | Bu | Pr |
| II-205 | 2 | Pen | Pr |
| II-206 | 2 | Me | Bu |
| II-207 | 2 | Et | Bu |
| II-208 | 2 | Pr | Bu |
| II-209 | 2 | Pen | Bu |
| II-210 | 2 | Me | Pen |
| II-211 | 2 | Et | Pen |
| II-212 | 2 | Pr | Pen |
| II-213 | 2 | Bu | Pen |

Remarks: Me = CH₃, Et = C₂H₅, Pr = C₃H₇, Bu = C₄H₉, Pen = C₅H₁₁

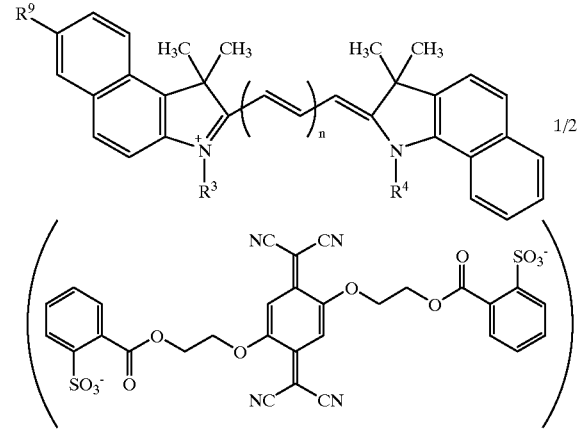

| Complex No. | n | R³ | R⁴ | R⁹ |
|---|---|---|---|---|
| II-216 | 1 | Me | Me | MeO |
| II-217 | 1 | Et | Me | MeO |
| II-218 | 1 | Pr | Me | MeO |
| II-219 | 1 | Bu | Me | MeO |
| II-220 | 1 | Pen | Me | MeO |
| II-221 | 1 | Me | Me | Me |
| II-222 | 1 | Et | Me | Me |
| II-223 | 1 | Pr | Me | Me |
| II-224 | 1 | Bu | Me | Me |
| II-225 | 1 | Pen | Me | Me |
| II-226 | 1 | Me | Me | Cl |
| II-227 | 1 | Et | Me | Cl |
| II-228 | 1 | Pr | Me | Cl |
| II-229 | 1 | Bu | Me | Cl |
| II-230 | 1 | Pen | Me | Cl |

Remarks: Me = CH₃, MeO = CH₃O, Et = C₂H₅, Pr = C₃H₇, Bu = C₄H₉, Pen = C₅H₁₁

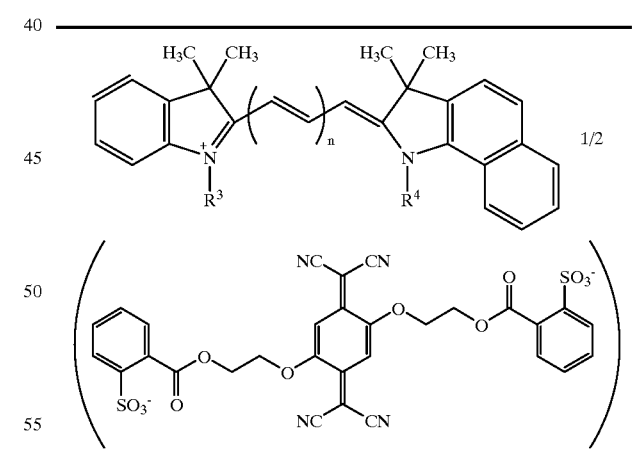

| Complex No. | n | R³ | R⁴ |
|---|---|---|---|
| II-231 | 2 | Et | Et |
| II-232 | 2 | Pr | Pr |
| II-233 | 2 | Bu | Bu |
| II-234 | 2 | Pen | Pen |
| II-235 | 2 | Et | Me |
| II-236 | 2 | Pr | Me |
| II-237 | 2 | Bu | Me |
| II-238 | 2 | Pen | Me |
| II-239 | 2 | Me | Et |
| II-240 | 2 | Pr | Et |

-continued

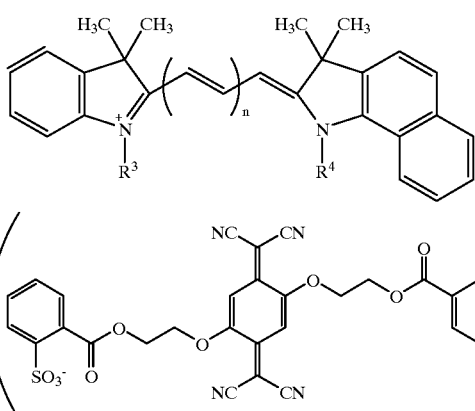

| Complex No. | n | R³ | R⁴ |
|---|---|---|---|
| II-241 | 2 | Bu | Et |
| II-242 | 2 | Pen | Et |
| II-243 | 2 | Me | Pr |
| II-244 | 2 | Et | Pr |
| II-245 | 2 | Bu | Pr |
| II-246 | 2 | Pen | Pr |
| II-247 | 2 | Me | Bu |
| II-248 | 2 | Et | Bu |
| II-249 | 2 | Pr | Bu |
| II-250 | 2 | Pen | Bu |
| II-251 | 2 | Me | Pen |
| II-252 | 2 | Et | Pen |
| II-253 | 2 | Pr | Pen |
| II-254 | 2 | Bu | Pen |
| II-255 | 1 | Et | Et |
| II-256 | 1 | Pr | Pr |
| II-257 | 1 | Bu | Bu |
| II-258 | 1 | Pen | Pen |
| II-259 | 1 | Et | Me |
| II-260 | 1 | Pr | Me |
| II-261 | 1 | Bu | Me |
| II-262 | 1 | Pen | Me |
| II-263 | 1 | Me | Et |
| II-264 | 1 | Pr | Et |
| II-265 | 1 | Bu | Et |
| II-266 | 1 | Pen | Et |
| II-267 | 1 | Me | Pr |
| II-268 | 1 | Et | Pr |
| II-269 | 1 | Bu | Pr |
| II-270 | 1 | Pen | Pr |
| II-271 | 1 | Me | Bu |
| II-272 | 1 | Et | Bu |
| II-273 | 1 | Pr | Bu |
| II-274 | 1 | Pen | Bu |
| II-275 | 1 | Me | Pen |
| II-276 | 1 | Et | Pen |
| II-277 | 1 | Pr | Pen |
| II-278 | 1 | Bu | Pen |

Remarks: Me = CH₃, Et = C₂H₅, Pr = C₃H₇, Bu = C₄H₉, Pen = C₅H₁₁

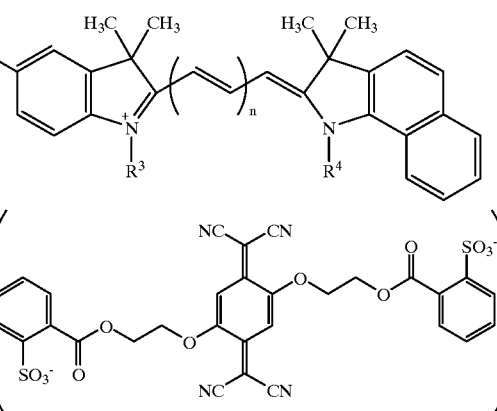

| Complex No. | n | R³ | R⁴ | R⁹ |
|---|---|---|---|---|
| II-279 | 1 | Me | Me | MeO |
| II-280 | 1 | Et | Me | MeO |
| II-281 | 1 | Pr | Me | MeO |
| II-282 | 1 | Bu | Me | MeO |
| II-283 | 1 | Pen | Me | MeO |
| II-284 | 1 | Me | Me | Me |
| II-285 | 1 | Et | Me | Me |
| II-286 | 1 | Pr | Me | Me |
| II-287 | 1 | Bu | Me | Me |
| II-288 | 1 | Pen | Me | Me |
| II-289 | 1 | Me | Me | Cl |
| II-290 | 1 | Et | Me | Cl |
| II-291 | 1 | Pr | Me | Cl |
| II-292 | 1 | Bu | Me | Cl |
| II-293 | 1 | Pen | Me | Cl |
| II-294 | 1 | Me | Me | Br |
| II-295 | 1 | Et | Me | Br |
| II-296 | 1 | Pr | Me | Br |
| II-297 | 1 | Bu | Me | Br |
| II-298 | 1 | Pen | Me | Br |
| II-299 | 2 | Me | Me | MeO |
| II-300 | 2 | Et | Me | MeO |
| II-301 | 2 | Pr | Me | MeO |
| II-302 | 2 | Bu | Me | MeO |
| II-303 | 2 | Pen | Me | MeO |
| II-304 | 2 | Me | Me | Me |
| II-305 | 2 | Et | Me | Me |
| II-306 | 2 | Pr | Me | Me |
| II-307 | 2 | Bu | Me | Me |
| II-308 | 2 | Pen | Me | Me |
| II-309 | 2 | Me | Me | Cl |
| II-310 | 2 | Et | Me | Cl |
| II-311 | 2 | Pr | Me | Cl |
| II-312 | 2 | Bu | Me | Cl |
| II-313 | 2 | Pen | Me | Cl |
| II-314 | 1 | Me | Me | Br |
| II-315 | 2 | Et | Me | Br |
| II-316 | 2 | Pr | Me | Br |
| II-317 | 2 | Bu | Me | Br |
| II-318 | 2 | Pen | Me | Br |

Remarks: Me = CH₃, MeO = CH₃O, Et = C₂H₅, Pr = C₃H₇, Bu = C₄H₉, Pen = C₅H₁₁

| Complex No. | n | R³ | R⁴ | R⁹ |
|---|---|---|---|---|
| II-319 | 1 | Me | Me | MeO |
| II-320 | 1 | Bu | Bu | MeO |
| II-321 | 1 | Me | Bu | MeO |
| II-322 | 1 | Bu | Me | MeO |
| II-323 | 1 | Me | Me | Me |
| II-324 | 1 | Me | Bu | Me |
| II-325 | 1 | Bu | Me | Me |
| II-326 | 1 | Me | Me | Cl |
| II-327 | 1 | Bu | Bu | Cl |
| II-328 | 1 | Me | Bu | Cl |
| II-329 | 1 | Bu | Me | Cl |
| II-330 | 1 | Me | Me | Br |
| II-331 | 1 | Bu | Bu | Br |
| II-332 | 1 | Me | Bu | Br |
| II-333 | 1 | Bu | Me | Br |
| II-334 | 1 | Bu | Bu | H |
| II-335 | 1 | Me | Bu | H |
| II-336 | 1 | Bu | Me | H |
| II-337 | 2 | Me | Me | MeO |
| II-338 | 2 | Bu | Bu | MeO |
| II-339 | 2 | Me | Bu | MeO |
| II-340 | 2 | Bu | Me | MeO |
| II-341 | 2 | Me | Me | Me |
| II-342 | 2 | Bu | Bu | Me |
| II-343 | 2 | Me | Bu | Me |
| II-344 | 2 | Bu | Me | Me |
| II-345 | 2 | Me | Me | Cl |
| II-346 | 2 | Bu | Bu | Cl |
| II-347 | 2 | Me | Bu | Cl |
| II-348 | 2 | Bu | Me | Cl |
| II-349 | 2 | Me | Me | Br |
| II-350 | 2 | Bu | Bu | Br |
| II-351 | 2 | Me | Bu | Br |
| II-352 | 2 | Bu | Me | Br |
| II-353 | 2 | Bu | Bu | H |
| II-354 | 2 | Me | Bu | H |
| II-355 | 2 | Bu | Me | H |

Remarks: Me = CH₃, MeO = CH₃O, Bu = C₄H₉

| Complex No. | n | R³ | R⁴ |
|---|---|---|---|
| II-356 | 1 | Et | Et |
| II-357 | 1 | Pr | Pr |
| II-358 | 1 | Bu | Bu |
| II-359 | 1 | Pen | Pen |
| II-360 | 1 | Me | Et |
| II-361 | 1 | Me | Pr |
| II-362 | 1 | Me | Bu |
| II-363 | 1 | Me | Pen |
| II-364 | 1 | Et | Pr |
| II-365 | 1 | Et | Bu |
| II-366 | 1 | Et | Pen |
| II-367 | 1 | Pr | Bu |
| II-368 | 1 | Pr | Pen |
| II-369 | 1 | Bu | Pen |
| II-370 | 2 | Et | Et |
| II-371 | 2 | Pr | Pr |
| II-372 | 2 | Bu | Bu |
| II-373 | 2 | Pen | Pen |
| II-374 | 2 | Me | Et |
| II-375 | 2 | Me | Pr |
| II-376 | 2 | Me | Bu |
| II-377 | 2 | Me | Pen |
| II-378 | 2 | Et | Pr |
| II-379 | 2 | Et | Bu |
| II-380 | 2 | Et | Pen |
| II-381 | 2 | Pr | Bu |
| II-382 | 2 | Pr | Pen |
| II-383 | 2 | Bu | Pen |

Remarks: Me = CH₃, Et = C₂H₅, Pr = C₃H₇, Bu = C₄H₉, Pen = C₅H₁₁

The tetracyanoquinodimethane (TCNQ) derivative of the formal (IX) in which the cation is hydrogen can be prepared from the below-illustrated TCNQ derivative (A) by known reactions such as esterification using a sulfamic acid, a sulfonic acid-substituted carboxylic acid or its acid anhydride:

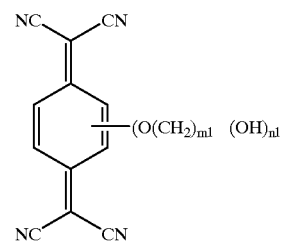

(A)

[each of ml and nl is an integer of 1 to 4]

Examples of syntheses of tetracyanoquinodimethane (TCNQ) derivatives of the formula (IX) in which the cation is hydrogen are described below.

[Synthesis of TCNQ derivative (1)]

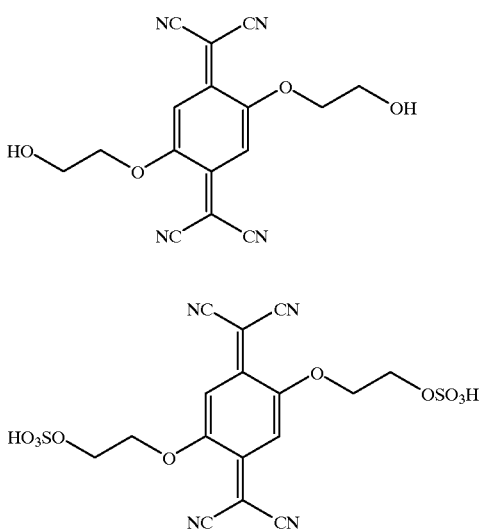

Acetonitrile (40 mL) in which the compound (B) (2.6 g, 8.0 mmol.) and sulfamic acid (1.8 g, 0.019 mmol.) were suspended was refluxed for 8 hrs., and cooled to room temperature. A yellow precipitate was collected by filtration and washed with acetonitrile (200 mL), to give 3.7 g of the TCNQ derivative (1), yield: 77%.

$^1$H-NMR (D$_2$O): 6.5 (s, 2H), 4.7 (t, 4H), 4.5 (t, 4H)

[Synthesis of TCNQ derivative (23)]

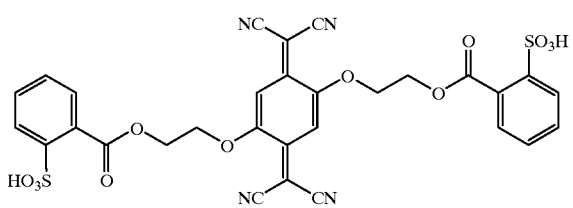

Acetonitrile (40 mL) in which the compound (B) (1.3 g, 4.0 mmol.) and sulfobenzoic anhydride (5.1 g, 0.028 mmol.) were suspended was refluxed for 8 hrs., and cooled to room temperature. A orange precipitate was collected by filtration and washed with acetonitrile (200 mL), to give 2.7 g of the TCNQ derivative (23), yield: 98%.

$^1$H-NMR (D$_2$O) 7.9 (m, 2H), 7.6 (m, 6H), 6.4 (s, 2H), 4.7 (t, 4H), 4.5 (t, 4H)

The dye complex of the formula (I) according to the invention can be prepared by subjecting a dye (such as a cyanine dye) and the TCNQ derivative to salt exchange reaction in water or an organic solvent (e.g., acetone, methanol, ethanol, isopropanol, or dimethylformamide).

[Preparation of Cyanine/TCNQ Derivative Complex (II-1)]

Cyanine compound (C)

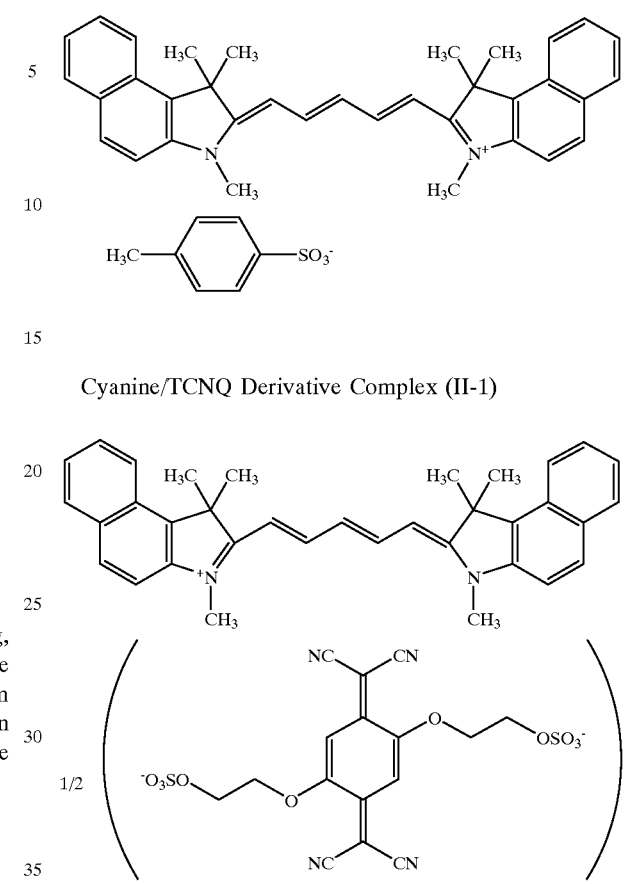

Cyanine/TCNQ Derivative Complex (II-1)

In methanol (20 mL) was placed the cyanine compound (C) (1.0 g, 1.5 mmol.) at 60° C., and the mixture was stirred. Into the resulting homogeneous solution was dropwise added an aqueous solution of the TCNQ derivative (1) (0.48 g, 1.0 mmol.) in water (10 mL). The mixture was stirred for 6 hrs., at the same temperature. The green crystalline precipitate was collected by filtration, washed with water and methanol, and dried, to give 0.82 g of the desired complex, yield 75%.

$^1$H-NMR (DMSO-d$_6$): 8.5 (t, 2H), 8.3 (d, 2H), 8.1 (t, 4H), 7.8 (d, 2H), 7.7 (t, 2H), 7.6 (t, 2H), 6.6 (t, 1H), 6.4 (d, 2H), 4.6 (broad, 2H), 4.2 (broad, 2H), 3.8 (s, 6H), 2.0 (s, 12H)

[Preparation of Cyanine/TCNQ Derivative Complex (II-5)]

Cyanine/TCNQ derivative complex (II-5)

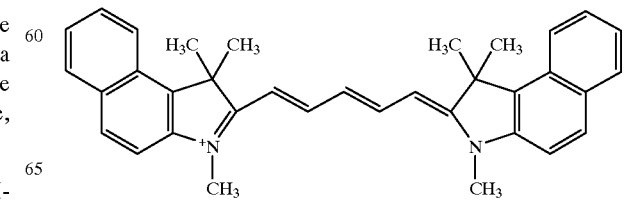

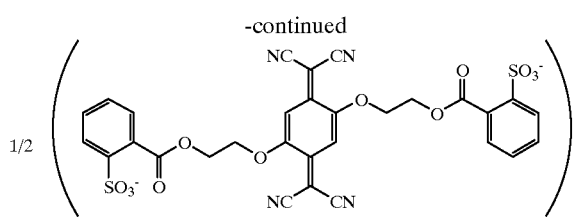

In methanol (20 mL) was placed the cyanine compound (C) (1.0 g, 1.5 mmol.) at 60° C., and the mixture was stirred. Into the resulting homogeneous solution was dropwise added an aqueous solution of the TCNQ derivative (23) (0.62 g, 0.9 mmol.) in water (10 mL). The mixture was stirred for 4 hrs., at the same temperature. The green crystalline precipitate was collected by filtration, washed with methanol, and dried, to give 1 g of the desired complex, yield 80%.

$^1$H-NMR (DMSO-$d_6$): 8.5 (t, 2H), 8.3 (d, 2H), 8.1 (t, 4H), 7.8 (m, 5H), 7.4 (m, 5H), 6.6 (t, 1H), 6.4 (m, 3H), 4.4–4.6 (broad, 4H), 3.7 (s, 6H), 1.9 (s, 12H)

[Preparation of Cyanine/TCNQ Derivative Complex (II-7)]

Cyanine compound (D)

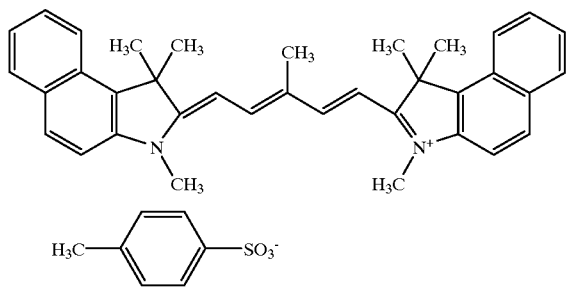

Cyanine/TCNQ derivative complex (II-7)

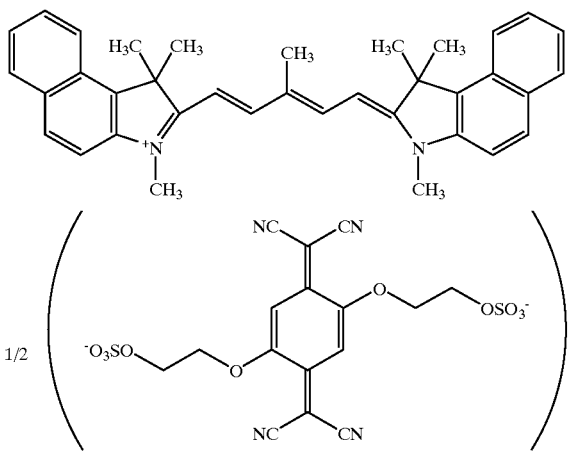

In methanol (20 mL) was placed the cyanine compound (D) (1.0 g, 1.5 mmol.) at room temperature, and the mixture was stirred. Into the resulting homogeneous solution was dropwise added an aqueous solution of the TCNQ derivative (1) (0.48 g, 1.0 mmol.) in water (10 mL). The mixture was stirred for 6 hrs., at room temperature. The green crystalline precipitate was collected by filtration, washed with water and methanol, and dried, to give 0.90 g of the desired complex, yield 81%.

$^1$H-NMR (DMSO-$d_6$): 8.3 (m, 4 H), 8.1 (t, 4 H), 7.8 (d, 2H), 7.7 (t, 2H), 7.5 (t, 2H), 6.2 (d, 2H), 4.6 (broad, 2H), 4.2 (broad, 2H), 3.8 (s, 6 H) 2.2 (s, 3 H), 2.0 (s, 12H)

[Preparation of Cyanine/TCNQ Derivative Complex (IT-9)]

Cyanine/TCNQ derivative complex (II-9)

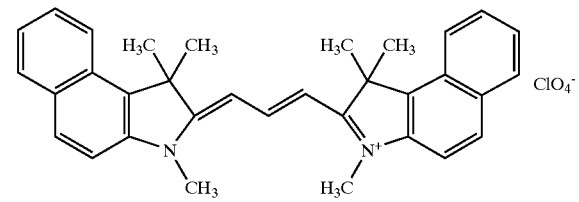

In methanol (20 mL) was placed the cyanine compound (D) (1.0 g, 1.5 mmol.) at room temperature, and the mixture was stirred. Into the resulting homogeneous solution was dropwise added an aqueous solution of the TCNQ derivative (23) (0.62 g, 0.9 mmol) in water (10 mL). The mixture was stirred for 2 hrs., at the same temperature. The green crystalline precipitate was collected by filtration, washed with methanol, and dried, to give 1.2 g of the desired complex, yield 95%.

$^1$H-NMR (DMSO-$d_6$): 8.5 (d, 2H), 8.3 (d, 2H), 8.1 (t, 4H), 7.7 (m, 5H), 7.4 (m, 5H), 6.3 (broad, 1H), 6.2 (d, 2H), 4.4–4.6 (broad, 4H), 3.7 (s, 6H), 2.1 (s, 3H), 1.9 (s 12H)

[Preparation of Cyanine /TCNQ Derivative Complex (II-21)]

Cyanine compound (E)

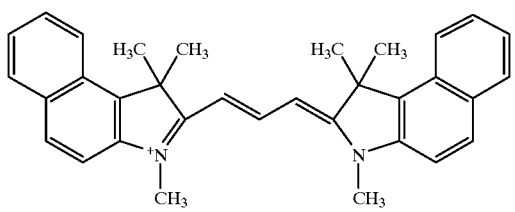

Cyanine/TCNQ derivative complex (II-21)

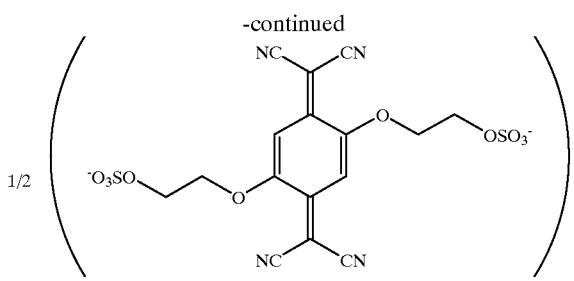

In acetone (20 mL) was placed the cyanine compound (E) (0.26 g, 0.5 mmol.) at 60° C., and the mixture was stirred. Into the resulting homogeneous solution was dropwise added an aqueous solution of the TCNQ derivative (1) (0.15 g, 0.3 mmol.) in water (10 mL). The mixture was stirred for 6 hrs., at room temperature. The gold crystalline precipitate was collected by filtration, washed with water and acetone, and dried, to give 0.21 g of the desired complex, yield 64%.

$^1$H-NMR (DMSO-$d_6$): 8.6 (t, 1H), 8.3 (d, 2H), 8.1 (t, 4H), 7.8 (d, 2H), 7.7 (t, 2H), 7.5 (t, 2H), 6.5 (d, 2H), 6.4 (broad, 2H), 4.4 (broad, 2H), 4.2 (broad, 2H), 3.8 (s, 6H), 2.0 (s, 12H)

[Preparation of Cyanine/TCNQ Derivative Complex (II-32)]

Cyanine compound (F)

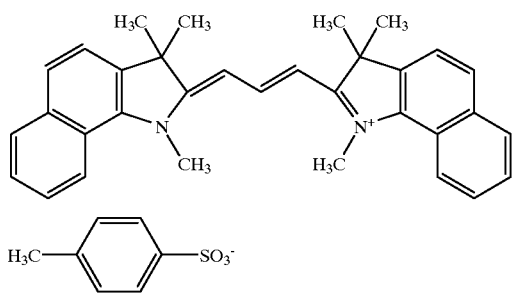

Cyanine/TCNQ derivative complex (II-32)

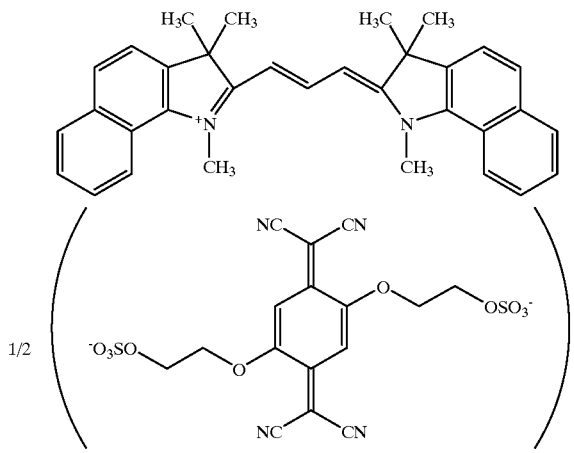

In methanol (20 mL) was placed the cyanine compound (F) (0.63 g, 1.0 mmol.) at room temperature, and the mixture was stirred. Into the resulting homogeneous solution was dropwise added an aqueous solution of the TCNQ derivative (1) (0.34 g, 0.7 mmol.) in water (10 mL). The mixture was stirred for 6 hrs., at room temperature. The green crystalline precipitate was collected by filtration, washed with water and methanol, and dried, to give 0.61 g of the desired complex, yield 87%.

$^1$H-NMR (DMSO-$d_6$): 8.7 (d, 2H), 8.5 (t, 1H) 8.1 (d, 2H), 7.9 (d, 2H), 7.8 (d, 2H), 7.6 (m, 4H), 6.7 (d, 2H), 6.4 (broad, 1H), 4.4 (broad, 2H), 4.3 (s, 6H), 4.2 (broad, 2H), 1.8 (s, 12H)

[Preparation of Cyanine/TCNQ Derivative Complex (II-97)]

Cyanine compound (G)

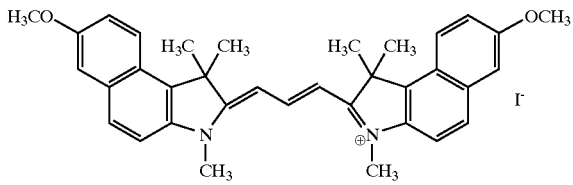

Cyanine/TCNQ derivative complex (II-97)

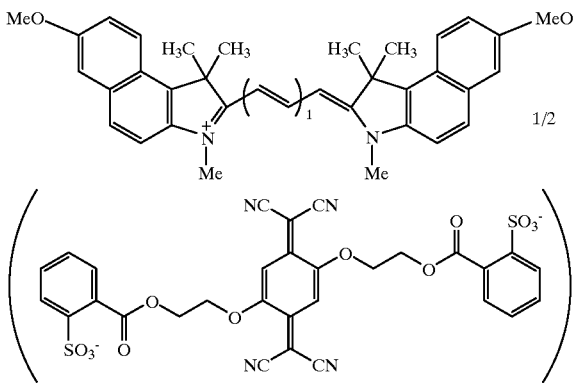

In methanol (30 mL) was placed the cyanine compound (G) (0.97 g, 1.5 mmol.) at room temperature, and the mixture was stirred. Into the resulting homogeneous solution was dropwise added an aqueous solution of the TCNQ derivative (23) (1.0 g, 1.0 mmol.) in water (30 mL). The mixture was stirred for 6 hrs., at room temperature. The blue crystalline precipitate was collected by filtration, washed with water and methanol, and dried, to give 0.84 g of the desired complex, yield 65%.

$^1$H-NMR (DMSO-$d_6$): 8.6 (dd, 1H), 8.2 (d, 2H), 8.0 (d, 2H), 7.8 (m, 3H), 7.4 (m, 5H), 7.3 (dd, 2H), 6.5 (d, 2H), 6.4 (s, 1H), 4.6 (broad, 2H), 4.4 (broad, 2H), 3.9 (s, 6H), 2.0 (s, 12H)

$\lambda_{max}$: 598 nm (in methanol)

[Preparation of Cyanine/TCNQ Derivative Complex (II-289)]

Cyanine compound (H)

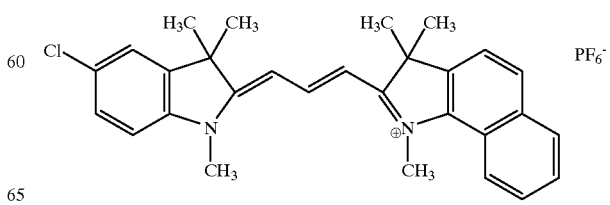

Cyanine/TCNQ derivative complex (II-289)

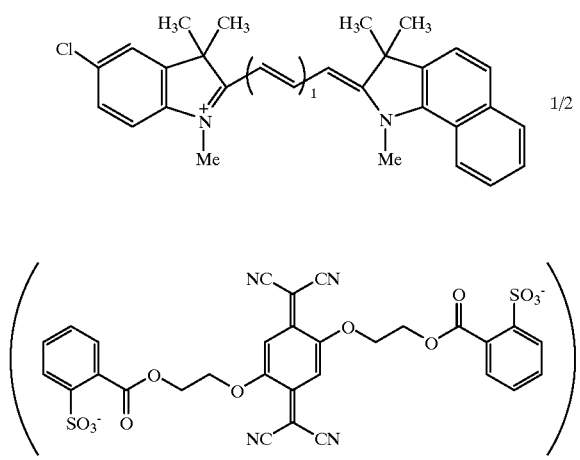

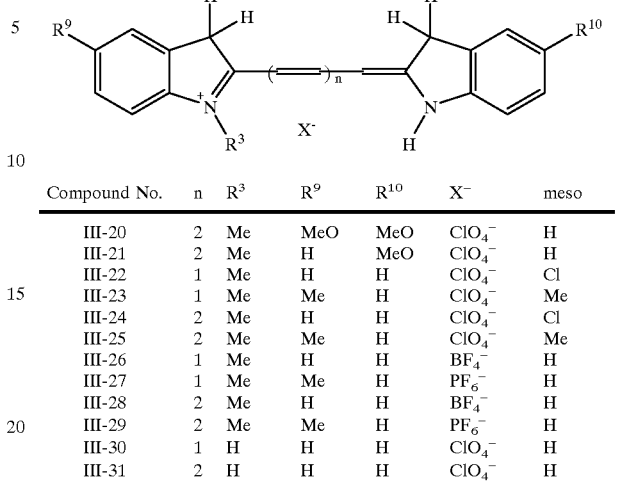

In acetone (30 mL) was placed the cyanine compound (H) (0.88 g, 1.5 mmol.) at room temperature, and the mixture was stirred. Into the resulting homogeneous solution was dropwise added an aqueous solution of the TCNQ derivative (23) (1.0 g, 1.0 mmol.) in water (30 mL). The mixture was stirred for 6 hrs., at room temperature. The green crystalline precipitate was collected by filtration, washed with water and acetone, and dried, to give 0.82 g of the desired complex, yield 70%.

$^1$H-NMR (DMSO-$d_6$): 8.7 (d, 1H), 8.5 (dd, 1H), 8.1 (d, 1H), 8.0 (d, 1H), 7.4–7.8 (m, 10H), 6.7 (d, 1H), 6.5 (d, 1H), 6.4 (s, 1H), 4.6 (broad, 2H), 4.4 (broad, 2H), 4.2 (s, 3H), 3.6 (s, 3H), 1.8 (s, 6H), 1.7 (s, 6H)

$\lambda_{max}$: 575 nm (in methanol)

Some of the cyanine dyes of the invention employable for preparing a cyanine dye/cation complex in which the cation is hydrogen are novel. Examples of the novel cyanine dyes are set forth below.

| Compound No. | n | $R^3$ | $R^9$ | $R^{10}$ | $X^-$ | meso |
|---|---|---|---|---|---|---|
| III-1 | 0 | Me | H | H | $ClO_4^-$ | H |
| III-2 | 0 | Me | Me | H | $ClO_4^-$ | H |
| III-3 | 0 | Me | Me | Me | $ClO_4^-$ | H |
| III-4 | 0 | Me | H | Me | $ClO_4^-$ | H |
| III-5 | 0 | Me | MeO | H | $ClO_4^-$ | H |
| III-6 | 0 | Me | MeO | MeO | $ClO_4^-$ | H |
| III-7 | 0 | Me | H | MeO | $ClO_4^-$ | H |
| III-8 | 1 | Me | H | H | $ClO_4^-$ | H |
| III-9 | 1 | Me | Me | H | $ClO_4^-$ | H |
| III-10 | 1 | Me | Me | Me | $ClO_4^-$ | H |
| III-11 | 1 | Me | H | Me | $ClO_4^-$ | H |
| III-12 | 1 | Me | MeO | H | $ClO_4^-$ | H |
| III-13 | 1 | Me | MeO | MeO | $ClO_4^-$ | H |
| III-14 | 1 | Me | H | MeO | $ClO_4^-$ | H |
| III-15 | 2 | Me | H | H | $ClO_4^-$ | H |
| III-16 | 2 | Me | Me | H | $ClO_4^-$ | H |
| III-17 | 2 | Me | Me | Me | $ClO_4^-$ | H |
| III-18 | 2 | Me | H | Me | $ClO_4^-$ | H |
| III-19 | 2 | Me | MeO | H | $ClO_4^-$ | H |
| III-20 | 2 | Me | MeO | MeO | $ClO_4^-$ | H |
| III-21 | 2 | Me | H | MeO | $ClO_4^-$ | H |
| III-22 | 1 | Me | H | H | $ClO_4^-$ | Cl |
| III-23 | 1 | Me | Me | H | $ClO_4^-$ | Me |
| III-24 | 2 | Me | H | H | $ClO_4^-$ | Cl |
| III-25 | 2 | Me | Me | H | $ClO_4^-$ | Me |
| III-26 | 1 | Me | H | H | $BF_4^-$ | H |
| III-27 | 1 | Me | Me | H | $PF_6^-$ | H |
| III-28 | 2 | Me | H | H | $BF_4^-$ | H |
| III-29 | 2 | Me | Me | H | $PF_6^-$ | H |
| III-30 | 1 | H | H | H | $ClO_4^-$ | H |
| III-31 | 2 | H | H | H | $ClO_4^-$ | H |

Remarks: Me = $CH_3$, MeO = $CH_3O$, meso: substituent at meso

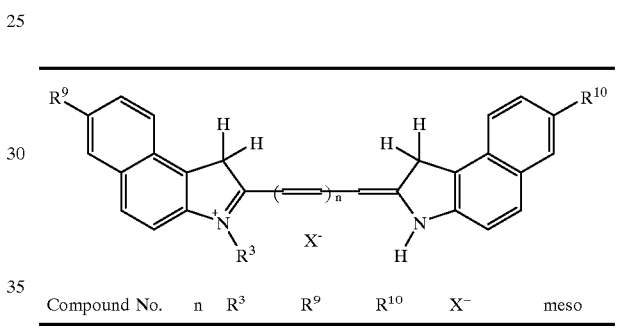

| Compound No. | n | $R^3$ | $R^9$ | $R^{10}$ | $X^-$ | meso |
|---|---|---|---|---|---|---|
| IV-1 | 0 | Me | H | H | $ClO_4^-$ | H |
| IV-2 | 0 | Me | Me | H | $ClO_4^-$ | H |
| IV-3 | 0 | Me | Me | Me | $ClO_4^-$ | H |
| IV-4 | 0 | Me | H | Me | $ClO_4^-$ | H |
| IV-5 | 0 | Me | MeO | H | $ClO_4^-$ | H |
| IV-6 | 0 | Me | MeO | MeO | $ClO_4^-$ | H |
| IV-7 | 0 | Me | H | MeO | $ClO_4^-$ | H |
| IV-8 | 1 | Me | H | H | $ClO_4^-$ | H |
| IV-9 | 1 | Me | Me | H | $ClO_4^-$ | H |
| IV-10 | 1 | Me | Me | Me | $ClO_4^-$ | H |
| IV-11 | 1 | Me | H | Me | $ClO_4^-$ | H |
| IV-12 | 1 | Me | MeO | H | $ClO_4^-$ | H |
| IV-13 | 1 | Me | MeO | MeO | $ClO_4^-$ | H |
| IV-14 | 1 | Me | H | MeO | $ClO_4^-$ | H |
| IV-15 | 2 | Me | H | H | $ClO_4^-$ | H |
| IV-16 | 2 | Me | Me | H | $ClO_4^-$ | H |
| IV-17 | 2 | Me | Me | Me | $ClO_4^-$ | H |
| IV-18 | 2 | Me | H | Me | $ClO_4^-$ | H |
| IV-19 | 2 | Me | MeO | H | $ClO_4^-$ | H |
| IV-20 | 2 | Me | MeO | MeO | $ClO_4^-$ | H |
| IV-21 | 2 | Me | H | MeO | $ClO_4^-$ | H |
| IV-22 | 1 | Me | H | H | $ClO_4^-$ | Cl |
| IV-23 | 1 | Me | Me | H | $ClO_4^-$ | Me |
| IV-24 | 2 | Me | H | H | $ClO_4^-$ | Cl |
| IV-25 | 2 | Me | Me | H | $ClO_4^-$ | Me |
| IV-26 | 1 | Me | H | H | $BF_4^-$ | H |
| IV-27 | 1 | Me | Me | H | $PF_6^-$ | H |
| IV-28 | 2 | Me | H | H | $BF_4^-$ | H |
| IV-29 | 2 | Me | Me | H | $PF_6^-$ | H |
| IV-30 | 1 | H | H | H | $ClO_4^-$ | H |
| IV-31 | 2 | H | H | H | $ClO_4^-$ | H |
| IV-32 | 2 | Pr | H | H | $BF_4^-$ | H |
| IV-33 | 1 | Me | H | H | $PF_6^-$ | H |
| IV-34 | 1 | Pr | H | H | $PF_6^-$ | H |
| IV-35 | 1 | Bu | H | H | $PF_6^-$ | H |
| IV-36 | 1 | Me | H | H | $SbF_6^-$ | H |
| IV-37 | 1 | Pr | H | H | $SbF_6^-$ | H |

-continued

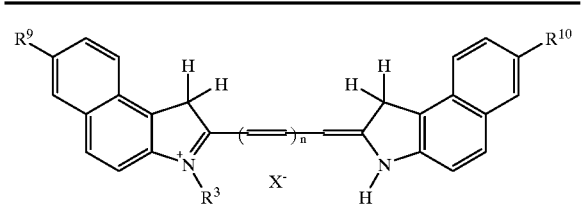

| Compound No. | n | R³ | R⁹ | R¹⁰ | X⁻ | meso |
|---|---|---|---|---|---|---|
| IV-38 | 1 | Bu | H | H | SbF₆⁻ | H |
| IV-39 | 1 | Me | H | H | I⁻ | H |
| IV-40 | 1 | Pr | H | H | I⁻ | H |
| IV-41 | 1 | Bu | H | H | I⁻ | H |
| IV-42 | 1 | Me | H | H | 7-4 | H |
| IV-43 | 1 | Pr | H | H | 7-4 | H |
| IV-44 | 1 | Bu | H | H | 7-4 | H |
| IV-45 | 1 | Me | H | H | 7-5 | H |
| IV-46 | 1 | Pr | H | H | 7-5 | H |
| IV-47 | 1 | Bu | H | H | 7-5 | H |
| IV-48 | 2 | Me | H | H | PF₆⁻ | H |
| IV-49 | 2 | Pr | H | H | PF₆⁻ | H |
| IV-50 | 2 | Bu | H | H | PF₆⁻ | H |
| IV-51 | 2 | Me | H | H | SbF₆⁻ | H |
| IV-52 | 2 | Pr | H | H | SbF₆⁻ | H |
| IV-53 | 2 | Bu | H | H | SbF₆⁻ | H |
| IV-54 | 2 | Me | H | H | I⁻ | H |
| IV-55 | 2 | Pr | H | H | I⁻ | H |
| IV-56 | 2 | Bu | H | H | I⁻ | H |
| IV-57 | 2 | Me | H | H | 7-4 | H |
| IV-58 | 2 | Pr | H | H | 7-4 | H |
| IV-59 | 2 | Bu | H | H | 7-4 | H |
| IV-60 | 2 | Me | H | H | 7-5 | H |
| IV-61 | 2 | Pr | H | H | 7-5 | H |
| IV-62 | 2 | Bu | H | H | 7-5 | H |

Remarks: Me = CH₃, MeO = CH₃O, Pr = n-C₃H₇, Bu = C₄H₉

7-4

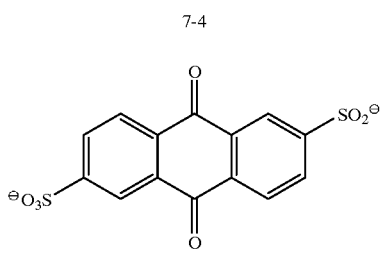

7-5

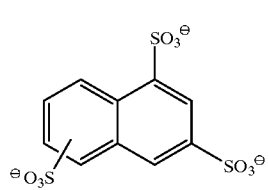

| Compound No. | n | R³ | R⁴ | X⁻ | meso |
|---|---|---|---|---|---|
| V-1 | 0 | H | H | ClO₄⁻ | H |
| V-2 | 0 | Me | H | ClO₄⁻ | H |
| V-3 | 0 | Me | Me | ClO₄⁻ | H |
| V-4 | 0 | H | Bu | ClO₄⁻ | H |
| V-5 | 0 | Bu | Bu | ClO₄⁻ | H |
| V-6 | 1 | H | H | ClO₄⁻ | H |
| V-7 | 1 | H | Me | ClO₄⁻ | H |
| V-8 | 1 | H | Bu | ClO₄⁻ | H |
| V-9 | 1 | Bu | Bu | ClO₄⁻ | H |
| V-10 | 2 | H | H | ClO₄⁻ | H |
| V-11 | 2 | H | Me | ClO₄⁻ | H |
| V-12 | 2 | Me | Me | ClO₄⁻ | Cl |
| V-13 | 2 | H | Bu | ClO₄⁻ | H |
| V-14 | 2 | Bu | Bu | ClO₄⁻ | Cl |
| V-15 | 1 | H | H | ClO₄⁻ | Cl |
| V-16 | 0 | Me | H | ClO₄⁻ | Me |
| V-17 | 2 | H | H | ClO₄⁻ | Cl |
| V-18 | 2 | Me | H | ClO₄⁻ | Me |
| V-19 | 1 | H | H | BF₄⁻ | H |
| V-20 | 1 | Me | H | PF₆⁻ | H |
| V-21 | 2 | H | H | BF₄⁻ | H |
| V-22 | 2 | Me | H | PF₆⁻ | H |
| V-23 | 2 | H | H | 7-1 | H |
| V-24 | 2 | H | H | 7-2 | H |
| V-25 | 2 | H | H | 7-3 | H |
| V-26 | 1 | H | Me | PF₆⁻ | H |
| V-27 | 1 | H | Pr | PF₆⁻ | H |
| V-28 | 1 | H | Bu | PF₆⁻ | H |
| V-29 | 1 | Me | Me | PF₆⁻ | H |
| V-30 | 1 | Me | Pr | PF₆⁻ | H |
| V-31 | 1 | Me | Bu | PF₆⁻ | H |
| V-32 | 1 | Pr | Me | PF₆⁻ | H |
| V-33 | 1 | Pr | Pr | PF₆⁻ | H |
| V-34 | 1 | Pr | Bu | PF₆⁻ | H |
| V-35 | 1 | Bu | Me | PF₆⁻ | H |
| V-36 | 1 | Bu | Pr | PF₆⁻ | H |
| V-37 | 1 | Bu | Bu | PF₆⁻ | H |
| V-38 | 1 | Me | H | PF₆⁻ | H |
| V-39 | 1 | Pr | H | PF₆⁻ | H |
| V-40 | 1 | Bu | H | PF₆⁻ | H |
| V-41 | 1 | Me | Me | PF₆⁻ | H |
| V-42 | 1 | Pr | Me | PF₆⁻ | H |
| V-43 | 1 | Bu | Me | PF₆⁻ | H |
| V-44 | 1 | Me | Pr | PF₆⁻ | H |
| V-45 | 1 | Pr | Pr | PF₆⁻ | H |
| V-46 | 1 | Bu | Pr | PF₆⁻ | H |
| V-47 | 1 | Me | Bu | PF₆⁻ | H |
| V-48 | 1 | Pr | Bu | PF₆⁻ | H |
| V-49 | 1 | Bu | Bu | PF₆⁻ | H |
| V-50 | 2 | H | Me | PF₆⁻ | H |
| V-51 | 2 | H | Pr | PF₆⁻ | H |
| V-52 | 2 | H | Bu | PF₆⁻ | H |
| V-53 | 2 | Me | Me | PF₆⁻ | H |
| V-54 | 2 | Me | Pr | PF₆⁻ | H |
| V-55 | 2 | Me | Bu | PF₆⁻ | H |
| V-56 | 2 | Pr | Me | PF₆⁻ | H |
| V-57 | 2 | Pr | Pr | PF₆⁻ | H |
| V-58 | 2 | Pr | Bu | PF₆⁻ | H |
| V-59 | 2 | Bu | Me | PF₆⁻ | H |
| V-60 | 2 | Bu | Pr | PF₆⁻ | H |
| V-61 | 2 | Bu | Bu | PF₆⁻ | H |
| V-62 | 2 | Me | H | PF₆⁻ | H |
| V-63 | 2 | Pr | H | PF₆⁻ | H |
| V-64 | 2 | Bu | H | PF₆⁻ | H |
| V-65 | 2 | Me | Me | PF₆⁻ | H |
| V-66 | 2 | Pr | Me | PF₆⁻ | H |
| V-67 | 2 | Bu | Me | PF₆⁻ | H |

| | | | | | | | | | |
|---|---|---|---|---|---|---|---|---|---|
| V-68 | 2 | Me | Pr | PF$_6^-$ | H | V-150 | 2 | Me | Pr | I$^-$ | H |
| V-69 | 2 | Pr | Pr | PF$_6^-$ | H | V-151 | 2 | Me | Bu | I$^-$ | H |
| V-70 | 2 | Bu | Pr | PF$_6^-$ | H | V-152 | 2 | Pr | Me | I$^-$ | H |
| V-71 | 2 | Me | Bu | PF$_6^-$ | H | V-153 | 2 | Pr | Pr | I$^-$ | H |
| V-72 | 2 | Pr | Bu | PF$_6^-$ | H | V-154 | 2 | Pr | Bu | I$^-$ | H |
| V-73 | 2 | Bu | Bu | PF$_6^-$ | H | V-155 | 2 | Bu | Me | I$^-$ | H |
| V-74 | 1 | H | Me | SbF$_6^-$ | H | V-156 | 2 | Bu | Pr | I$^-$ | H |
| V-75 | 1 | H | Pr | SbF$_6^-$ | H | V-157 | 2 | Bu | Bu | I$^-$ | H |
| V-76 | 1 | H | Bu | SbF$_6^-$ | H | V-158 | 2 | Me | H | I$^-$ | H |
| V-77 | 1 | Me | Me | SbF$_6^-$ | H | V-159 | 2 | Pr | H | I$^-$ | H |
| V-78 | 1 | Me | Pr | SbF$_6^-$ | H | V-160 | 2 | Bu | H | I$^-$ | H |
| V-79 | 1 | Me | Bu | SbF$_6^-$ | H | V-161 | 2 | Me | Me | I$^-$ | H |
| V-80 | 1 | Pr | Me | SbF$_6^-$ | H | V-162 | 2 | Pr | Me | I$^-$ | H |
| V-81 | 1 | Pr | Pr | SbF$_6^-$ | H | V-163 | 2 | Bu | Me | I$^-$ | H |
| V-82 | 1 | Pr | Bu | SbF$_6^-$ | H | V-164 | 2 | Me | Pr | I$^-$ | H |
| V-83 | 1 | Bu | Me | SbF$_6^-$ | H | V-165 | 2 | Pr | Pr | I$^-$ | H |
| V-84 | 1 | Bu | Pr | SbF$_6^-$ | H | V-166 | 2 | Bu | Pr | I$^-$ | H |
| V-85 | 1 | Bu | Bu | SbF$_6^-$ | H | V-167 | 2 | Me | Bu | I$^-$ | H |
| V-86 | 1 | Me | H | SbF$_6^-$ | H | V-168 | 2 | Pr | Bu | 7-4 | H |
| V-87 | 1 | Pr | H | SbF$_6^-$ | H | V-169 | 2 | Bu | Bu | 7-4 | H |
| V-88 | 1 | Bu | H | SbF$_6^-$ | H | V-170 | 1 | H | Me | 7-4 | H |
| V-89 | 1 | Me | Me | SbF$_6^-$ | H | V-171 | 1 | H | Pr | 7-4 | H |
| V-90 | 1 | Pr | Me | SbF$_6^-$ | H | V-172 | 1 | H | Bu | 7-4 | H |
| V-91 | 1 | Bu | Me | SbF$_6^-$ | H | V-173 | 1 | Me | Me | 7-4 | H |
| V-92 | 1 | Me | Pr | SbF$_6^-$ | H | V-174 | 1 | Me | Pr | 7-4 | H |
| V-93 | 1 | Pr | Pr | SbF$_6^-$ | H | V-175 | 1 | Me | Bu | 7-4 | H |
| V-94 | 1 | Bu | Pr | SbF$_6^-$ | H | V-176 | 1 | Pr | Me | 7-4 | H |
| V-95 | 1 | Me | Bu | SbF$_6^-$ | H | V-177 | 1 | Pr | Pr | 7-4 | H |
| V-96 | 1 | Pr | Bu | SbF$_6^-$ | H | V-178 | 1 | Pr | Bu | 7-4 | H |
| V-97 | 1 | Bu | Bu | SbF$_6^-$ | H | V-179 | 1 | Bu | Me | 7-4 | H |
| V-98 | 2 | H | Me | SbF$_6^-$ | H | V-180 | 1 | Bu | Pr | 7-4 | H |
| V-99 | 2 | H | Pr | SbF$_6^-$ | H | V-181 | 1 | Bu | Bu | 7-4 | H |
| V-100 | 2 | H | Bu | SbF$_6^-$ | H | V-182 | 1 | Me | H | 7-4 | H |
| V-101 | 2 | Me | Me | SbF$_6^-$ | H | V-183 | 1 | Pr | H | 7-4 | H |
| V-102 | 2 | Me | Pr | SbF$_6^-$ | H | V-184 | 1 | Bu | H | 7-4 | H |
| V-103 | 2 | Me | Bu | SbF$_6^-$ | H | V-185 | 1 | Me | Me | 7-4 | H |
| V-104 | 2 | Pr | Me | SbF$_6^-$ | H | V-186 | 1 | Pr | Me | 7-4 | H |
| V-105 | 2 | Pr | Pr | SbF$_6^-$ | H | V-187 | 1 | Bu | Me | 7-4 | H |
| V-106 | 2 | Pr | Bu | SbF$_6^-$ | H | V-188 | 1 | Me | Pr | 7-4 | H |
| V-107 | 2 | Bu | Me | SbF$_6^-$ | H | V-189 | 1 | Pr | Pr | 7-4 | H |
| V-108 | 2 | Bu | Pr | SbF$_6^-$ | H | V-190 | 1 | Bu | Pr | 7-4 | H |
| V-109 | 2 | Bu | Bu | SbF$_6^-$ | H | V-191 | 1 | Me | Bu | 7-4 | H |
| V-110 | 2 | Me | H | SbF$_6^-$ | H | V-192 | 1 | Pr | Bu | 7-4 | H |
| V-111 | 2 | Pr | H | SbF$_6^-$ | H | V-193 | 1 | Bu | Bu | 7-4 | H |
| V-112 | 2 | Bu | H | SbF$_6^-$ | H | V-194 | 2 | H | Me | 7-4 | H |
| V-113 | 2 | Me | Me | SbF$_6^-$ | H | V-195 | 2 | H | Pr | 7-4 | H |
| V-1H | 2 | Pr | Me | SbF$_6^-$ | H | V-196 | 2 | H | Bu | 7-4 | H |
| V-115 | 2 | Bu | Me | SbF$_6^-$ | H | V-197 | 2 | Me | Me | 7-4 | H |
| V-116 | 2 | Me | Pr | SbF$_6^-$ | H | V-198 | 2 | Me | Pr | 7-4 | H |
| V-117 | 2 | Pr | Pr | SbF$_6^-$ | H | V-199 | 2 | Me | Bu | 7-4 | H |
| V-118 | 2 | Bu | Pr | SbF$_6^-$ | H | V-200 | 2 | Pr | Me | 7-4 | H |
| V-119 | 2 | Me | Bu | SbF$_6^-$ | H | V-201 | 2 | Pr | Pr | 7-4 | H |
| V-120 | 2 | Pr | Bu | SbF$_6^-$ | H | V-202 | 2 | Pr | Bu | 7-4 | H |
| V-121 | 2 | Bu | Bu | I$^-$ | H | V-203 | 2 | Bu | Me | 7-4 | H |
| V-122 | 1 | H | Me | I$^-$ | H | V-204 | 2 | Bu | Pr | 7-4 | H |
| V-123 | 1 | H | Pr | I$^-$ | H | V-205 | 2 | Bu | Bu | 7-4 | H |
| V-124 | 1 | H | Bu | I$^-$ | H | V-206 | 2 | Me | H | 7-4 | H |
| V-125 | 1 | Me | Me | I$^-$ | H | V-207 | 2 | Pr | H | 7-4 | H |
| V-126 | 1 | Me | Pr | I$^-$ | H | V-208 | 2 | Bu | H | 7-4 | H |
| V-127 | 1 | Me | Bu | I$^-$ | H | V-209 | 2 | Me | Me | 7-4 | H |
| V-128 | 1 | Pr | Me | I$^-$ | H | V-210 | 2 | Pr | Me | 7-4 | H |
| V-129 | 1 | Pr | Pr | I$^-$ | H | V-211 | 2 | Bu | Me | 7-4 | H |
| V-130 | 1 | Pr | Bu | I$^-$ | H | V-212 | 2 | Me | Pr | 7-4 | H |
| V-131 | 1 | Bu | Me | I$^-$ | H | V-213 | 2 | Pr | Pr | 7-4 | H |
| V-132 | 1 | Bu | Pr | I$^-$ | H | V-214 | 2 | Bu | Pr | 7-4 | H |
| V-133 | 1 | Bu | Bu | I$^-$ | H | V-215 | 2 | Me | Bu | 7-4 | H |
| V-134 | 1 | Me | H | I$^-$ | H | V-216 | 2 | Pr | Bu | 7-4 | H |
| V-135 | 1 | Pr | H | I$^-$ | H | V-217 | 2 | Bu | Bu | 7-4 | H |
| V-136 | 1 | Bu | H | I$^-$ | H | V-218 | 1 | H | Me | 7-5 | H |
| V-137 | 1 | Me | Me | I$^-$ | H | V-219 | 1 | H | Pr | 7-5 | H |
| V-138 | 1 | Pr | Me | I$^-$ | H | V-220 | 1 | H | Bu | 7-5 | H |
| V-139 | 1 | Bu | Me | I$^-$ | H | V-221 | 1 | Me | Me | 7-5 | H |
| V-140 | 1 | Me | Pr | I$^-$ | H | V-222 | 1 | Me | Pr | 7-5 | H |
| V-141 | 1 | Pr | Pr | I$^-$ | H | V-223 | 1 | Me | Bu | 7-5 | H |
| V-142 | 1 | Bu | Pr | I$^-$ | H | V-224 | 1 | Pr | Me | 7-5 | H |
| V-143 | 1 | Me | Bu | I$^-$ | H | V-225 | 1 | Pr | Pr | 7-5 | H |
| V-144 | 1 | Pr | Bu | I$^-$ | H | V-226 | 1 | Pr | Bu | 7-5 | H |
| V-145 | 1 | Bu | Bu | I$^-$ | H | V-227 | 1 | Bu | Me | 7-5 | H |
| V-146 | 2 | H | Me | I$^-$ | H | V-228 | 1 | Bu | Pr | 7-5 | H |
| V-147 | 2 | H | Pr | I$^-$ | H | V-229 | 1 | Bu | Bu | 7-5 | H |
| V-148 | 2 | H | Bu | I$^-$ | H | V-230 | 1 | Me | H | 7-5 | H |
| V-149 | 2 | Me | Me | I$^-$ | H | V-231 | 1 | Pr | H | 7-5 | H |

| | | | | | |
|---|---|---|---|---|---|
| V-232 | 1 | Bu | H | 7-5 | H |
| V-233 | 1 | Me | Me | 7-5 | H |
| V-234 | 1 | Pr | Me | 7-5 | H |
| V-235 | 1 | Bu | Me | 7-5 | H |
| V-236 | 1 | Me | Pr | 7-5 | H |
| V-237 | 1 | Pr | Pr | 7-5 | H |
| V-238 | 1 | Bu | Pr | 7-5 | H |
| V-239 | 1 | Me | Bu | 7-5 | H |
| V-240 | 1 | Pr | Bu | 7-5 | H |
| V-241 | 1 | Bu | Bu | 7-5 | H |
| V-242 | 2 | H | Me | 7-5 | H |
| V-243 | 2 | H | Pr | 7-5 | H |
| V-244 | 2 | H | Bu | 7-5 | H |
| V-245 | 2 | Me | Me | 7-5 | H |
| V-246 | 2 | Me | Pr | 7-5 | H |
| V-247 | 2 | Me | Bu | 7-5 | H |
| V-248 | 2 | Pr | Me | 7-5 | H |
| V-249 | 2 | Pr | Pr | 7-5 | H |
| V-250 | 2 | Pr | Bu | 7-5 | H |
| V-251 | 2 | Bu | Me | 7-5 | H |
| V-252 | 2 | Bu | Pr | 7-5 | H |
| V-253 | 2 | Bu | Bu | 7-5 | H |
| V-254 | 2 | Me | H | 7-5 | H |
| V-255 | 2 | Pr | H | 7-5 | H |
| V-256 | 2 | Bu | H | 7-5 | H |
| V-257 | 2 | Me | Me | 7-5 | H |
| V-258 | 2 | Pr | Me | 7-5 | H |
| V-259 | 2 | Bu | Me | 7-5 | H |
| V-260 | 2 | Me | Pr | 7-5 | H |
| V-261 | 2 | Pr | Pr | 7-5 | H |
| V-262 | 2 | Bu | Pr | 7-5 | H |
| V-263 | 2 | Me | Bu | 7-5 | H |
| V-264 | 2 | Pr | Bu | 7-5 | H |
| V-265 | 2 | Bu | Bu | 7-5 | H |

Remarks: Me = CH$_3$, Pr = n-C$_3$H$_7$, Bu = n-C$_4$H$_9$

| Compound No. | n | R$^3$ | R$^4$ | R$^{10}$ | X$^-$ | meso |
|---|---|---|---|---|---|---|
| VI-1 | 0 | H | Me | H | ClO$_4^-$ | H |
| VI-2 | 0 | H | Me | Me | ClO$_4^-$ | H |
| VI-3 | 0 | Me | Me | Me | ClO$_4^-$ | H |
| VI-4 | 0 | Me | Me | H | ClO$_4^-$ | H |
| VI-5 | 0 | H | Me | MeO | ClO$_4^-$ | H |
| VI-6 | 0 | Me | Me | MeO | ClO$_4^-$ | H |
| VI-7 | 0 | Me | Me | H | ClO$_4^-$ | H |
| VI-8 | 1 | H | Bu | H | 7-1 | H |
| VI-9 | 1 | H | Me | Me | ClO$_4^-$ | H |
| VI-10 | 1 | Me | Me | Me | ClO$_4^-$ | H |
| VI-11 | 1 | Me | Me | H | ClO$_4^-$ | H |
| VI-12 | 1 | H | Me | MeO | ClO$_4^-$ | H |
| VI-13 | 1 | Me | Me | MeO | ClO$_4^-$ | H |
| VI-14 | 1 | Me | Me | H | ClO$_4^-$ | H |
| VI-15 | 2 | H | Me | H | ClO$_4^-$ | H |
| VI-16 | 2 | H | Me | Me | ClO$_4^-$ | H |
| VI-17 | 2 | Me | Me | Me | ClO$_4^-$ | H |
| VI-18 | 2 | Me | Me | H | ClO$_4^-$ | H |
| VI-19 | 2 | H | Me | MeO | ClO$_4^-$ | H |
| VI-20 | 2 | Me | Me | MeO | ClO$_4^-$ | H |
| VI-21 | 2 | Me | Me | H | ClO$_4^-$ | H |
| VI-22 | 1 | H | Me | H | ClO$_4^-$ | Cl |
| VI-23 | 1 | H | Me | Me | ClO$_4^-$ | Me |
| VI-24 | 2 | H | Me | H | ClO$_4^-$ | Cl |
| VI-25 | 2 | H | Me | Me | ClO$_4^-$ | Me |
| VI-26 | 1 | H | Me | H | BF$_4^-$ | H |
| VI-27 | 1 | H | Me | Me | PF$_6^-$ | H |
| VI-28 | 2 | H | Pr | H | BF$_4^-$ | H |
| VI-29 | 2 | H | Me | Me | PF$_6^-$ | H |
| VI-30 | 2 | Me | Pr | H | ClO$_4^-$ | H |
| VI-31 | 1 | H | Me | H | PF$_6^-$ | H |
| VI-32 | 1 | H | Pr | H | PF$_6^-$ | H |
| VI-33 | 1 | H | Bu | H | PF$_6^-$ | H |
| VI-34 | 1 | Me | Me | H | PF$_6^-$ | H |
| VI-35 | 1 | Me | Pr | H | PF$_6^-$ | H |
| VI-36 | 1 | Me | Bu | H | PF$_6^-$ | H |
| VI-37 | 1 | Pr | Me | H | PF$_6^-$ | H |
| VI-38 | 1 | Pr | Pr | H | PF$_6^-$ | H |
| VI-39 | 1 | Pr | Bu | H | PF$_6^-$ | H |
| VI-40 | 1 | Bu | Me | H | PF$_6^-$ | H |
| VI-41 | 1 | Bu | Pr | H | PF$_6^-$ | H |
| VI-42 | 1 | Bu | Bu | H | PF$_6^-$ | H |
| VI-43 | 1 | Me | H | H | PF$_6^-$ | H |
| VI-44 | 1 | Pr | H | H | PF$_6^-$ | H |
| VI-45 | 1 | Bu | H | H | PF$_6^-$ | H |
| VI-46 | 1 | Me | Me | H | PF$_6^-$ | H |
| VI-47 | 1 | Pr | Me | H | PF$_6^-$ | H |

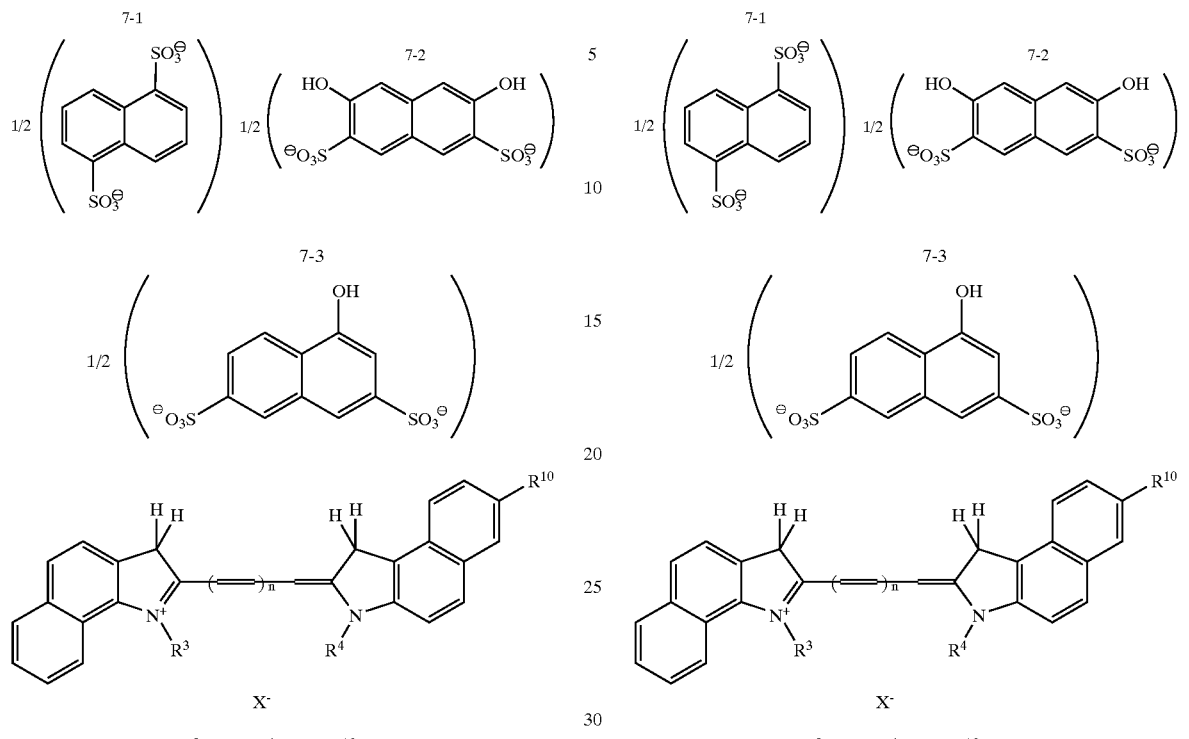

| Compound No. | n | R³ | R⁴ | R¹⁰ | X⁻ | meso |
|---|---|---|---|---|---|---|
| VI-48 | 1 | Bu | Me | H | PF₆⁻ | H |
| VI-49 | 1 | Me | Pr | H | PF₆⁻ | H |
| VI-50 | 1 | Pr | Pr | H | PF₆⁻ | H |
| VI-51 | 1 | Bu | Pr | H | PF₆⁻ | H |
| VI-52 | 1 | Me | Bu | H | PF₆⁻ | H |
| VI-53 | 1 | Pr | Bu | H | PF₆⁻ | H |
| VI-54 | 1 | Bu | Bu | H | PF₆⁻ | H |
| VI-55 | 2 | H | Me | H | PF₆⁻ | H |
| VI-56 | 2 | H | Pr | H | PF₆⁻ | H |
| VI-57 | 2 | H | Bu | H | PF₆⁻ | H |
| VI-58 | 2 | Me | Me | H | PF₆⁻ | H |
| VI-59 | 2 | Me | Pr | H | PF₆⁻ | H |
| VI-60 | 2 | Me | Bu | H | PF₆⁻ | H |
| VI-61 | 2 | Pr | Me | H | PF₆⁻ | H |
| VI-62 | 2 | Pr | Pr | H | PF₆⁻ | H |
| VI-63 | 2 | Pr | Bu | H | PF₆⁻ | H |
| VI-64 | 2 | Bu | Me | H | PF₆⁻ | H |
| VI-65 | 2 | Bu | Pr | H | PF₆⁻ | H |
| VI-66 | 2 | Bu | Bu | H | PF₆⁻ | H |
| VI-67 | 2 | Me | H | H | PF₆⁻ | H |
| VI-68 | 2 | Pr | H | H | PF₆⁻ | H |
| VI-69 | 2 | Bu | H | H | PF₆⁻ | H |
| VI-70 | 2 | Me | Me | H | PF₆⁻ | H |
| VI-71 | 2 | Pr | Me | H | PF₆⁻ | H |
| VI-72 | 2 | Bu | Me | H | PF₆⁻ | H |
| VI-73 | 2 | Me | Pr | H | PF₆⁻ | H |
| VI-74 | 2 | Pr | Pr | H | PF₆⁻ | H |
| VI-75 | 2 | Bu | Pr | H | PF₆⁻ | H |
| VI-76 | 2 | Me | Bu | H | PF₆⁻ | H |
| VI-77 | 2 | Pr | Bu | H | PF₆⁻ | H |
| VI-78 | 2 | Bu | Bu | H | PF₆⁻ | H |
| VI-79 | 1 | H | Me | H | SbF₆⁻ | H |
| VI-80 | 1 | H | Pr | H | SbF₆⁻ | H |
| VI-81 | 1 | H | Bu | H | SbF₆⁻ | H |
| VI-82 | 1 | Me | Me | H | SbF₆⁻ | H |
| VI-83 | 1 | Me | Pr | H | SbF₆⁻ | H |
| VI-84 | 1 | Me | Bu | H | SbF₆⁻ | H |
| VI-85 | 1 | Pr | Me | H | SbF₆⁻ | H |
| VI-86 | 1 | Pr | Pr | H | SbF₆⁻ | H |
| VI-87 | 1 | Pr | Bu | H | SbF₆⁻ | H |
| VI-88 | 1 | Bu | Me | H | SbF₆⁻ | H |
| VI-89 | 1 | Bu | Pr | H | SbF₆⁻ | H |
| VI-90 | 1 | Bu | Bu | H | SbF₆⁻ | H |
| VI-91 | 1 | Me | H | H | SbF₆⁻ | H |
| VI-92 | 1 | Pr | H | H | SbF₆⁻ | H |
| VI-93 | 1 | Bu | H | H | SbF₆⁻ | H |
| VI-94 | 1 | Me | Me | H | SbF₆⁻ | H |
| VI-95 | 1 | Pr | Me | H | SbF₆⁻ | H |
| VI-96 | 1 | Bu | Me | H | SbF₆⁻ | H |
| VI-97 | 1 | Me | Pr | H | SbF₆⁻ | H |
| VI-98 | 1 | Pr | Pr | H | SbF₆⁻ | H |
| VI-99 | 1 | Bu | Pr | H | SbF₆⁻ | H |
| VI-100 | 1 | Me | Bu | H | SbF₆⁻ | H |
| VI-101 | 1 | Pr | Bu | H | SbF₆⁻ | H |
| VI-102 | 1 | Bu | Bu | H | SbF₆⁻ | H |
| VI-103 | 2 | H | Me | H | SbF₆⁻ | H |
| VI-104 | 2 | H | Pr | H | SbF₆⁻ | H |
| VI-105 | 2 | H | Bu | H | SbF₆⁻ | H |
| VI-106 | 2 | Me | Me | H | SbF₆⁻ | H |
| VI-107 | 2 | Me | Pr | H | SbF₆⁻ | H |
| VI-108 | 2 | Me | Bu | H | SbF₆⁻ | H |
| VI-109 | 2 | Pr | Me | H | SbF₆⁻ | H |
| VI-110 | 2 | Pr | Pr | H | SbF₆⁻ | H |
| VI-111 | 2 | Pr | Bu | H | SbF₆⁻ | H |
| VI-112 | 2 | Bu | Me | H | SbF₆⁻ | H |
| VI-113 | 2 | Bu | Pr | H | SbF₆⁻ | H |
| VI-114 | 2 | Bu | Bu | H | SbF₆⁻ | H |
| VI-115 | 2 | Me | H | H | SbF₆⁻ | H |
| VI-116 | 2 | Pr | H | H | SbF₆⁻ | H |
| VI-117 | 2 | Bu | H | H | SbF₆⁻ | H |
| VI-118 | 2 | Me | Me | H | SbF₆⁻ | H |
| VI-119 | 2 | Pr | Me | H | SbF₆⁻ | H |
| VI-120 | 2 | Bu | Me | H | SbF₆⁻ | H |
| VI-121 | 2 | Me | Pr | H | SbF₆⁻ | H |
| VI-122 | 2 | Pr | Pr | H | SbF₆⁻ | H |
| VI-123 | 2 | Bu | Pr | H | SbF₆⁻ | H |
| VI-124 | 2 | Me | Bu | H | SbF₆⁻ | H |
| VI-125 | 2 | Pr | Bu | H | SbF₆⁻ | H |
| VI-126 | 2 | Bu | Bu | H | SbF₆⁻ | H |
| VI-127 | 1 | H | Me | H | I⁻ | H |
| VI-128 | 1 | H | Pr | H | I⁻ | H |
| VI-129 | 1 | H | Bu | H | I⁻ | H |
| VI-130 | 1 | Me | Me | H | I⁻ | H |
| VI-131 | 1 | Me | Pr | H | I⁻ | H |

-continued

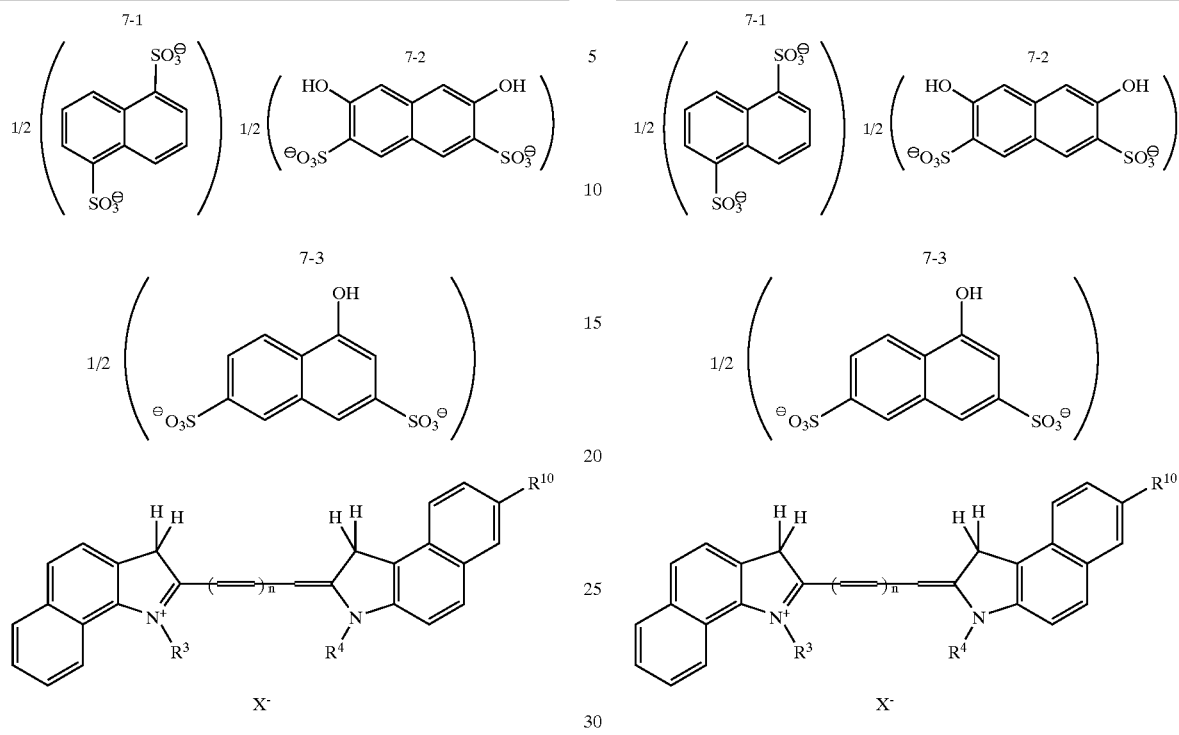

| Compound No. | n | R³ | R⁴ | R¹⁰ | X⁻ | meso |
|---|---|---|---|---|---|---|
| VI-132 | 1 | Me | Bu | H | I⁻ | H |
| VI-133 | 1 | Pr | Me | H | I⁻ | H |
| VI-134 | 1 | Pr | Pr | H | I⁻ | H |
| VI-135 | 1 | Pr | Bu | H | I⁻ | H |
| VI-136 | 1 | Bu | Me | H | I⁻ | H |
| VI-137 | 1 | Bu | Pr | H | I⁻ | H |
| VI-138 | 1 | Bu | Bu | H | I⁻ | H |
| VI-139 | 1 | Me | H | H | I⁻ | H |
| VI-140 | 1 | Pr | H | H | I⁻ | H |
| VI-141 | 1 | Bu | H | H | I⁻ | H |
| VI-142 | 1 | Me | Me | H | I⁻ | H |
| VI-143 | 1 | Pr | Me | H | I⁻ | H |
| VI-144 | 1 | Bu | Me | H | I⁻ | H |
| VI-145 | 1 | Me | Pr | H | I⁻ | H |
| VI-146 | 1 | Pr | Pr | H | I⁻ | H |
| VI-147 | 1 | Bu | Pr | H | I⁻ | H |
| VI-148 | 1 | Me | Bu | H | I⁻ | H |
| VI-149 | 1 | Pr | Bu | H | I⁻ | H |
| VI-150 | 1 | Bu | Bu | H | I⁻ | H |
| VI-151 | 2 | H | Me | H | I⁻ | H |
| VI-152 | 2 | H | Pr | H | I⁻ | H |
| VI-153 | 2 | H | Bu | H | I⁻ | H |
| VI-154 | 2 | Me | Me | H | I⁻ | H |
| VI-155 | 2 | Me | Pr | H | I⁻ | H |
| VI-156 | 2 | Me | Bu | H | I⁻ | H |
| VI-157 | 2 | Pr | Me | H | I⁻ | H |
| VI-158 | 2 | Pr | Pr | H | I⁻ | H |
| VI-159 | 2 | Pr | Bu | H | I⁻ | H |
| VI-160 | 2 | Bu | Me | H | I⁻ | H |
| VI-161 | 2 | Bu | Pr | H | I⁻ | H |
| VI-162 | 2 | Bu | Bu | H | I⁻ | H |
| VI-163 | 2 | Me | H | H | I⁻ | H |
| VI-164 | 2 | Pr | H | H | I⁻ | H |
| VI-165 | 2 | Bu | H | H | I⁻ | H |
| VI-166 | 2 | Me | Me | H | I⁻ | H |
| VI-167 | 2 | Pr | Me | H | I⁻ | H |
| VI-168 | 2 | Bu | Me | H | I⁻ | H |
| VI-169 | 2 | Me | Pr | H | I⁻ | H |
| VI-170 | 2 | Pr | Pr | H | I⁻ | H |
| VI-171 | 2 | Bu | Pr | H | I⁻ | H |
| VI-172 | 2 | Me | Bu | H | I⁻ | H |
| VI-173 | 2 | Pr | Bu | H | I⁻ | H |
| VI-174 | 2 | Bu | Bu | H | I⁻ | H |
| VI-175 | 1 | H | Me | H | 7-4 | H |
| VI-176 | 1 | H | Pr | H | 7-4 | H |
| VI-177 | 1 | H | Bu | H | 7-4 | H |
| VI-178 | 1 | Me | Me | H | 7-4 | H |
| VI-179 | 1 | Me | Pr | H | 7-4 | H |
| VI-180 | 1 | Me | Bu | H | 7-4 | H |
| VI-181 | 1 | Pr | Me | H | 7-4 | H |
| VI-182 | 1 | Pr | Pr | H | 7-4 | H |
| VI-183 | 1 | Pr | Bu | H | 7-4 | H |
| VI-184 | 1 | Bu | Me | H | 7-4 | H |
| VI-185 | 1 | Bu | Pr | H | 7-4 | H |
| VI-186 | 1 | Bu | Bu | H | 7-4 | H |
| VI-187 | 1 | Me | H | H | 7-4 | H |
| VI-188 | 1 | Pr | H | H | 7-4 | H |
| VI-189 | 1 | Bu | H | H | 7-4 | H |
| VI-190 | 1 | Me | Me | H | 7-4 | H |
| VI-191 | 1 | Pr | Me | H | 7-4 | H |
| VI-192 | 1 | Bu | Me | H | 7-4 | H |
| VI-193 | 1 | Me | Pr | H | 7-4 | H |
| VI-194 | 1 | Pr | Pr | H | 7-4 | H |
| VI-195 | 1 | Bu | Pr | H | 7-4 | H |
| VI-196 | 1 | Me | Bu | H | 7-4 | H |
| VI-197 | 1 | Pr | Bu | H | 7-4 | H |
| VI-198 | 1 | Bu | Bu | H | 7-4 | H |
| VI-199 | 2 | H | Me | H | 7-4 | H |
| VI-200 | 2 | H | Pr | H | 7-4 | H |
| VI-201 | 2 | H | Bu | H | 7-4 | H |
| VI-202 | 2 | Me | Me | H | 7-4 | H |
| VI-203 | 2 | Me | Pr | H | 7-4 | H |
| VI-204 | 2 | Me | Bu | H | 7-4 | H |
| VI-205 | 2 | Pr | Me | H | 7-4 | H |
| VI-206 | 2 | Pr | Pr | H | 7-4 | H |
| VI-207 | 2 | Pr | Bu | H | 7-4 | H |
| VI-208 | 2 | Bu | Me | H | 7-4 | H |
| VI-209 | 2 | Bu | Pr | H | 7-4 | H |
| VI-210 | 2 | Bu | Bu | H | 7-4 | H |
| VI-211 | 2 | Me | H | H | 7-4 | H |
| VI-212 | 2 | Pr | H | H | 7-4 | H |
| VI-213 | 2 | Bu | H | H | 7-4 | H |
| VI-214 | 2 | Me | Me | H | 7-4 | H |
| VI-215 | 2 | Pr | Me | H | 7-4 | H |

-continued

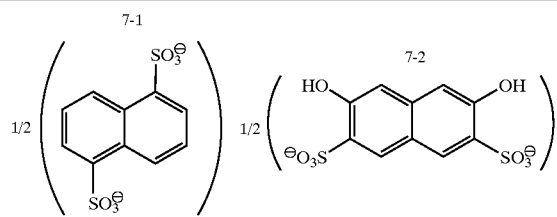

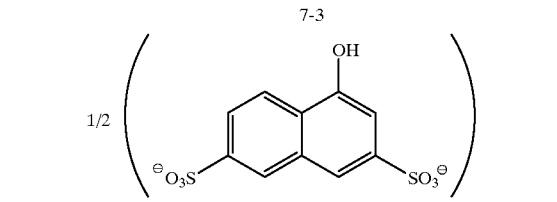

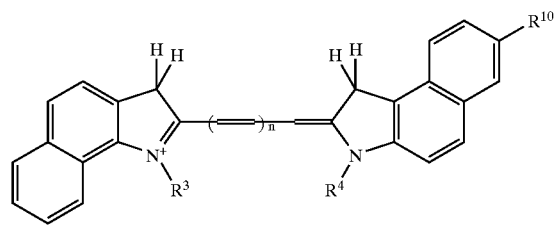

X⁻

| Compound No. | n | R³ | R⁴ | R¹⁰ | X⁻ | meso |
|---|---|---|---|---|---|---|
| VI-216 | 2 | Bu | Me | H | 7-4 | H |
| VI-217 | 2 | Me | Pr | H | 7-4 | H |
| VI-218 | 2 | Pr | Pr | H | 7-4 | H |
| VI-219 | 2 | Bu | Pr | H | 7-4 | H |
| VI-220 | 2 | Me | Bu | H | 7-4 | H |
| VI-221 | 2 | Pr | Bu | H | 7-4 | H |
| VI-222 | 2 | Bu | Bu | H | 7-4 | H |
| VI-223 | 1 | H | Me | H | 7-5 | H |
| VI-224 | 1 | H | Pr | H | 7-5 | H |
| VI-225 | 1 | H | Bu | H | 7-5 | H |
| VI-226 | 1 | Me | Me | H | 7-5 | H |
| VI-227 | 1 | Me | Pr | H | 7-5 | H |
| VI-228 | 1 | Me | Bu | H | 7-5 | H |
| VI-229 | 1 | Pr | Me | H | 7-5 | H |
| VI-230 | 1 | Pr | Pr | H | 7-5 | H |
| VI-231 | 1 | Pr | Bu | H | 7-5 | H |
| VI-232 | 1 | Bu | Me | H | 7-5 | H |
| VI-233 | 1 | Bu | Pr | H | 7-5 | H |
| VI-234 | 1 | Bu | Bu | H | 7-5 | H |
| VI-235 | 1 | Me | H | H | 7-5 | H |
| VI-236 | 1 | Pr | H | H | 7-5 | H |
| VI-237 | 1 | Bu | H | H | 7-5 | H |
| VI-238 | 1 | Me | Me | H | 7-5 | H |
| VI-239 | 1 | Pr | Me | H | 7-5 | H |
| VI-240 | 1 | Bu | Me | H | 7-5 | H |
| VI-242 | 1 | Me | Pr | H | 7-5 | H |
| VI-242 | 1 | Pr | Pr | H | 7-5 | H |
| VI-243 | 1 | Bu | Pr | H | 7-5 | H |
| VI-244 | 1 | Me | Bu | H | 7-5 | H |
| VI-245 | 1 | Pr | Bu | H | 7-5 | H |
| VI-246 | 1 | Bu | Bu | H | 7-5 | H |
| VI-247 | 2 | H | Me | H | 7-5 | H |
| VI-248 | 2 | H | Pr | H | 7-5 | H |
| VI-249 | 2 | H | Bu | H | 7-5 | H |
| VI-250 | 2 | Me | Me | H | 7-5 | H |
| VI-251 | 2 | Me | Pr | H | 7-5 | H |
| VI-252 | 2 | Me | Bu | H | 7-5 | H |
| VI-253 | 2 | Pr | Me | H | 7-5 | H |
| VI-254 | 2 | Pr | Pr | H | 7-5 | H |
| VI-255 | 2 | Pr | Bu | H | 7-5 | H |
| VI-256 | 2 | Bu | Me | H | 7-5 | H |
| VI-257 | 2 | Bu | Pr | H | 7-5 | H |

-continued

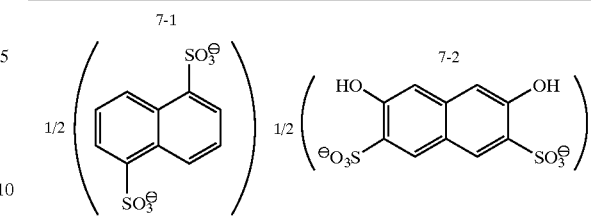

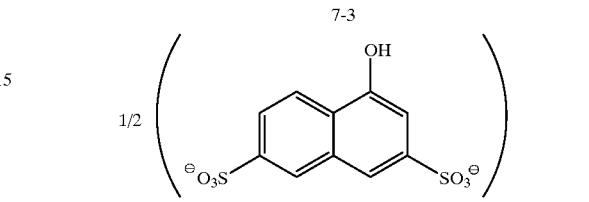

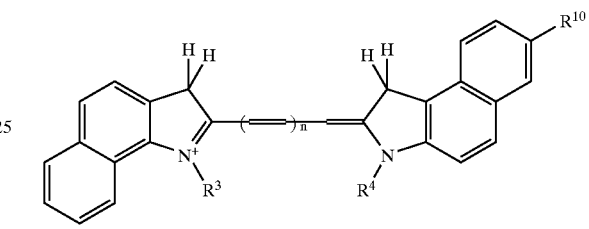

X⁻

| Compound No. | n | R³ | R⁴ | R¹⁰ | X⁻ | meso |
|---|---|---|---|---|---|---|
| VI-258 | 2 | Bu | Bu | H | 7-5 | H |
| VI-259 | 2 | Me | H | H | 7-5 | H |
| VI-260 | 2 | Pr | H | H | 7-5 | H |
| VI-261 | 2 | Bu | H | H | 7-5 | H |
| VI-262 | 2 | Me | Me | H | 7-5 | H |
| VI-263 | 2 | Pr | Me | H | 7-5 | H |
| VI-264 | 2 | Bu | Me | H | 7-5 | H |
| VI-265 | 2 | Me | Pr | H | 7-5 | H |
| VI-266 | 2 | Pr | Pr | H | 7-5 | H |
| VI-267 | 2 | Bu | Pr | H | 7-5 | H |
| VI-268 | 2 | Me | Bu | H | 7-5 | H |
| VI-269 | 2 | Pr | Bu | H | 7-5 | H |
| VI-270 | 2 | Bu | Bu | H | 7-5 | H |
| VI-271 | 1 | Me | Bu | H | ClO₄⁻ | H |
| VI-272 | 2 | Me | Me | H | BF₄⁻ | H |
| VI-273 | 2 | Me | Me | H | 7-5 | H |

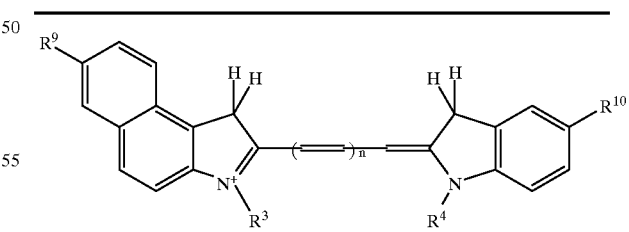

X⁻

| Compound No. | n | R³ | R⁴ | R⁹ | R¹⁰ | X⁻ | meso |
|---|---|---|---|---|---|---|---|
| VII-1 | 0 | H | H | H | H | ClO₄⁻ | H |
| VII-2 | 0 | H | Me | H | H | ClO₄⁻ | H |
| VII-3 | 0 | Me | H | H | H | ClO₄⁻ | H |
| VII-4 | 0 | H | H | H | Me | ClO₄⁻ | H |

-continued

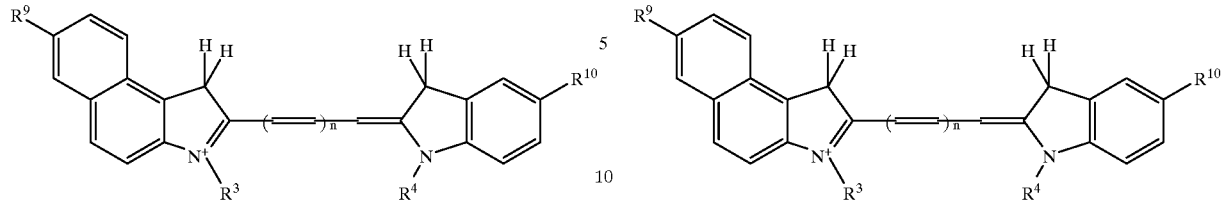

X⁻

| Compound No. | n | R³ | R⁴ | R⁹ | R¹⁰ | X⁻ | meso |
|---|---|---|---|---|---|---|---|
| VII-5 | 0 | H | Me | Me | H | ClO₄⁻ | H |
| VII-6 | 0 | Me | H | Me | H | ClO₄⁻ | H |
| VII-7 | 0 | H | H | H | Me | ClO₄⁻ | H |
| VII-8 | 0 | H | Me | H | Me | ClO₄⁻ | H |
| VII-9 | 0 | Me | H | H | Me | ClO₄⁻ | H |
| VII-10 | 0 | H | H | MeO | H | ClO₄⁻ | H |
| VII-11 | 0 | H | H | MeO | MeO | ClO₄⁻ | H |
| VII-12 | 0 | H | H | H | MeO | ClO₄⁻ | H |
| VII-13 | 1 | H | H | H | H | ClO₄⁻ | H |
| VII-14 | 1 | H | Me | H | H | ClO₄⁻ | H |
| VII-15 | 1 | Me | H | H | H | ClO₄⁻ | H |
| VII-16 | 1 | H | H | Me | H | ClO₄⁻ | H |
| VII-17 | 1 | H | Me | Me | H | ClO₄⁻ | H |
| VII-18 | 1 | Me | H | Me | H | ClO₄⁻ | H |
| VII-19 | 1 | H | H | H | H | ClO₄⁻ | H |
| VII-20 | 1 | H | H | H | Me | ClO₄⁻ | H |
| VII-21 | 1 | H | Me | H | Me | ClO₄⁻ | H |
| VII-22 | 1 | Me | H | H | Me | ClO₄⁻ | H |
| VII-23 | 1 | H | H | MeO | H | ClO₄⁻ | H |
| VII-24 | 1 | H | H | MeO | MeO | ClO₄⁻ | H |
| VII-25 | 1 | H | H | H | MeO | ClO₄⁻ | H |
| VII-26 | 2 | H | H | H | H | ClO₄⁻ | H |
| VII-27 | 2 | H | Me | H | H | ClO₄⁻ | H |
| VII-28 | 2 | Me | H | H | H | ClO₄⁻ | H |
| VII-29 | 2 | H | H | Me | H | ClO₄⁻ | H |
| VII-30 | 2 | H | Me | Me | H | ClO₄⁻ | H |
| VII-31 | 2 | Me | H | Me | H | ClO₄⁻ | H |
| VII-32 | 2 | H | H | H | Me | ClO₄⁻ | H |
| VII-33 | 2 | H | Me | H | Me | ClO₄⁻ | H |
| VII-34 | 2 | Me | H | H | Me | ClO₄⁻ | H |
| VII-35 | 2 | H | H | MeO | H | ClO₄⁻ | H |
| VII-36 | 2 | H | H | MeO | MeO | ClO₄⁻ | H |
| VII-37 | 2 | H | H | H | MeO | ClO₄⁻ | H |
| VII-38 | 1 | H | H | MeO | MeO | ClO₄⁻ | Me |
| VII-39 | 1 | H | H | H | MeO | ClO₄⁻ | Cl |
| VII-40 | 2 | H | H | MeO | MeO | ClO₄⁻ | Me |
| VII-41 | 2 | H | H | H | MeO | ClO₄⁻ | Cl |
| VII-42 | 1 | H | H | MeO | MeO | BF₄⁻ | H |
| VII-43 | 1 | H | H | H | MeO | PF₆⁻ | H |
| VII-44 | 2 | H | H | MeO | MeO | BF₄⁻ | H |
| VII-45 | 2 | H | H | H | MeO | PF₆⁻ | H |
| VII-46 | 1 | H | Me | H | H | PF₆⁻ | H |
| VII-47 | 1 | H | Pr | H | H | PF₆⁻ | H |
| VII-48 | 1 | H | Bu | H | H | PF₆⁻ | H |
| VII-49 | 1 | Me | Me | H | H | PF₆⁻ | H |
| VII-50 | 1 | Me | Pr | H | H | PF₆⁻ | H |
| VII-51 | 1 | Me | Bu | H | H | PF₆⁻ | H |
| VII-52 | 1 | Pr | Me | H | H | PF₆⁻ | H |
| VII-53 | 1 | Pr | Pr | H | H | PF₆⁻ | H |
| VII-54 | 1 | Pr | Bu | H | H | PF₆⁻ | H |
| VII-55 | 1 | Bu | Me | H | H | PF₆⁻ | H |
| VII-56 | 1 | Bu | Pr | H | H | PF₆⁻ | H |
| VII-57 | 1 | Bu | Bu | H | H | PF₆⁻ | H |
| VII-58 | 1 | Me | H | H | H | PF₆⁻ | H |
| VII-59 | 1 | Pr | H | H | H | PF₆⁻ | H |
| VII-60 | 1 | Bu | H | H | H | PF₆⁻ | H |
| VII-61 | 1 | Me | Me | H | H | PF₆⁻ | H |
| VII-62 | 1 | Pr | Me | H | H | PF₆⁻ | H |
| VII-63 | 1 | Bu | Me | H | H | PF₆⁻ | H |
| VII-64 | 1 | Me | Pr | H | H | PF₆⁻ | H |
| VII-65 | 1 | Pr | Pr | H | H | PF₆⁻ | H |
| VII-66 | 1 | Bu | Pr | H | H | PF₆⁻ | H |
| VII-67 | 1 | Me | Bu | H | H | PF₆⁻ | H |
| VII-68 | 1 | Pr | Bu | H | H | PF₆⁻ | H |
| VII-69 | 1 | Bu | Bu | H | H | PF₆⁻ | H |
| VII-70 | 2 | H | Me | H | H | PF₆⁻ | H |
| VII-71 | 2 | H | Pr | H | H | PF₆⁻ | H |
| VII-72 | 2 | H | Bu | H | H | PF₆⁻ | H |
| VII-73 | 2 | Me | Me | H | H | PF₆⁻ | H |
| VII-74 | 2 | Me | Pr | H | H | PF₆⁻ | H |
| VII-75 | 2 | Me | Bu | H | H | PF₆⁻ | H |
| VII-76 | 2 | Pr | Me | H | H | PF₆⁻ | H |
| VII-77 | 2 | Pr | Pr | H | H | PF₆⁻ | H |
| VII-78 | 2 | Pr | Bu | H | H | PF₆⁻ | H |
| VII-79 | 2 | Bu | Me | H | H | PF₆⁻ | H |
| VII-80 | 2 | Bu | Pr | H | H | PF₆⁻ | H |
| VII-81 | 2 | Bu | Bu | H | H | PF₆⁻ | H |
| VII-82 | 2 | Me | H | H | H | PF₆⁻ | H |
| VII-83 | 2 | Pr | H | H | H | PF₆⁻ | H |
| VII-84 | 2 | Bu | H | H | H | PF₆⁻ | H |
| VII-85 | 2 | Me | Me | H | H | PF₆⁻ | H |
| VII-86 | 2 | Pr | Me | H | H | PF₆⁻ | H |
| VII-87 | 2 | Bu | Me | H | H | PF₆⁻ | H |
| VII-88 | 2 | Me | Pr | H | H | PF₆⁻ | H |
| VII-89 | 2 | Pr | Pr | H | H | PF₆⁻ | H |
| VII-90 | 2 | Bu | Pr | H | H | PF₆⁻ | H |
| VII-91 | 2 | Me | Bu | H | H | PF₆⁻ | H |
| VII-92 | 2 | Pr | Bu | H | H | PF₆⁻ | H |
| VII-93 | 2 | Bu | Bu | H | H | PF₆⁻ | H |
| VII-94 | 1 | H | Me | H | H | PF₆⁻ | H |
| VII-95 | 1 | H | Pr | H | H | PF₆⁻ | H |
| VII-96 | 1 | H | Bu | H | H | PF₆⁻ | H |
| VII-97 | 1 | Me | Me | H | H | PF₆⁻ | H |
| VII-98 | 1 | Me | Pr | H | H | PF₆⁻ | H |
| VII-99 | 1 | Me | Bu | H | H | PF₆⁻ | H |
| VII-100 | 1 | Pr | Me | H | H | PF₆⁻ | H |
| VII-101 | 1 | Pr | Pr | H | H | PF₆⁻ | H |
| VII-102 | 1 | Pr | Bu | H | H | PF₆⁻ | H |
| VII-103 | 1 | Bu | Me | H | H | PF₆⁻ | H |
| VII-104 | 1 | Bu | Pr | H | H | PF₆⁻ | H |
| VII-105 | 1 | Bu | Bu | H | H | PF₆⁻ | H |
| VII-106 | 1 | Me | H | H | H | PF₆⁻ | H |
| VII-107 | 1 | Pr | H | H | H | PF₆⁻ | H |
| VII-108 | 1 | Bu | H | H | H | PF₆⁻ | H |
| VII-109 | 1 | Me | Me | H | H | PF₆⁻ | H |
| VII-110 | 1 | Pr | Me | H | H | PF₆⁻ | H |
| VII-111 | 1 | Bu | Me | H | H | PF₆⁻ | H |
| VII-112 | 1 | Me | Pr | H | H | PF₆⁻ | H |
| VII-113 | 1 | Pr | Pr | H | H | PF₆⁻ | H |
| VII-114 | 1 | Bu | Pr | H | H | PF₆⁻ | H |
| VII-115 | 1 | Me | Bu | H | H | PF₆⁻ | H |
| VII-68 | 1 | Pr | Bu | H | H | PF₆⁻ | H |
| VII-69 | 1 | Bu | Bu | H | H | PF₆⁻ | H |
| VII-70 | 2 | H | Me | H | H | PF₆⁻ | H |
| VII-71 | 2 | H | Pr | H | H | PF₆⁻ | H |
| VII-72 | 2 | H | Bu | H | H | PF₆⁻ | H |
| VII-73 | 2 | Me | Me | H | H | PF₆⁻ | H |
| VII-122 | 2 | Me | Pr | H | H | SbF₆⁻ | H |
| VII-123 | 2 | Me | Bu | H | H | SbF₆⁻ | H |
| VII-124 | 2 | Pr | Me | H | H | SbF₆⁻ | H |
| VII-125 | 2 | Pr | Pr | H | H | SbF₆⁻ | H |
| VII-126 | 2 | Pr | Bu | H | H | SbF₆⁻ | H |
| VII-127 | 2 | Bu | Me | H | H | SbF₆⁻ | H |
| VII-128 | 2 | Bu | Pr | H | H | SbF₆⁻ | H |

-continued

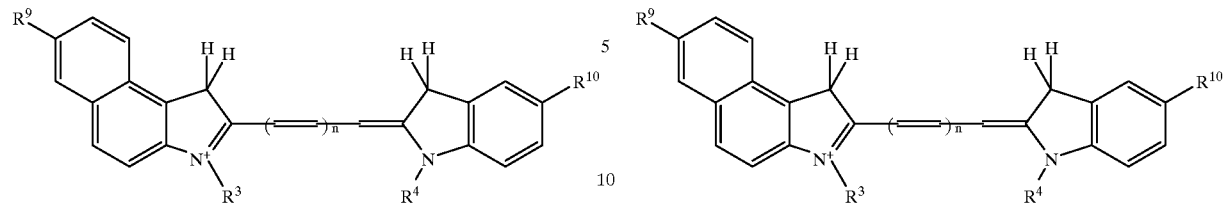

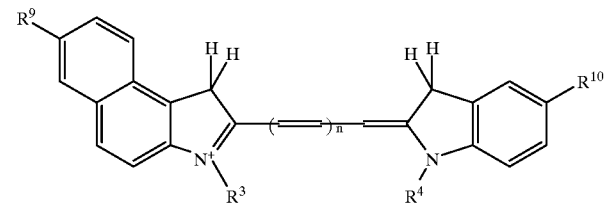

X⁻

| Compound No. | n | R³ | R⁴ | R⁹ | R¹⁰ | X⁻ | meso |
|---|---|---|---|---|---|---|---|
| VII-129 | 2 | Bu | Bu | H | H | SbF₆⁻ | H |
| VII-130 | 2 | Me | H | H | H | SbF₆⁻ | H |
| VII-131 | 2 | Pr | H | H | H | SbF₆⁻ | H |
| VII-132 | 2 | Bu | H | H | H | SbF₆⁻ | H |
| VII-133 | 2 | Me | Me | H | H | SbF₆⁻ | H |
| VII-134 | 2 | Pr | Me | H | H | SbF₆⁻ | H |
| VII-135 | 2 | Bu | Me | H | H | SbF₆⁻ | H |
| VII-136 | 2 | Me | Pr | H | H | SbF₆⁻ | H |
| VII-137 | 2 | Pr | Pr | H | H | SbF₆⁻ | H |
| VII-138 | 2 | Bu | Pr | H | H | SbF₆⁻ | H |
| VII-139 | 2 | Me | Bu | H | H | SbF₆⁻ | H |
| VII-140 | 2 | Pr | Bu | H | H | SbF₆⁻ | H |
| VII-141 | 2 | Bu | Bu | H | H | SbF₆⁻ | H |
| VII-142 | 1 | H | Me | H | H | I⁻ | H |
| VII-143 | 1 | H | Pr | H | H | I⁻ | H |
| VII-144 | 1 | H | Bu | H | H | I⁻ | H |
| VII-145 | 1 | Me | Me | H | H | I⁻ | H |
| VII-146 | 1 | Me | Pr | H | H | I⁻ | H |
| VII-147 | 1 | Me | Bu | H | H | I⁻ | H |
| VII-148 | 1 | Pr | Me | H | H | I⁻ | H |
| VII-149 | 1 | Pr | Pr | H | H | I⁻ | H |
| VII-150 | 1 | Pr | Bu | H | H | I⁻ | H |
| VII-151 | 1 | Bu | Me | H | H | I⁻ | H |
| VII-152 | 1 | Bu | Pr | H | H | I⁻ | H |
| VII-153 | 1 | Bu | Bu | H | H | I⁻ | H |
| VII-154 | 1 | Me | H | H | H | I⁻ | H |
| VII-155 | 1 | Pr | H | H | H | I⁻ | H |
| VII-156 | 1 | Bu | H | H | H | I⁻ | H |
| VII-157 | 1 | Me | Me | H | H | I⁻ | H |
| VII-158 | 1 | Pr | Me | H | H | I⁻ | H |
| VII-159 | 1 | Bu | Me | H | H | I⁻ | H |
| VII-160 | 1 | Me | Pr | H | H | I⁻ | H |
| VII-161 | 1 | Pr | Pr | H | H | I⁻ | H |
| VII-162 | 1 | Bu | Pr | H | H | I⁻ | H |
| VII-163 | 1 | Me | Bu | H | H | I⁻ | H |
| VII-164 | 1 | Pr | Bu | H | H | I⁻ | H |
| VII-165 | 1 | Bu | Bu | H | H | I⁻ | H |
| VII-166 | 2 | H | Me | H | H | I⁻ | H |
| VII-167 | 2 | H | Pr | H | H | I⁻ | H |
| VII-168 | 2 | H | Bu | H | H | I⁻ | H |
| VII-169 | 2 | Me | Me | H | H | I⁻ | H |
| VII-170 | 2 | Me | Pr | H | H | I⁻ | H |
| VII-171 | 2 | Me | Bu | H | H | I⁻ | H |
| VII-172 | 2 | Pr | Me | H | H | I⁻ | H |
| VII-173 | 2 | Pr | Pr | H | H | I⁻ | H |
| VII-174 | 2 | Pr | Bu | H | H | I⁻ | H |
| VII-175 | 2 | Bu | Me | H | H | I⁻ | H |
| VII-176 | 2 | Bu | Pr | H | H | I⁻ | H |
| VII-177 | 2 | Bu | Bu | H | H | I⁻ | H |
| VII-178 | 2 | Me | H | H | H | I⁻ | H |
| VII-179 | 2 | Pr | H | H | H | I⁻ | H |
| VII-180 | 2 | Bu | H | H | H | I⁻ | H |
| VII-181 | 2 | Me | Me | H | H | I⁻ | H |
| VII-182 | 2 | Pr | Me | H | H | I⁻ | H |
| VII-183 | 2 | Bu | Me | H | H | I⁻ | H |
| VII-184 | 2 | Me | Pr | H | H | I⁻ | H |
| VII-185 | 2 | Pr | Pr | H | H | I⁻ | H |
| VII-186 | 2 | Bu | Pr | H | H | I⁻ | H |
| VII-187 | 2 | Me | Bu | H | H | I⁻ | H |
| VII-188 | 2 | Pr | Bu | H | H | I⁻ | H |
| VII-189 | 2 | Bu | Bu | H | H | I⁻ | H |
| VII-190 | 1 | H | Me | H | H | 7-4 | H |
| VII-191 | 1 | H | Pr | H | H | 7-4 | H |
| VII-192 | 1 | H | Bu | H | H | 7-4 | H |
| VII-193 | 1 | Me | Me | H | H | 7-4 | H |
| VII-194 | 1 | Me | Pr | H | H | 7-4 | H |
| VII-195 | 1 | Me | Bu | H | H | 7-4 | H |
| VII-196 | 1 | Pr | Me | H | H | 7-4 | H |
| VII-197 | 1 | Pr | Pr | H | H | 7-4 | H |
| VII-198 | 1 | Pr | Bu | H | H | 7-4 | H |
| VII-199 | 1 | Bu | Me | H | H | 7-4 | H |
| VII-200 | 1 | Bu | Pr | H | H | 7-4 | H |
| VII-201 | 1 | Bu | Bu | H | H | 7-4 | H |
| VII-202 | 1 | Me | H | H | H | 7-4 | H |
| VII-203 | 1 | Pr | H | H | H | 7-4 | H |
| VII-204 | 1 | Bu | H | H | H | 7-4 | H |
| VII-205 | 1 | Me | Me | H | H | 7-4 | H |
| VII-206 | 1 | Pr | Me | H | H | 7-4 | H |
| VII-207 | 1 | Bu | Me | H | H | 7-4 | H |
| VII-208 | 1 | Me | Pr | H | H | 7-4 | H |
| VII-209 | 1 | Pr | Pr | H | H | 7-4 | H |
| VII-210 | 1 | Bu | Pr | H | H | 7-4 | H |
| VII-211 | 1 | Me | Bu | H | H | 7-4 | H |
| VII-212 | 1 | Pr | Bu | H | H | 7-4 | H |
| VII-213 | 1 | Bu | Bu | H | H | 7-4 | H |
| VII-214 | 2 | H | Me | H | H | 7-4 | H |
| VII-215 | 2 | H | Pr | H | H | 7-4 | H |
| VII-216 | 2 | H | Bu | H | H | 7-4 | H |
| VII-217 | 2 | Me | Me | H | H | 7-4 | H |
| VII-218 | 2 | Me | Pr | H | H | 7-4 | H |
| VII-219 | 2 | Me | Bu | H | H | 7-4 | H |
| VII-220 | 2 | Pr | Me | H | H | 7-4 | H |
| VII-221 | 2 | Pr | Pr | H | H | 7-4 | H |
| VII-222 | 2 | Pr | Bu | H | H | 7-4 | H |
| VII-223 | 2 | Bu | Me | H | H | 7-4 | H |
| VII-224 | 2 | Bu | Pr | H | H | 7-4 | H |
| VII-225 | 2 | Bu | Bu | H | H | 7-4 | H |
| VII-226 | 2 | Me | H | H | H | 7-4 | H |
| VII-227 | 2 | Pr | H | H | H | 7-4 | H |
| VII-228 | 2 | Bu | H | H | H | 7-4 | H |
| VII-229 | 2 | Me | Me | H | H | 7-4 | H |
| VII-230 | 2 | Pr | Me | H | H | 7-4 | H |
| VII-231 | 2 | Bu | Me | H | H | 7-4 | H |
| VII-232 | 2 | Me | Pr | H | H | 7-4 | H |
| VII-233 | 2 | Pr | Pr | H | H | 7-4 | H |
| VII-234 | 2 | Bu | Pr | H | H | 7-4 | H |
| VII-235 | 2 | Me | Bu | H | H | 7-4 | H |
| VII-236 | 2 | Pr | Bu | H | H | 7-4 | H |
| VII-237 | 2 | Bu | Bu | H | H | 7-4 | H |
| VII-238 | 1 | H | Me | H | H | 7-5 | H |
| VII-239 | 1 | H | Pr | H | H | 7-5 | H |
| VII-240 | 1 | H | Bu | H | H | 7-5 | H |
| VII-241 | 1 | Me | Me | H | H | 7-5 | H |
| VII-242 | 1 | Me | Pr | H | H | 7-5 | H |
| VII-243 | 1 | Me | Bu | H | H | 7-5 | H |
| VII-244 | 1 | Pr | Me | H | H | 7-5 | H |
| VII-245 | 1 | Pr | Pr | H | H | 7-5 | H |
| VII-246 | 1 | Pr | Bu | H | H | 7-5 | H |
| VII-247 | 1 | Bu | Me | H | H | 7-5 | H |
| VII-248 | 1 | Bu | Pr | H | H | 7-5 | H |
| VII-249 | 1 | Bu | Bu | H | H | 7-5 | H |
| VII-250 | 1 | Me | H | H | H | 7-5 | H |
| VII-251 | 1 | Pr | H | H | H | 7-5 | H |
| VII-252 | 1 | Bu | H | H | H | 7-5 | H |

-continued

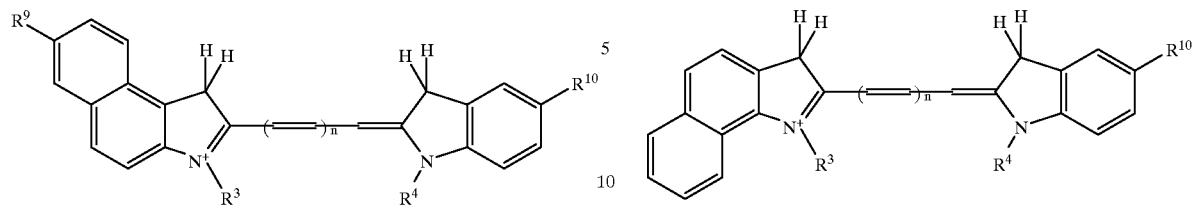

X⁻

| Compound No. | n | R³ | R⁴ | R⁹ | R¹⁰ | X⁻ | meso |
|---|---|---|---|---|---|---|---|
| VII-253 | 1 | Me | Me | H | H | 7-5 | H |
| VII-254 | 1 | Pr | Me | H | H | 7-5 | H |
| VII-255 | 1 | Bu | Me | H | H | 7-5 | H |
| VII-256 | 1 | Me | Pr | H | H | 7-5 | H |
| VII-257 | 1 | Pr | Pr | H | H | 7-5 | H |
| VII-258 | 1 | Bu | Pr | H | H | 7-5 | H |
| VII-259 | 1 | Me | Bu | H | H | 7-5 | H |
| VII-260 | 1 | Pr | Bu | H | H | 7-5 | H |
| VII-261 | 1 | Bu | Bu | H | H | 7-5 | H |
| VII-262 | 2 | H | Me | H | H | 7-5 | H |
| VII-263 | 2 | H | Pr | H | H | 7-5 | H |
| VII-264 | 2 | H | Bu | H | H | 7-5 | H |
| VII-265 | 2 | Me | Me | H | H | 7-5 | H |
| VII-266 | 2 | Me | Pr | H | H | 7-5 | H |
| VII-267 | 2 | Me | Bu | H | H | 7-5 | H |
| VII-268 | 2 | Pr | Me | H | H | 7-5 | H |
| VII-269 | 2 | Pr | Pr | H | H | 7-5 | H |
| VII-270 | 2 | Pr | Bu | H | H | 7-5 | H |
| VII-271 | 2 | Bu | Me | H | H | 7-5 | H |
| VII-272 | 2 | Bu | Pr | H | H | 7-5 | H |
| VII-273 | 2 | Bu | Bu | H | H | 7-5 | H |
| VII-274 | 2 | Me | H | H | H | 7-5 | H |
| VII-275 | 2 | Pr | H | H | H | 7-5 | H |
| VII-276 | 2 | Bu | H | H | H | 7-5 | H |
| VII-277 | 2 | Me | Me | H | H | 7-5 | H |
| VII-278 | 2 | Pr | Me | H | H | 7-5 | H |
| VII-279 | 2 | Bu | Me | H | H | 7-5 | H |
| VII-280 | 2 | Me | Pr | H | H | 7-5 | H |
| VII-281 | 2 | Pr | Pr | H | H | 7-5 | H |
| VII-282 | 2 | Bu | Pr | H | H | 7-5 | H |
| VII-283 | 2 | Me | Bu | H | H | 7-5 | H |
| VII-284 | 2 | Pr | Bu | H | H | 7-5 | H |
| VII-285 | 2 | Bu | Bu | H | H | 7-5 | H |

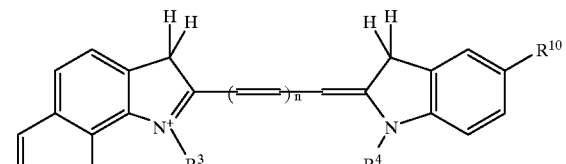

X⁻

| Compound No. | n | R³ | R⁴ | R¹⁰ | X⁻ | meso |
|---|---|---|---|---|---|---|
| VIII-1 | 0 | H | H | H | ClO₄⁻ | H |
| VIII-2 | 0 | Me | H | H | ClO₄⁻ | H |
| VIII-3 | 0 | H | Me | H | ClO₄⁻ | H |
| VIII-4 | 0 | H | H | Me | ClO₄⁻ | H |
| VIII-5 | 0 | Me | H | Me | ClO₄⁻ | H |
| VIII-6 | 0 | H | Me | Me | ClO₄⁻ | H |
| VIII-7 | 0 | H | H | MeO | ClO₄⁻ | H |
| VIII-8 | 0 | Me | H | MeO | ClO₄⁻ | H |
| VIII-9 | 0 | H | Me | MeO | ClO₄⁻ | H |
| VIII-10 | 1 | H | H | H | ClO₄⁻ | H |
| VIII-11 | 1 | Me | H | H | ClO₄⁻ | H |
| VIII-12 | 1 | H | Me | H | 7-1 | H |
| VIII-13 | 1 | H | H | Me | ClO₄⁻ | H |
| VIII-14 | 1 | Me | H | Me | ClO₄⁻ | H |
| VIII-15 | 1 | H | Me | Me | ClO₄⁻ | H |
| VIII-16 | 1 | H | H | MeO | ClO₄⁻ | H |
| VIII-17 | 1 | Me | H | MeO | ClO₄⁻ | H |
| VIII-18 | 1 | H | Me | MeO | ClO₄⁻ | H |
| VIII-19 | 2 | H | H | H | ClO₄⁻ | H |
| VIII-20 | 2 | Me | H | H | ClO₄⁻ | H |
| VIII-21 | 2 | H | Me | H | ClO₄⁻ | H |
| VIII-22 | 2 | H | H | Me | ClO₄⁻ | H |
| VIII-23 | 2 | Me | H | Me | ClO₄⁻ | H |
| VIII-24 | 2 | H | Me | Me | ClO₄⁻ | H |
| VIII-25 | 2 | H | H | MeO | ClO₄⁻ | H |
| VIII-26 | 2 | Me | H | MeO | ClO₄⁻ | H |
| VIII-27 | 2 | H | Me | MeO | ClO₄⁻ | H |
| VIII-28 | 1 | H | H | H | ClO₄⁻ | Me |
| VIII-29 | 1 | Me | Me | H | ClO₄⁻ | Cl |
| VIII-30 | 2 | H | Pr | H | ClO₄⁻ | Me |
| VIII-31 | 2 | Me | Me | H | ClO₄⁻ | Cl |
| VIII-32 | 1 | H | BF₄⁻ | H | ClO₄⁻ | H |
| VIII-33 | 1 | Me | PF₆⁻ | H | ClO₄⁻ | H |
| VIII-34 | 2 | H | BF₄⁻ | H | ClO₄⁻ | H |
| VIII-35 | 2 | Me | PF₆⁻ | H | ClO₄⁻ | H |
| VIII-36 | 1 | H | Me | H | PF₆⁻ | H |
| VIII-37 | 1 | H | Pr | H | PF₆⁻ | H |
| VIII-38 | 1 | H | Bu | H | PF₆⁻ | H |
| VIII-39 | 1 | Me | Me | H | PF₆⁻ | H |
| VIII-40 | 1 | Me | Pr | H | PF₆⁻ | H |
| VIII-41 | 1 | Me | Bu | H | PF₆⁻ | H |
| VIII-42 | 1 | Pr | Me | H | PF₆⁻ | H |
| VIII-43 | 1 | Pr | Pr | H | PF₆⁻ | H |
| VIII-44 | 1 | Pr | Bu | H | PF₆⁻ | H |
| VIII-45 | 1 | Bu | Me | H | PF₆⁻ | H |
| VIII-46 | 1 | Bu | Pr | H | PF₆⁻ | H |
| VIII-47 | 1 | Bu | Bu | H | PF₆⁻ | H |
| VIII-48 | 1 | Me | H | H | PF₆⁻ | H |
| VIII-49 | 1 | Pr | H | H | PF₆⁻ | H |
| VIII-50 | 1 | Bu | H | H | PF₆⁻ | H |
| VIII-51 | 1 | Me | Me | H | PF₆⁻ | H |
| VIII-52 | 1 | Pr | Me | H | PF₆⁻ | H |
| VIII-53 | 1 | Bu | Me | H | PF₆⁻ | H |
| VIII-54 | 1 | Me | Pr | H | PF₆⁻ | H |
| VIII-55 | 1 | Pr | Pr | H | PF₆⁻ | H |
| VIII-56 | 1 | Bu | Pr | H | PF₆⁻ | H |
| VIII-57 | 1 | Me | Bu | H | PF₆⁻ | H |
| VIII-58 | 1 | Pr | Bu | H | PF₆⁻ | H |
| VIII-59 | 1 | Bu | Bu | H | PF₆⁻ | H |
| VIII-60 | 2 | H | Me | H | PF₆⁻ | H |
| VIII-61 | 2 | H | Pr | H | PF₆⁻ | H |
| VIII-62 | 2 | H | Bu | H | PF₆⁻ | H |
| VIII-63 | 2 | Me | Me | H | PF₆⁻ | H |
| VIII-64 | 2 | Me | Pr | H | PF₆⁻ | H |
| VIII-65 | 2 | Me | Bu | H | PF₆⁻ | H |
| VIII-66 | 2 | Pr | Me | H | PF₆⁻ | H |
| VIII-67 | 2 | Pr | Pr | H | PF₆⁻ | H |
| VIII-68 | 2 | Pr | Bu | H | PF₆⁻ | H |
| VIII-69 | 2 | Bu | Me | H | PF₆⁻ | H |
| VIII-70 | 2 | Bu | Pr | H | PF₆⁻ | H |
| VIII-71 | 2 | Bu | Bu | H | PF₆⁻ | H |
| VIII-72 | 2 | Me | H | H | PF₆⁻ | H |

-continued

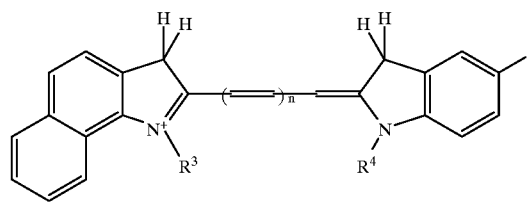

X⁻

-continued

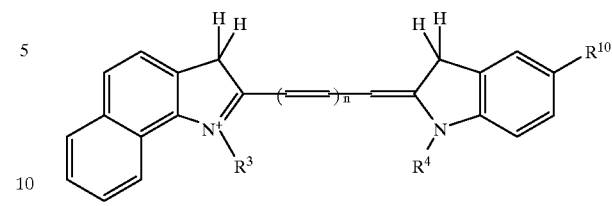

X⁻

| Compound No. | n | R³ | R⁴ | R¹⁰ | X⁻ | meso | Compound No. | n | R³ | R⁴ | R¹⁰ | X⁻ | meso |
| --- | --- | --- | --- | --- | --- | --- | --- | --- | --- | --- | --- | --- | --- |
| VIII-73 | 2 | Pr | H | H | PF₆⁻ | H | VIII-136 | 1 | Me | Pr | H | I⁻ | H |
| VIII-74 | 2 | Bu | H | H | PF₆⁻ | H | VIII-137 | 1 | Me | Bu | H | I⁻ | H |
| VIII-75 | 2 | Me | Me | H | PF₆⁻ | H | VIII-138 | 1 | Pr | Me | H | I⁻ | H |
| VIII-76 | 2 | Pr | Me | H | PF₆⁻ | H | VIII-139 | 1 | Pr | Pr | H | I⁻ | H |
| VIII-77 | 2 | Bu | Me | H | PF₆⁻ | H | VIII-140 | 1 | Pr | Bu | H | I⁻ | H |
| VIII-78 | 2 | Me | Pr | H | PF₆⁻ | H | VIII-141 | 1 | Bu | Me | H | I⁻ | H |
| VIII-79 | 2 | Pr | Pr | H | PF₆⁻ | H | VIII-142 | 1 | Bu | Pr | H | I⁻ | H |
| VIII-80 | 2 | Bu | Pr | H | PF₆⁻ | H | VIII-143 | 1 | Bu | Bu | H | I⁻ | H |
| VIII-81 | 2 | Me | Bu | H | PF₆⁻ | H | VIII-144 | 1 | Me | H | H | I⁻ | H |
| VIII-82 | 2 | Pr | Bu | H | PF₆⁻ | H | VIII-145 | 1 | Pr | H | H | I⁻ | H |
| VIII-83 | 2 | Bu | Bu | H | PF₆⁻ | H | VIII-146 | 1 | Bu | H | H | I⁻ | H |
| VIII-84 | 1 | H | Me | H | SbF₆⁻ | H | VIII-147 | 1 | Me | Me | H | I⁻ | H |
| VIII-85 | 1 | H | Pr | H | SbF₆⁻ | H | VIII-148 | 1 | Pr | Me | H | I⁻ | H |
| VIII-86 | 1 | H | Bu | H | SbF₆⁻ | H | VIII-149 | 1 | Bu | Me | H | I⁻ | H |
| VIII-87 | 1 | Me | Me | H | SbF₆⁻ | H | VIII-150 | 1 | Me | Pr | H | I⁻ | H |
| VIII-88 | 1 | Me | Pr | H | SbF₆⁻ | H | VIII-151 | 1 | Pr | Pr | H | I⁻ | H |
| VIII-89 | 1 | Me | Bu | H | SbF₆⁻ | H | VIII-152 | 1 | Bu | Pr | H | I⁻ | H |
| VIII-90 | 1 | Pr | Me | H | SbF₆⁻ | H | VIII-153 | 1 | Me | Bu | H | I⁻ | H |
| VIII-91 | 1 | Pr | Pr | H | SbF₆⁻ | H | VIII-154 | 1 | Pr | Bu | H | I⁻ | H |
| VIII-92 | 1 | Pr | Bu | H | SbF₆⁻ | H | VIII-155 | 2. | Bu | Bu | H | I⁻ | H |
| VIII-93 | 1 | Bu | Me | H | SbF₆⁻ | H | VIII-156 | 2 | Me | Me | H | I⁻ | H |
| VIII-94 | 1 | Bu | Pr | H | SbF₆⁻ | H | VIII-157 | 2 | H | Pr | H | I⁻ | H |
| VIII-95 | 1 | Bu | Bu | H | SbF₆⁻ | H | VIII-158 | 2 | H | Bu | H | I⁻ | H |
| VIII-96 | 1 | Me | H | H | SbF₆⁻ | H | VIII-159 | 2 | Me | Me | H | I⁻ | H |
| VIII-97 | 1 | Pr | H | H | SbF₆⁻ | H | VIII-160 | 2 | Me | Pr | H | I⁻ | H |
| VIII-98 | 1 | Bu | H | H | SbF₆⁻ | H | VIII-161 | 2 | Me | Bu | H | I⁻ | H |
| VIII-99 | 1 | Me | Me | H | SbF₆⁻ | H | VIII-162 | 2 | Pr | Me | H | I⁻ | H |
| VIII-100 | 1 | Pr | Me | H | SbF₆⁻ | H | VIII-163 | 2 | Pr | Pr | H | I⁻ | H |
| VIII-101 | 1 | Bu | Me | H | SbF₆⁻ | H | VIII-164 | 2 | Pr | Bu | H | I⁻ | H |
| VIII-102 | 1 | Me | Pr | H | SbF₆⁻ | H | VIII-165 | 2 | Bu | Me | H | I⁻ | H |
| VIII-103 | 1 | Pr | Pr | H | SbF₆⁻ | H | VIII-166 | 2 | Bu | Pr | H | I⁻ | H |
| VIII-104 | 1 | Bu | Pr | H | SbF₆⁻ | H | VIII-167 | 2 | Bu | Bu | H | I⁻ | H |
| VIII-105 | 1 | Me | Bu | H | SbF₆⁻ | H | VIII-168 | 2 | Me | H | H | I⁻ | H |
| VIII-106 | 1 | Pr | Bu | H | SbF₆⁻ | H | VIII-169 | 2 | Pr | H | H | I⁻ | H |
| VIII-107 | 1 | Bu | Bu | H | SbF₆⁻ | H | VIII-170 | 2 | Bu | H | H | I⁻ | H |
| VIII-108 | 2 | H | Me | H | SbF₆⁻ | H | VIII-171 | 2 | Me | Me | H | I⁻ | H |
| VIII-109 | 2 | H | Pr | H | SbF₆⁻ | H | VIII-172 | 2 | Pr | Me | H | I⁻ | H |
| VIII-110 | 2 | H | Bu | H | SbF₆⁻ | H | VIII-173 | 2 | Bu | Me | H | I⁻ | H |
| VIII-111 | 2 | Me | Me | H | SbF₆⁻ | H | VIII-174 | 2 | Me | Pr | H | I⁻ | H |
| VIII-112 | 2 | Me | Pr | H | SbF₆⁻ | H | VIII-175 | 2 | Pr | Pr | H | I⁻ | H |
| VIII-113 | 2 | Me | Bu | H | SbF₆⁻ | H | VIII-176 | 2 | Bu | Pr | H | I⁻ | H |
| VIII-114 | 2 | Pr | Me | H | SbF₆⁻ | H | VIII-177 | 2 | Me | Bu | H | I⁻ | H |
| VIII-115 | 2 | Pr | Pr | H | SbF₆⁻ | H | VIII-178 | 2 | Pr | Bu | H | I⁻ | H |
| VIII-116 | 2 | Pr | Bu | H | SbF₆⁻ | H | VIII-179 | 2 | Bu | Bu | H | I⁻ | H |
| VIII-117 | 2 | Bu | Me | H | SbF₆⁻ | H | VIII-180 | 1 | H | Me | H | 7-4 | H |
| VIII-118 | 2 | Bu | Pr | H | SbF₆⁻ | H | VIII-181 | 1 | H | Pr | H | 7-4 | H |
| VIII-119 | 2 | Bu | Bu | H | SbF₆⁻ | H | VIII-182 | 1 | H | Bu | H | 7-4 | H |
| VIII-120 | 2 | Me | H | H | SbF₆⁻ | H | VIII-183 | 1 | Me | Me | H | 7-4 | H |
| VIII-121 | 2 | Pr | H | H | SbF₆⁻ | H | VIII-184 | 1 | Me | Pr | H | 7-4 | H |
| VIII-122 | 2 | Bu | H | H | SbF₆⁻ | H | VIII-185 | 1 | Me | Bu | H | 7-4 | H |
| VIII-123 | 2 | Me | Me | H | SbF₆⁻ | H | VIII-186 | 1 | Pr | Me | H | 7-4 | H |
| VIII-124 | 2 | Pr | Me | H | SbF₆⁻ | H | VIII-187 | 1 | Pr | Pr | H | 7-4 | H |
| VIII-125 | 2 | Bu | Me | H | SbF₆⁻ | H | VIII-188 | 1 | Pr | Bu | H | 7-4 | H |
| VIII-126 | 2 | Me | Pr | H | SbF₆⁻ | H | VIII-189 | 1 | Bu | Me | H | 7-4 | H |
| VIII-127 | 2 | Pr | Pr | H | SbF₆⁻ | H | VIII-190 | 1 | Bu | Pr | H | 7-4 | H |
| VIII-128 | 2 | Bu | Pr | H | SbF₆⁻ | H | VIII-191 | 1 | Bu | Bu | H | 7-4 | H |
| VIII-129 | 2 | Me | Bu | H | SbF₆⁻ | H | VIII-192 | 1 | Me | H | H | 7-4 | H |
| VIII-130 | 2 | Pr | Bu | H | SbF₆⁻ | H | VIII-193 | 1 | Pr | H | H | 7-4 | H |
| VIII-131 | 2 | Bu | Bu | H | SbF₆⁻ | H | VIII-194 | 1 | Bu | H | H | 7-4 | H |
| VIII-132 | 1 | H | Me | H | I⁻ | H | VIII-195 | 1 | Me | Me | H | 7-4 | H |
| VIII-133 | 1 | H | Pr | H | I⁻ | H | VIII-196 | 1 | Pr | Me | H | 7-4 | H |
| VIII-134 | 1 | H | Bu | H | I⁻ | H | VIII-197 | 1 | Bu | Me | H | 7-4 | H |
| VIII-135 | 1 | Me | Me | H | I⁻ | H | VIII-198 | 1 | Me | Pr | H | 7-4 | H |

-continued

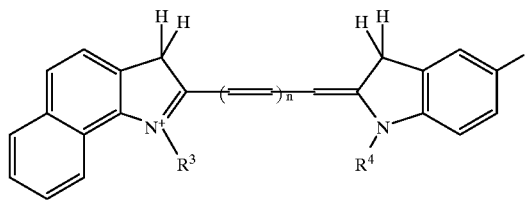

| Compound No. | n | $R^3$ | $R^4$ | $R^{10}$ | $X^-$ | meso |
|---|---|---|---|---|---|---|
| VIII-199 | 1 | Pr | Pr | H | 7-4 | H |
| VIII-200 | 1 | Bu | Pr | H | 7-4 | H |
| VIII-201 | 1 | Me | Bu | H | 7-4 | H |
| VIII-202 | 1 | Pr | Bu | H | 7-4 | H |
| VIII-203 | 1 | Bu | Bu | H | 7-4 | H |
| VIII-204 | 2 | H | Me | H | 7-4 | H |
| VIII-205 | 2 | H | Pr | H | 7-4 | H |
| VIII-206 | 2 | H | Bu | H | 7-4 | H |
| VIII-207 | 2 | Me | Me | H | 7-4 | H |
| VIII-208 | 2 | Me | Pr | H | 7-4 | H |
| VIII-209 | 2 | Me | Bu | H | 7-4 | H |
| VIII-210 | 2 | Pr | Me | H | 7-4 | H |
| VIII-211 | 2 | Pr | Pr | H | 7-4 | H |
| VIII-212 | 2 | Pr | Bu | H | 7-4 | H |
| VIII-213 | 2 | Bu | Me | H | 7-4 | H |
| VIII-214 | 2 | Bu | Pr | H | 7-4 | H |
| VIII-215 | 2 | Bu | Bu | H | 7-4 | H |
| VIII-216 | 2 | Me | H | H | 7-4 | H |
| VIII-217 | 2 | Pr | H | H | 7-4 | H |
| VIII-218 | 2 | Bu | H | H | 7-4 | H |
| VIII-219 | 2 | Me | Me | H | 7-4 | H |
| VIII-220 | 2 | Pr | Me | H | 7-4 | H |
| VIII-221 | 2 | Bu | Me | H | 7-4 | H |
| VIII-222 | 2 | Me | Pr | H | 7-4 | H |
| VIII-223 | 2 | Pr | Pr | H | 7-4 | H |
| VIII-224 | 2 | Bu | Pr | H | 7-4 | H |
| VIII-225 | 2 | Me | Bu | H | 7-4 | H |
| VIII-226 | 2 | Pr | Bu | H | 7-4 | H |
| VIII-227 | 2 | Bu | Bu | H | 7-4 | H |
| VIII-228 | 1 | H | Me | H | 7-5 | H |
| VIII-229 | 1 | H | Pr | H | 7-5 | H |
| VIII-230 | 1 | H | Bu | H | 7-5 | H |
| VIII-231 | 1 | Me | Me | H | 7-5 | H |
| VIII-232 | 1 | Me | Pr | H | 7-5 | H |
| VIII-233 | 1 | Me | Bu | H | 7-5 | H |
| VIII-234 | 1 | Pr | Me | H | 7-5 | H |
| VIII-235 | 1 | Pr | Pr | H | 7-5 | H |
| VIII-236 | 1 | Pr | Bu | H | 7-5 | H |
| VIII-237 | 1 | Bu | Me | H | 7-5 | H |
| VIII-238 | 1 | Bu | Pr | H | 7-5 | H |
| VIII-239 | 1 | Bu | Bu | H | 7-5 | H |
| VIII-240 | 1 | Me | H | H | 7-5 | H |
| VIII-241 | 1 | Pr | H | H | 7-5 | H |
| VIII-242 | 1 | Bu | H | H | 7-5 | H |
| VIII-243 | 1 | Me | Me | H | 7-5 | H |
| VIII-244 | 1 | Pr | Me | H | 7-5 | H |
| VIII-245 | 1 | Bu | Me | H | 7-5 | H |
| VIII-246 | 1 | Me | Pr | H | 7-5 | H |
| VIII-247 | 1 | Pr | Pr | H | 7-5 | H |
| VIII-248 | 1 | Bu | Pr | H | 7-5 | H |
| VIII-249 | 1 | Me | Bu | H | 7-5 | H |
| VIII-250 | 1 | Pr | Bu | H | 7-5 | H |
| VIII-251 | 1 | Bu | Bu | H | 7-5 | H |
| VIII-252 | 2 | H | Me | H | 7-5 | H |
| VIII-253 | 2 | H | Pr | H | 7-5 | H |
| VIII-254 | 2 | H | Bu | H | 7-5 | H |
| VIII-255 | 2 | Me | Me | H | 7-5 | H |
| VIII-256 | 2 | Me | Pr | H | 7-5 | H |
| VIII-257 | 2 | Me | Bu | H | 7-5 | H |
| VIII-258 | 2 | Pr | Me | H | 7-5 | H |
| VIII-259 | 2 | Pr | Pr | H | 7-5 | H |
| VIII-260 | 2 | Pr | Bu | H | 7-5 | H |
| VIII-261 | 2 | Bu | Me | H | 7-5 | H |

-continued

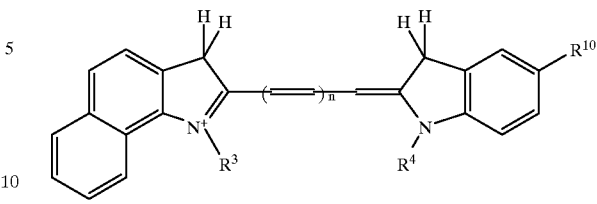

| Compound No. | n | $R^3$ | $R^4$ | $R^{10}$ | $X^-$ | meso |
|---|---|---|---|---|---|---|
| VIII-262 | 2 | Bu | Pr | H | 7-5 | H |
| VIII-263 | 2 | Bu | Bu | H | 7-5 | H |
| VIII-264 | 2 | Me | H | H | 7-5 | H |
| VIII-265 | 2 | Pr | H | H | 7-5 | H |
| VIII-266 | 2 | Bu | H | H | 7-5 | H |
| VIII-267 | 2 | Me | Me | H | 7-5 | H |
| VIII-268 | 2 | Pr | Me | H | 7-5 | H |
| VIII-269 | 2 | Bu | Me | H | 7-5 | H |
| VIII-270 | 2 | Me | Pr | H | 7-5 | H |
| VIII-271 | 2 | Pr | Pr | H | 7-5 | H |
| VIII-272 | 2 | Bu | Pr | H | 7-5 | H |
| VIII-273 | 2 | Me | Bu | H | 7-5 | H |
| VIII-274 | 2 | Pr | Bu | H | 7-5 | H |
| VIII-275 | 2 | Bu | Bu | H | 7-5 | H |

The new cyanine dye compounds of III-1 through VIII-275 and other analogous dye compounds can be prepared in manners to similar to the known methods for preparing cyanine dye compounds, such as those described in the following texts and publications: F. M. Harmer "Heterocyclic Compounds-Cyanine dyes and Related Compounds", John Wiley & Sons, New York, London. 1064; D. M. Sturmer "Heterocyclic Compounds-Special Topics in Heterocyclic Chemistry", Chapter 18, Section 14, pp. 482–515, John Wiley & Sons, New York, London, 1977; "Rodd's Chemistry of Carbon Compounds", 2nd, Ed., vol IV, part B. 1977, Chapter 15, pp. 369–422, Elsevier Science Publishing Company, New York; and other publications such as Japanese Patent Provisional Publication No. H10-226170.

[Synthesis of Cyanine Dye Compound No. IV-32]

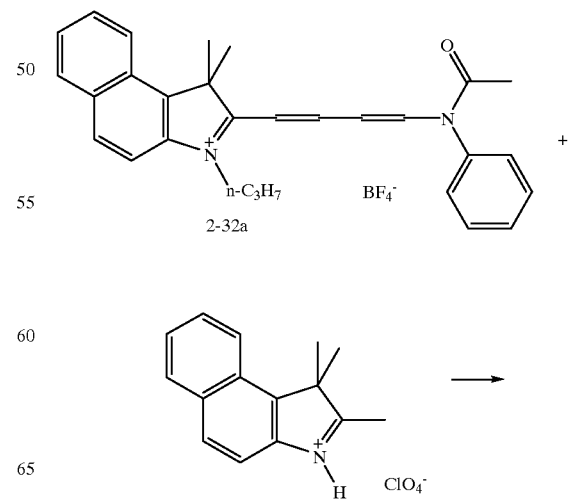

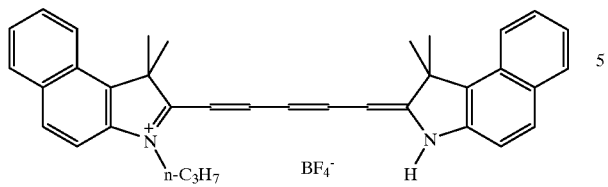

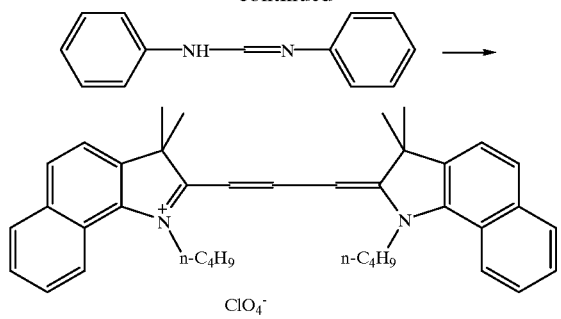

In 20 mL of methanol were placed 5.26 g of the known compound (2–32a) and 3.1 g of trimethylbenzoindolenine perchlorate, and the mixture was stirred to give a solution. To the solution was added 2.9 mL of triethylamine. The resulting mixture was stirred for 5 min., at room temperature, and then stirred at 40° C. for 6 hrs. The reaction mixture was gradually cooled to room temperature. To the cooled reaction mixture was slowly added 2.1 mL of aqueous 42% borofluoric acid solution, and the resulting mixture was stirred for 2 hrs., at room temperature. The precipitated crystalline dye was collected by filtration and dried under reduced pressure to obtain 5.00 g of the desired compound (yield: 85.5%).

In 5 mL of ethanol were placed 4.0 g of the known compound (3–5a) and 1.0 g of N,N'-dimethylformamide, and the mixture was stirred to give a solution. To the solution was slowly added 1.1 mL of acetic anhydride at room temperature. The resulting mixture was stirred for 8 min., at room temperature. To the reaction mixture was slowly added 1.0 mL of aqueous 70% perchloric acid, and the mixture was stirred further for one hour. The precipitated crystalline dye was collected by filtration and dried under reduced pressure to obtain 2.50 g of the desired compound (yield; 78.0%).

The absorption spectrum and optical data are set forth in Table 1.

[Synthesis of Cyanine Dye Compound No VI-8]

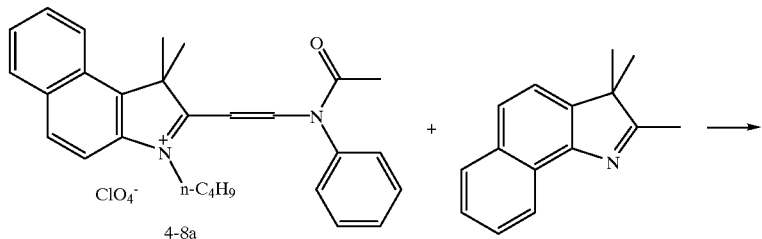

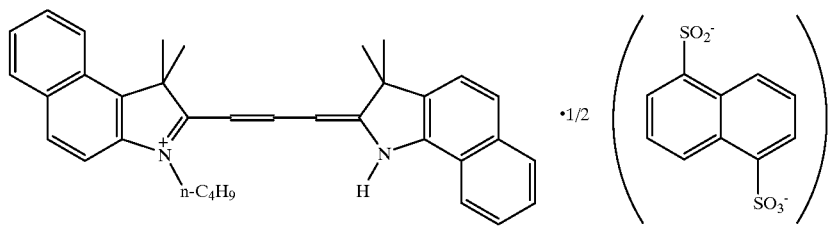

The absorption spectrum and optical data are set forth in Table 1.

[Synthesis of Cyanine Dye Compound No. V-5]

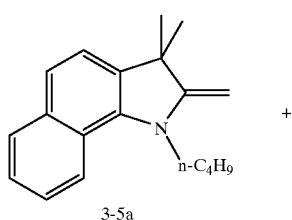

In 30 mL of ethanol were placed 4.99 g of the known compound (4–8a) and 2.31 g of trimethylbenzoindolenine, and the mixture was stirred at 80° C. for 6 hrs. After the reaction was complete, the reaction mixture was cooled to room temperature. To the cooled mixture was then added 5.4 g of 1,4-naphthalenesulfonic acid, and the mixture was stirred for 2 hrs. The precipitated crystalline dye was collected by filtration and dried under reduced pressure to obtain 5.50 g of the desired compound (yield: 87.5%).

The absorption spectrum and optical data are set forth in Table 1.

[Synthesis of Cyanine Dye Compound No. VI-28]

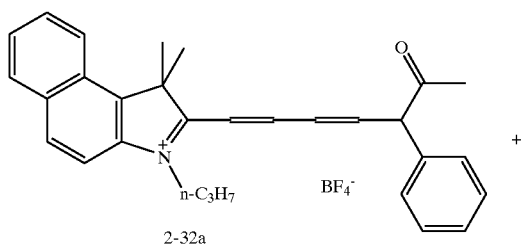

2-32a

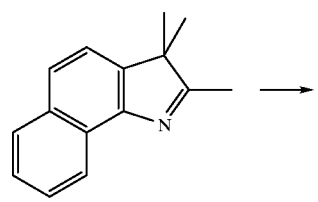

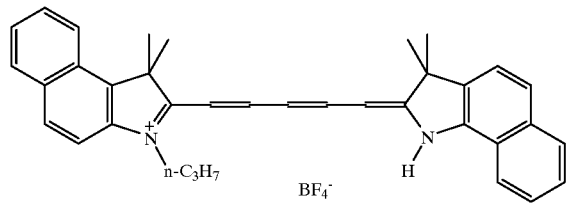

In methanol were placed 10.52 g of the known compound (2–32a) and 5.02 g of trimethylbenzoindolenine, and the mixture was stirred at 40° C. for 6 hrs. After the reaction was complete, the reaction mixture was cooled to room temperature. The precipitated crystalline dye was collected by filtration and dried under reduced pressure to obtain 10.50 g of the desired compound (yield: 89.2%).

The absorption spectrum and optical data are set forth in Table 1.

[Synthesis of Cyanine Dye Compound No. VI-31]

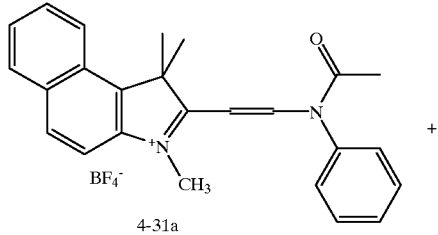

4-31a

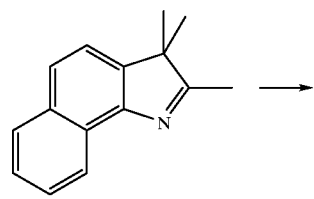

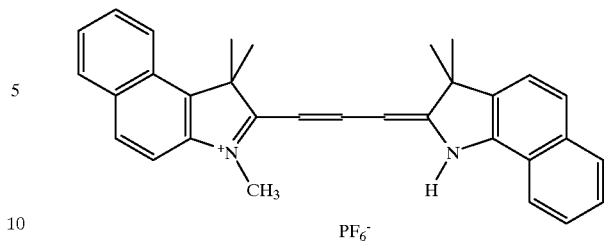

In 30 mL of ethanol were placed 4.56 g of the known compound (4–31a) and 2.31 g of trimethylbenzoindolenine, and the mixture was stirred at 80° C. for 6 hrs. After the reaction was complete, the reaction mixture was cooled to room temperature. The precipitated crystalline dye was collected by filtration and dried under reduced pressure to obtain 5.43 g of the desired compound (yield: 92.3%).

The absorption spectrum and optical data are set forth in Table 1.

[Synthesis of Cyanine Dye Compound No- VI-33]

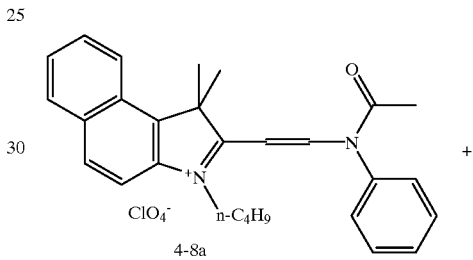

4-8a

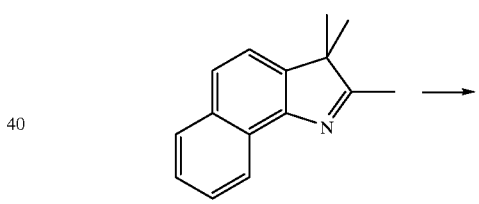

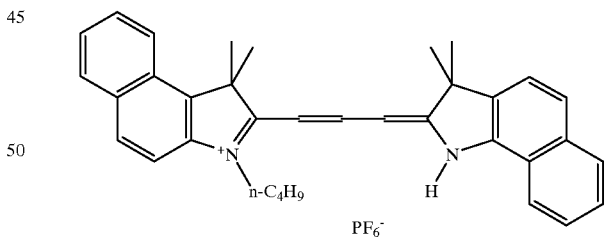

In 30 mL of ethanol were placed 4.99 g of the known compound (4–8a) and 2.31 g of trimethylbenzoindolenine, and the mixture was stirred at 80° C. for 6 hrs. After the reaction was complete, the reaction mixture was cooled to room temperature. Subsequently, 3.26 g of ammonium hexafluorophosphate was added, the reaction mixture was further stirred for 2 hrs. The precipitated crystalline dye was collected by filtration and dried under reduced pressure to obtain 5.39 g of the desired compound (yield: 85.4%).

The absorption spectrum and optical data are set forth in Table 1.

101

[Synthesis of Cyanine Dye Compound No. VI-46]

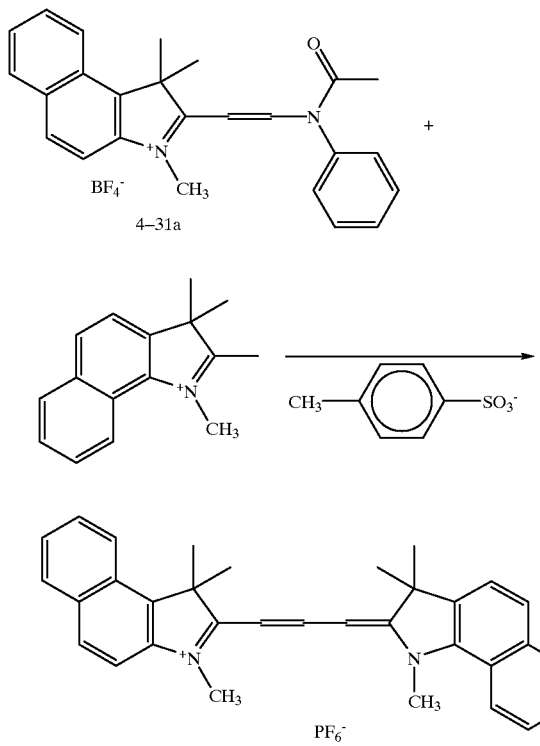

In 30 mL of ethanol were placed 4.56 g of the known compound (4–31a) and 3.96 g of 1,2,3,3'-trimethylbenz-oindolenine citrate, and the mixture was stirred at 80° C. for 6 hrs. After the reaction was complete, the reaction mixture was cooled to room temperature. Subsequently, 3.26 g of ammonium hexafluorophosphate was added, the reaction mixture was further stirred for 2 hrs. The precipitated crystalline dye was collected by filtration and dried under reduced pressure to obtain 5.75 g of the desired compound (yield: 95.5%).

The absorption spectrum and optical data are set forth in Table 1.

102

[Synthesis of Cyanine Dye Compound No. VI-52]

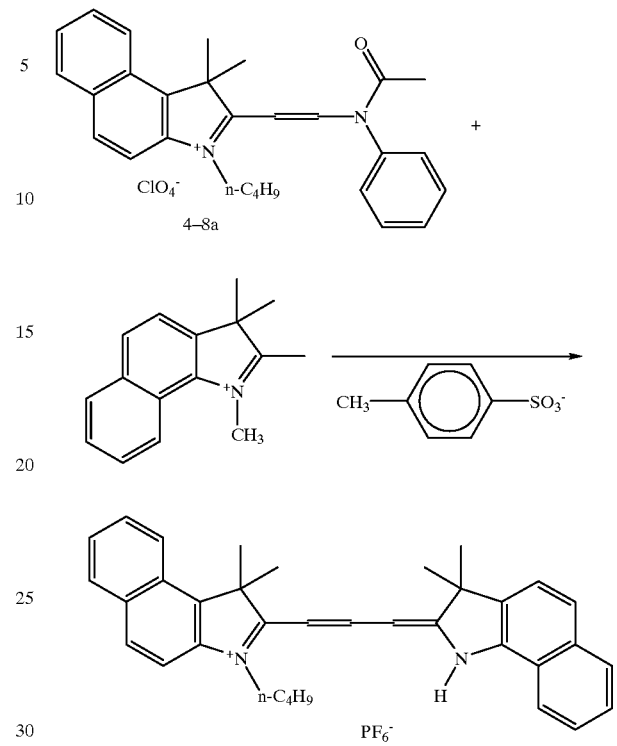

In 30 mL of ethanol were placed 4.99 g of the known compound (4–8a) and 3.96 g of 1,2,3,3'-tetramethylbenz-oindolenine citrate, and the mixture was stirred at 80° C. for 6 hrs. After the reaction was complete, the reaction mixture was cooled to room temperature. Subsequently, 3.26 g of ammonium hexafluorophosphate was added, the reaction mixture was further stirred for 2 hrs. The precipitated crystalline dye was collected by filtration and dried under reduced pressure to obtain 5.27 g of the desired compound (yield: 81.8%)

The absorption spectrum and optical data are set forth in Table 1.

[Synthesis of Cyanine Dye Compound No. VIII-12]

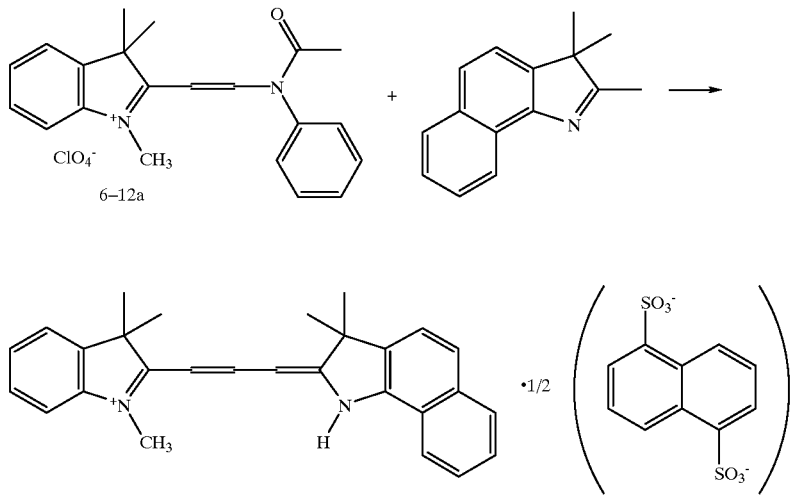

In 30 mL of methanol were placed 4.01 g of the known compound (6–12a) and 2.52 g of trimethylbenzoindolenine, and the mixture was stirred at 60° C. for 6 hrs. After the reaction was complete, the reaction mixture was cooled to room temperature. Subsequently, 5.4 g of 1,4-dinaphthalenesulfonic acid was added, the reaction mixture was further stirred for 2 hrs. The precipitated crystalline dye was collected by filtration and dried under reduced pressure to obtain 4.50 g of the desired compound (yield: 83.8%)

The absorption spectrum and optical data are set forth in Table 1.

[Synthesis of Cyanine Dye Compound No. VI-30]

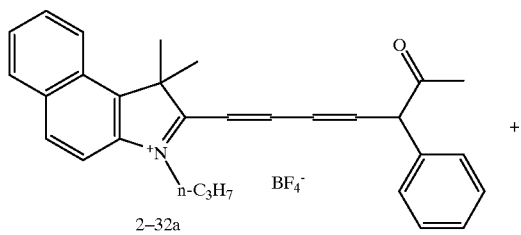

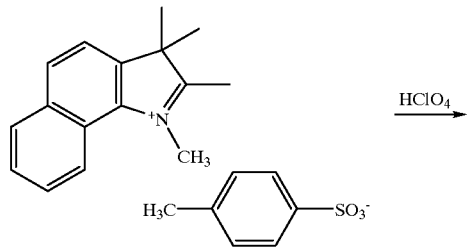

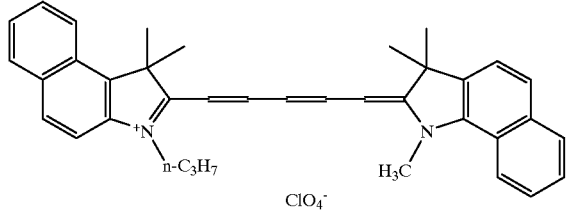

In 40 mL of methanol were placed 10.52 g of the known compound (2–32a) and 8.0 g of tetramethylbenzoindolenine p-toluenesulfonate. To the mixture was dropwise added 6 mL of triethylamine at room temperature. The mixture was then stirred for 2 hrs., at room temperature. Subsequently, 7.2 mL of aqueous 70% perchloric acid was added, and the mixture was stirred for one hour. The precipitated crystalline dye was collected by filtration and dried under reduced pressure to obtain 6.84 g of the desired compound (yield: 56.0%)

The absorption spectrum and optical data are set forth in Table 1.

[Synthesis of Cyanine Dye Compound No. VI-66]

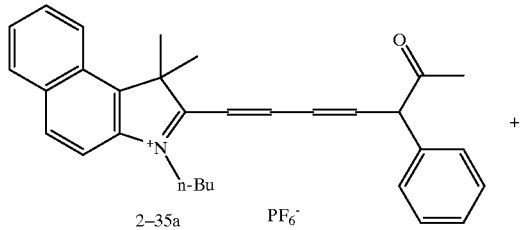

-continued

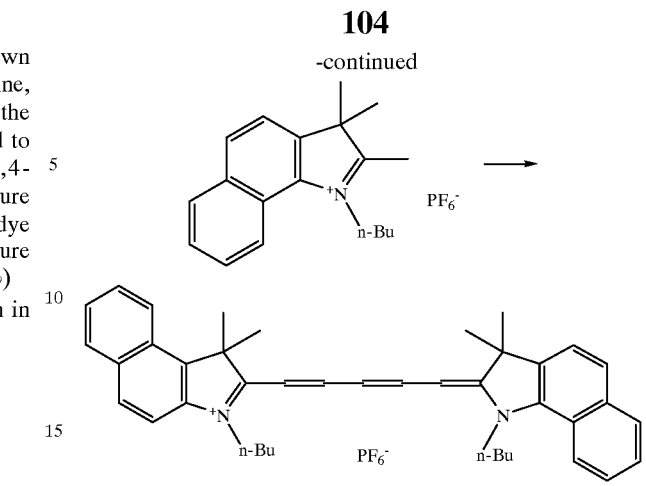

In methanol were placed 5.99 g of the known compound (2–35a) and 4.11 g of 1-n-butyl-2,3,3-trimethylbenzoindolenine. The mixture was then stirred for 2 hrs., at room temperature. The precipitated crystalline dye was collected by filtration and dried under reduced pressure to obtain 6.30 g of the desired compound (yield: 90.5%)

The absorption spectrum and optical data are set forth in Table 1.

[Synthesis of Cyanine Dye Compound No. VI-15]

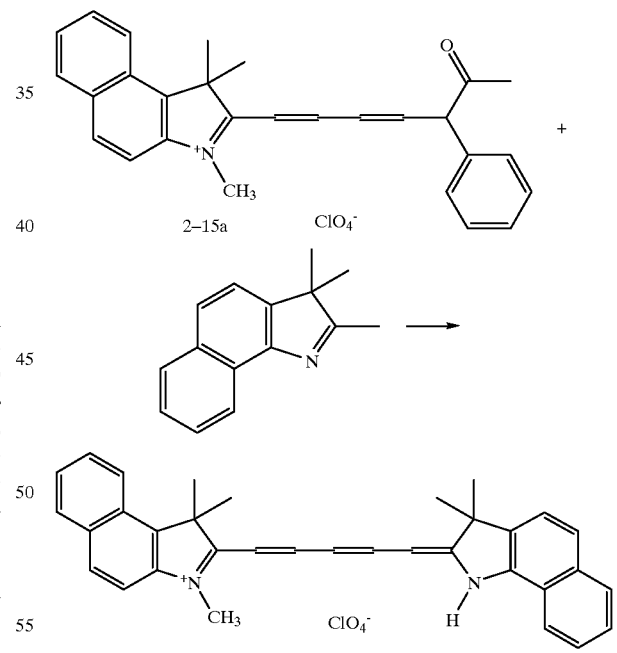

In 30 mL of methanol were placed 4.82 g of the known compound (2–15a) and 2.10 g of trimethylbenzoindolenine. The mixture was then stirred at 40° C. for 6 hrs., and cooled to room temperature. The precipitated crystalline dye was collected by filtration and dried under reduced pressure to obtain 5.20 g of the desired compound (yield: 94.9%)

The absorption spectrum and optical data are set forth in Table 1.

[Synthesis of Cyanine Dye Compound No. VI-273]

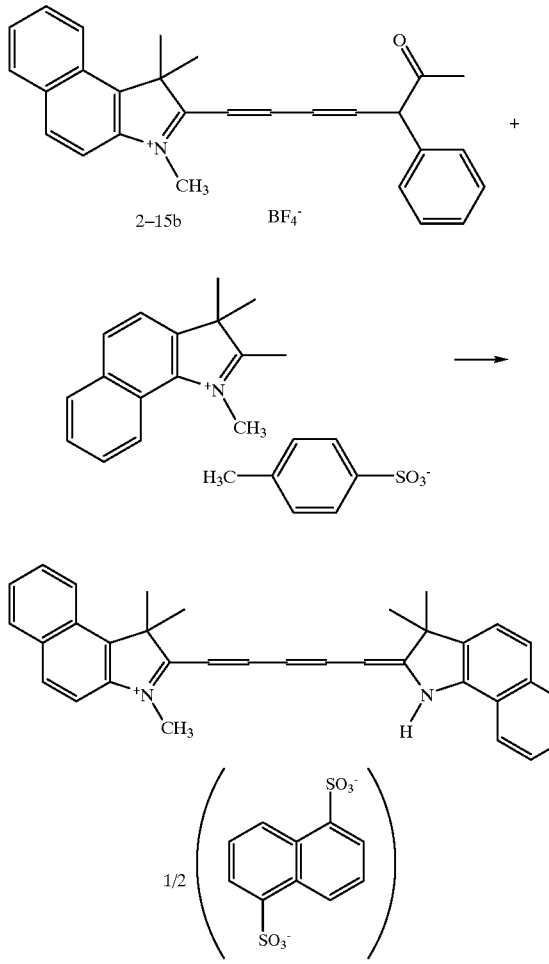

In 30 mL of methanol were placed 4.82 g of the known compound (2–15b) and 3.96 g of 1,2,3,3-tetramethylbenzoindolenine. The mixture was then stirred for 6 hrs., at room temperature. A solution of 5.4 g of 1,5-naphthal-enesulfonic acid in 20 mL of methanol was added, an the mixture was stirred for 2 hrs. The precipitated crystalline dye was collected by filtration and dried under reduced pressure to obtain 5.91 g of the desired compound (yield: 94.3%)

The absorption spectrum and optical data are set forth in Table 1.

[Synthesis of Cyanine Dye Compound No. VI-272]

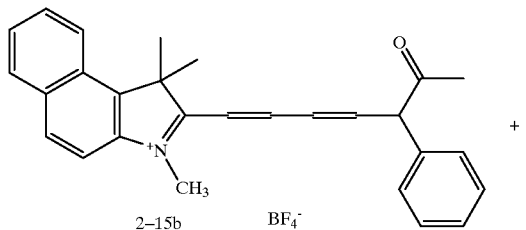

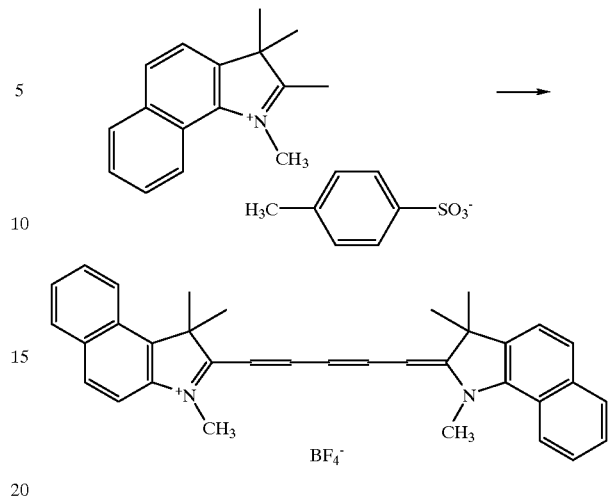

In methanol were placed 4.82 g of the known compound (2–15b) and 3.96 g of 1,2,3,3-tetramethylbenzoindolenine. The mixture was then stirred for 6 hrs., at room temperature. A solution of 2.1 mL of aqueous 42% borofluoric acid, and the mixture was stirred for 2 hrs., at room temperature. The precipitated crystalline dye was collected by filtration and dried under reduced pressure to obtain 4.96 g of the desired compound (yield: 89.6%)

The absorption spectrum and optical data are set forth in Table 1.

[Synthesis of Cyanine Dye Compound No. VI-271]

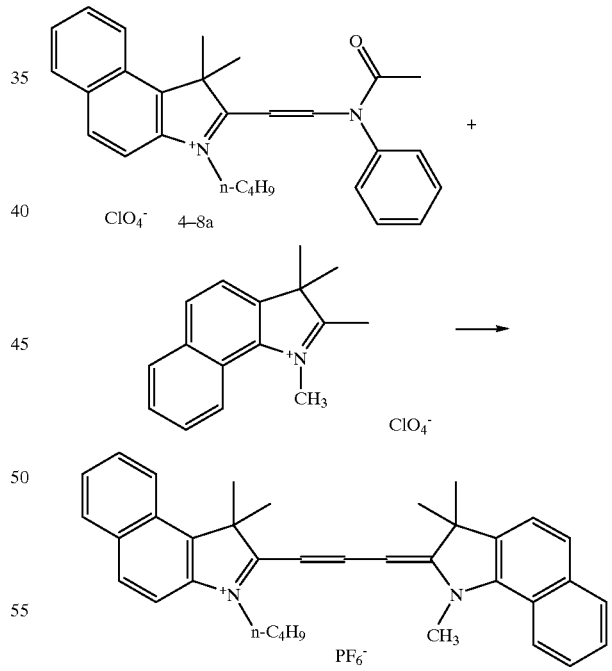

In 30 mL of ethanol were placed 4.99 g of the known compound (4–8a) and 3.68 g of 1-n-butyl-1,2,3,3'-tetramethylbenzoindolenine. The mixture was then stirred for 6 hrs., at room temperature. After the reaction was complete, the precipitated crystalline dye was collected by filtration and dried under reduced pressure to obtain 4.82 g of the desired compound (yield: 75.2%)

The absorption spectrum and optical data are set forth in Table 1.

[Synthesis of Comparative Cyanine Dye Compound 1]

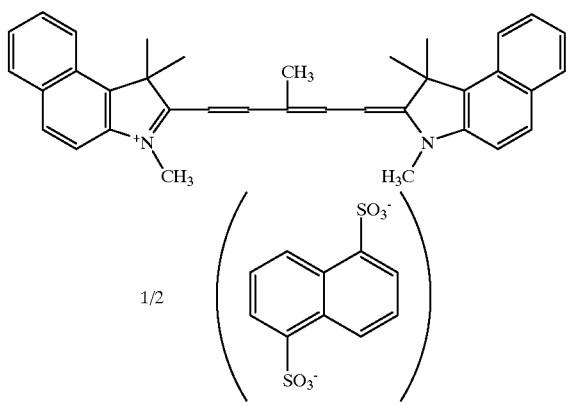

The comparative cyanine dye compound 1 was prepared in the manner described in Japanese Patent Provisional Publication H10-226170.

[Synthesis Of Comparative Cyanine Dye Compound 2]

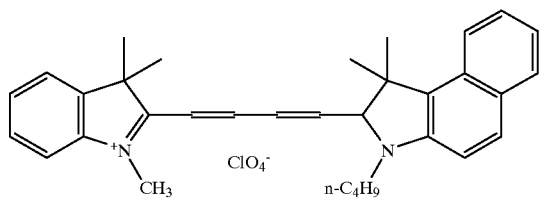

The comparative cyanine dye compound 2 was prepared in the manner described in Japanese Patent Provisional Publication H4-28588.

TABLE 1

| Compound No. | $\lambda_{max}$ (nm) | Molecular Absorption Coefficient | Refractive Index (n) | Extinction Coefficient (k) |
|---|---|---|---|---|
| Comp. 1 | 670.4 (703.8) | $1.69 \times 10^5$ | 2.53853 (780 nm) | 0.0371 (780 nm) |
| Invention 2-32 | 678.8 (720.1) | $1.78 \times 10^5$ | 2.597 (780 nm) | 0.0971 (780 nm) |
| Invention 4-8 | 680.6 (731.6) | $1.78 \times 10^5$ | 2.840 (780 nm) | 0.1767 (780 nm) |
| Invention 4-30 | 683.5 (731.6) | $1.97 \times 10^5$ | 3.035 (780 nm) | 0.2698 (780 nm) |
| Invention 4-273 | 683.4 | $1.98 \times 10^5$ | — | — |
| Invention 4-272 | 683.3 | $1.89 \times 10^5$ | — | — |
| Invention 4-28 | 680.9 (724.9) | $1.78 \times 10^5$ | 2.851 | 0.1931 |
| Invention 4-66 | 685.4 | $2.01 \times 10^5$ | — | — |
| Invention 4-15 | 680.9 (723.3) | $1.75 \times 10^5$ | 2.746 | 0.1778 |

| Compound No. | $\lambda_{max}$ (nm) | Molecular Absorption Coefficient | Refractive Index (n) ($\lambda$) | Extinction Coefficient (k) |
|---|---|---|---|---|
| Comp. 2 4-8 | 566.0 (593.4) | $1.12 \times 10^5$ | 2.4280 (635 nm) 2.2113 (655 nm) 2.1782 (660 nm) | 0.0283 0.01218 0.01141 |
| Invention 3-5 | 600.8 (632.4) | $9.38 \times 10^4$ | 2.382 (635 nm) 2.780 (655 nm) 2.701 (660 nm) | 1.0625 0.3884 0.2477 |

TABLE 1-continued

| Compound No. | $\lambda_{max}$ (nm) | Molecular Absorption Coefficient | Refractive Index (n) | Extinction Coefficient (k) |
|---|---|---|---|---|
| Invention 4-8 | 590.8 (616.4) | $5.82 \times 10^4$ | 2.407 (635 nm) 2.218 (655 nm) 2.160 (660 nm) | 0.4176 0.0624 0.0373 |
| Invention 6-12 | 567.7 (590.2) | $1.98 \times 10^4$ | 1.943 (635 nm) 1.853 (655 nm) 1.840 (660 nm) | 0.0489 0.0199 0.0184 |
| Invention 4-31 | 599.5 (615.4) | $9.61 \times 10^4$ | 2.595 (635 nm) 2.383 (655 nm) 2.312 (660 nm) | 0.5803 0.0865 0.0549 |
| Invention 4-33 | 590.6 (618.6) | $9.39 \times 10^4$ | 2.642 (635 nm) 2.492 (655 nm) 2.411 (660 nm) | 0.7259 0.1295 0.0857 |
| Invention 4-46 | 591.0 (623.1) | $1.02 \times 10^5$ | 2.659 (635 nm) 2.709 (655 nm) 2.580 (660 nm) | 0.9676 0.1377 0.0659 |
| Invention 4-52 | 593.1 (620.0) | $1.06 \times 10^5$ | 2.774 (635 nm) 2.597 (655 nm) 2.489 (660 nm) | 0.8504 0.0921 0.0464 |
| Invention 4-271 | 593.3 (623.1) | $1.08 \times 10^5$ | 2.750 (635 nm) 2.702 (655 nm) 2.582 (660 nm) | 0.9823 0.1472 0.0820 |

In the Spectrum data ($\lambda_{max}$), the upper numeral indicates a value measured in methanol, and the lower numeral indicates a value measured on a thin film formed on a transparent glass disc by a spin-coating procedure.

It is understood that the new cyanine dye compounds of the invention shows an absorption maximum at a wavelength longer than that given by the comparative cyanine dye compounds, and further shows a high value in one or both of the refractive index (n) and the extinction coefficient (k). This means that the cyanine dye compounds of the invention gives excellent optical characteristics (particularly, sensitivity to laser beam in a specific range).

The optical information recording medium of the invention comprises a substrate, a recording layer provided on the substrate, and, preferably, a light-reflecting layer provided on the recording layer, wherein the recording layer contains a cyanine dye compound or a cyanine dye complex.

The optical information recording medium of the invention can be prepared, for example, by the following process.

The substrate (support) which is transparent can be made of any of materials known as the materials for the producing the substrate of the optical information recording medium. Examples of the materials include glass, polycarbonate, acrylic resins such as polymethyl methacrylate, vinyl chloride resins such as polyvinyl chloride and vinyl chloride copolymer, epoxy resins, amorphous polyolefins, and polyesters. These materials can be employed in combination, if desired. These materials are molded to give a film or a rigid plate. Polycarbonate is most preferred from the viewpoints of anti-humidity and dimensional stability.

The substrate may have an undercoating layer on its surface on the recording layer side, so as to enhance surface smoothness and adhesion and to keep the dye recording layer from deterioration. Examples of the material for the undercoating layer include polymers such as polymethyl methacrylate, acrylate/methacrylate copolymer, styrene/maleic anhydride copolymer, polyvinyl alcohol, N-methylolacrylamide, styrene/vinyltoluene copolymer, chloro-sulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and surface treating agents such as a silane-coupling agent.

The undercoating layer can be formed by applying a coating solution onto the surface of the substrate by the known coating methods such as spin-coat, dip-coat, and extrusion-coat. The undercoating layer generally has a thickness of 0.005 to 20 μm, preferably 0.01 to 10 μm.

On the surface of the substrate or on the undercoating layer, a groove for tracking or giving address signals is preferably formed. The groove is preferably formed directly on the surface of the substrate when the substrate is molded from polymer material by injection or extrusion.

Alternatively, the groove can be provided on the surface of the substrate by placing a pregroove layer. The pregroove layer can be produced from a mixture of a monomer such as monoester, diester, triester, or tetraester of acrylic acid, or its oligomer, and a light-polymerization reaction initiator. The pregroove layer can be produced by the steps of coating a mixture of the polymerization initiator and the monomer such as the above-mentioned acrylic ester on a precisely produced stamper, placing on the coated layer a substrate, and irradiating the coated layer with ultra-violet rays through the stamper or substrate, so as to cure the coated layer as well as to combine the cured layer and the substrate. The substrate to which the cured coated layer is attached is separated from the stamper, to give the desired substrate equipped with the pregroove layer. The thickness of the pregroove layer generally is in the range of 0.05 to 100 μm, preferably in the range of 0.1 to 50 μm.

The pregroove formed on the substrate preferably has a depth in the range of 300 to 2,000 angstroms and a half-width of 0.2 to 0.9 μm. The depth of 1,500 to 2,000 angstroms of the pregroove is preferably adopted because such pregroove can enhance the sensitivity without decreasing the light-reflection on the substrate. The optical disc having a recording layer coated on the deep pre-groove and a light-reflection layer shows a high sensitivity, and hence is employable even in a recording system using a laser light of low laser power. This means that a semiconductor laser of a low output power can be employed, and the life of semiconductor laser can be prolonged.

On the substrate, the recording dye layer is placed.

The recording layer can be formed on the substrate (support) by coating a solution of a cyanine dye or a cyanine dye complex, and if desired, an anti-fading agent and a binder in an organic solvent and drying the coated layer used compound in the solvent. The coating solution can further contain auxiliary additives such as an oxidation inhibitor, a UV absorber, a plasticizer, and a lubricant The coating solution generally has a concentration of 0.01 to 10 wt. % (solid content), preferably 0.1 to 5 wt. %.

The coating can be performed by the known methods such as spray coat, spin coat, dip coat, roller coat, blade coat, doctor roller coat and screen print.

The recording layer can be a single layer or can comprise plural layers. The thickness of the recording layer generally is in the range of 20 to 500 nm, preferably 50 to 300 nm. The recording layer can be provided on both surfaces of the substrate.

On the recording layer, the light-reflecting layer is placed so as to enhance the light-reflection in the course of reproduction of information.

The light-reflecting material to be used for the formation of the light-reflecting layer should show a high reflection to the laser light. Examples of the light-reflecting materials include metals and sub-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi. Stainless steel film is also employable. Preferred light-reflecting materials are Cr, Ni, Pt, Cu, Ag, Au, Al and stainless steel film. These materials can be employed singly, in combination, or in the form of alloy. Particularly preferred is Au.

The light-reflecting layer can be formed on the recording layer by vacuum deposition, sputtering or ion-plating. The thickness of the light-reflecting layer generally is in the range of 10 to 800 nm, preferably 20 to 500 nm, further preferably 50 to 300 nm.

On the light-reflecting layer, a protective layer can be placed so as to protect the recording layer from chemical deterioration or physical shock. The protective layer can be also placed on the substrate on the face not having the recording layer so as to enhance the scratch resistance and the moisture resistance of the medium.

The protective layer can be formed of inorganic materials such as $SiO_2$, $SiO_2$, $MgF_2$, $SnO_2$, $Si_3N_4$; or organic materials such as thermo-plastic resins, thermo-setting resins, and UV curable resins.

The protective layer can be formed on the light-reflecting layer and/or the substrate by laminating a film of plastic material using an adhesive. The inorganic material can be also placed on the light-reflecting layer and/or the substrate by vacuum deposition or sputtering. Otherwise, the organic polymer material can be coated in the form of a solution containing the polymer material and dried to give the protective layer. The UV curable resin is dissolved in a solvent and coated on the light-reflecting layer and/or the substrate, and cured by applying ultra-violet rays to the coated layer. The coating layer can contain various additives such as an anti-static agent, an oxidation inhibitor, and a ultra-violet absorber. The protective layer generally has a thickness of 0.1 to 100 μm.

The information recording medium of the invention can comprise one substrate having one or two recording layers or two substrates each of which has one recording layer and combined to give a known air sandwich structure.

The information recording medium of the invention shows high light-resistance as well as high light-reflection, and hence the reproduction of the recorded information can be accomplished by means of a commercially available CD player or DVD player.

The information recording can be carried out in the following manner using the recording medium of the invention.

The information recording medium is rotated at a predetermined constant line rate (1.2 to 14 m/sec, in the case of CD format) or a predetermined constant angle rate. On the rotated medium, a recording light source such as a semiconductor laser beam is applied through the transparent substrate. By the application of the laser beam, pits are formed in the recording layer. The pit is assumed to be produced by local vacancy of the recording layer, deformation of the recording layer and/or the substrate, change of the physical or chemical characteristics of the recording layer. The light source preferably is a semiconductor laser having an oscillation frequency in the range of 500 to 850 nm. The preferred beam wavelength is in the range of 500 to 800 nm. In the case of the CD-R type recording medium, the laser beam generally has a wavelength of 770 to 790 nm, while in the case of DVD-R type recording medium, the laser beam generally has a wavelength of approx 655 nm.

The reproduction of the recorded information can be accomplished by applying a semiconductor laser beam on the medium rotated at the same rate as that employed in the recording procedure. The light-reflection is then detected from the substrate side.

The present invention is further described by the following non-restrictive working examples.

EXAMPLE 1

The cyanine dye compound (II-1) of the invention was dissolved in 2,2,3,3-tetrafluoropropanol to give a coating solution for the preparation of recording layer. The solution contained 1.5 wt. % of the dye compound. The solution was coated on an injection molded polycarbonate substrate (diameter: 120 mm, thickness: 1.2 mm) having a spirally formed pre-groove (track pitch, 1.6 μm, groove width: 0.4 μm, groove depth: 0.17 μm) by spin-coating, to produce a recording layer. The produced recording layer had a thickness (in the pre-groove) of approx. 200 nm.

On the recording layer, silver metal is deposited by sputtering, to give a light-reflecting layer having a thickness of approx. 100 nm. On the light-reflecting layer was coated a UV curing resin (SD 318, tradename available from Dainippon Ink and Chemical Industries, Co., Ltd.) and irradiated with ultra-violet rays, to give a protective layer having a thickness of 7 μm.

There was produced a recordable optical disc of the invention.

EXAMPLES 2 TO 4

The procedures of Example 1 were repeated except for replacing the cyanine dye compound (II-1) with the cyanine dye compound (II-5), (II-7) or (II-9), to produce a recordable optical disc of the invention.

COMPARISON EXAMPLES 1 TO 2

The procedures of Example 1 were repeated except that the cyanine dye compound (II-1) was replaced with a combination of the following anti-fading agent and the following comparative cyanine dye compound (C) or (D), to produce a comparative recordable optical disc. The anti-fading agent was employed in an amount of 10 wt. % of the amount of the dye compound. The coating solution contained the dye compound in an amount of 1.5 wt. %.

Comparative cyanine dye compound (C)

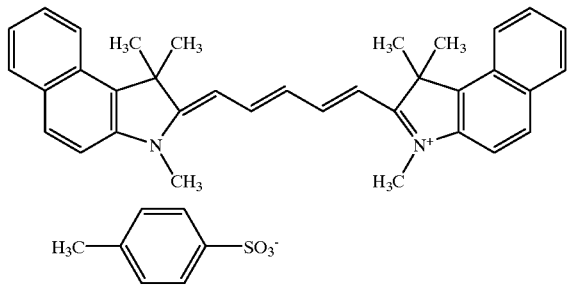

Comparative cyanine dye compound (D)

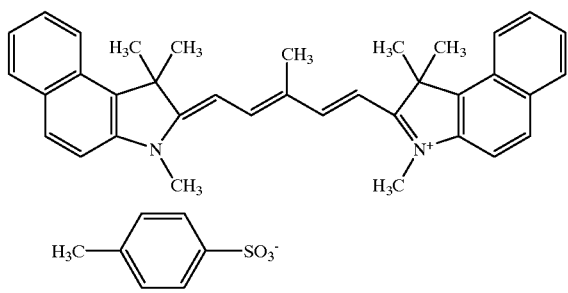

Anti-fading agent

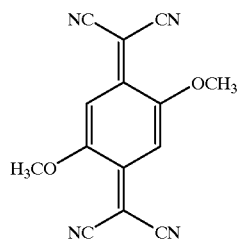

[Evaluation of Recordable Optical Disc]

(1) Modulation

On each of the recordable optical discs of Examples 1 to 4 and Comparison Examples 1 and 2, EFM signals of 3T and 11T were recorded using a semiconductor laser beam (wavelength 780 nm). The recording procedure was carried out by tracking the pregroove at a constant rate of 1.4 m/sec, and varying the recording laser power from 4 to 9 mW. The recorded signal was reproduced at a laser power of 0.5 mW, to determine a modulation (%) at 3T and 11T at an optimum recording power (sensitivity).

(2) Light resistance

The optical disc recorded in the above-mentioned manner was exposed to radiation (170,000 lux) from Xe lamp for 48 hours and 120 hours. Thereafter, the modulation upon exposure to the radiation was measured in the same manner. Further, the coloring after exposure to the radiation was observed, to check the degree of fading of the recording dye layer, according to the following ranks:
AA: No fading is observed.
BB: Slight fading (acceptable) is observed.
CC: Apparent fading is observed.
DD: Color of the recording dye layer is diminished.

The results are set forth in Table 2.

TABLE 2

| Cyanine Dye Compound | Anti-fading Agent | Modulation (%) | | Light-resistance | |
|---|---|---|---|---|---|
| | | 3 T | 11 T | 48 hrs. | 120 hrs. |
| Example 1 (II-1) | None | 45 | 77 | AA | AA |
| Example 2 (II-5) | None | 42 | 75 | AA | AA |
| Example 3 (II-7) | None | 46 | 78 | AA | AA |
| Example 4 (II-9) | None | 40 | 70 | AA | AA |
| Com. Ex. 1 (C) | Used | 38 | 68 | AA | BB |
| Com. Ex. 2 (D) | Used | 38 | 69 | AA | CC |

The results shown in Table 2 indicate that a recordable optical disc using the cyanine dye/TCNQ derivative complex of the invention shows recording-reproducing characteristics and light-resistance which is superior to those of recordable optical discs employing known combination of a cyanine and TCNQ anti-fading agent.

EXAMPLE 5

Use for DVD-R 2.0 g of the cyanine dye compound (II-70) of the invention was dissolved in 100 mL of 2,2,3,3-tetrafluoropropanol to give a coating solution for the preparation of recording layer. The solution was coated on an injection molded polycarbonate substrate (diameter: 120 mm, thickness: 0.6 mm) having a spirally formed pre-groove (track pitch: 0.74 μm, groove width: 290 nm, groove depth: 150 nm by spin-coating, to produce a recording layer. The produced recording layer had a thickness (in the pre-groove) of approx. 80 nm.

On the recording layer, silver metal is deposited by sputtering, to give a light-reflecting layer having a thickness of approx. 150 nm. On the light-reflecting layer was coated a UV curing resin (SD 318, tradename available from Dainippon Ink and Chemical Industries, Co., Ltd.) and irradiated with ultra-violet rays, to give a protective layer having a thickness of 7 μm.

There was produced a recordable optical disc A (total thickness: 0.6 mm).

The above-mentioned procedures were repeated except for forming a recording dye layer on the substrate, to give a dummy disc B. The optical disc A and the dummy disc B were combined by the following procedures:

On the protective layer of each disc, a slow curing cation-polymerizable adhesive (SK 7000, tradename, available from Sony Chemical Co., Ltd.) was coated by screen printing (mesh size: 300 mesh). The coated layer on each disc was exposed to ultra-violet radiation using a metal halide lamp. Just after the exposure, the disc A and disc B were combined under the condition that the protective layer of one disc was brought into contact with the protective layer of another disc, and the combined structure was pressed from both sides. The adhesive cured after approx. 5 minutes, to give a recordable optical disc (thickness: 1.2 mm) of the invention in the form of DVD-R.

EXAMPLES 6 TO 10

The procedures of Example 5 were repeated except for replacing the cyanine dye compound (II-70) with the cyanine dye compound (II-97), (II-112), (II-279), (II-289), or (II-323), to produce a recordable optical disc of the invention for DVD-R.

COMPARISON EXAMPLES 3 TO 5

The procedures of Example 1 were repeated except that the cyanine dye compound (II-70) was replaced with a combination of the following anti-fading agent and the following comparative cyanine dye compound (I), (J), or (K), to produce a comparative recordable optical disc.

Comparative cyanine dye compound (I)

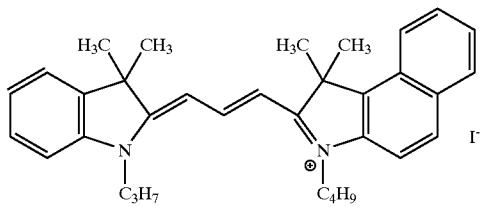

Comparative cyanine dye compound (J)

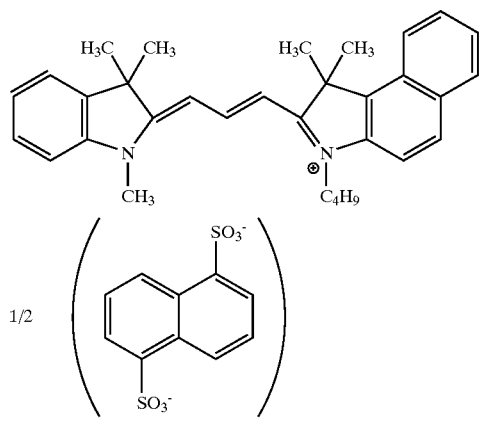

Comparative cyanine dye compound (K)

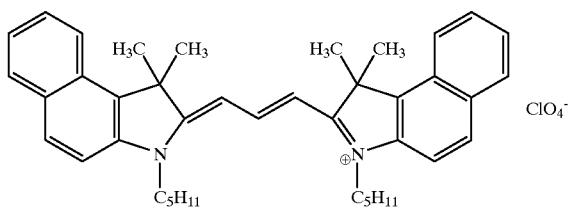

Evaluation of DVD-R (1) Modulation

The evaluation was carried out by means of DDU testing apparatus (available from Palstick Corporation). On each of the recordable optical discs of Examples 5 to 10 and Comparison Examples 3 to 5, EFM signals of 3T and 14T were recorded using a laser beam (wavelength: 655 nm, pick-up: NA 0.6). The recording procedure was carried out at a constant rate of 3.49 m/sec, and a recording laser power of 9 mW. The recorded signal was reproduced at a laser power of 0.5 mW using a laser beam of the same wavelength, to determine a modulation (%) at 3T and 14T and jitter.

(2) Light Resistance

The optical disc recorded in the above-mentioned manner was exposed to radiation (170,000 lux) from Xe lamp for 48 hours. Thereafter, the modulation upon exposure to the radiation was measured in the same manner.

The results are set forth in Table 3.

TABLE 3

| Example No. | Recording-Reproducing Characteristics | | | | | |
|---|---|---|---|---|---|---|
| (cyanine | (before exposure) | | | (after exposure) | | |
| dye) | 3 T | 14 T | Jitter | 3 T | 14 T | Jitter |
| Example 5 (II-70) | 20 | 59 | 8.0 | 22 | 64 | 8.1 |
| Example 6 (II-97) | 25 | 65 | 7.4 | 25 | 68 | 7.7 |
| Example 7 (II-112) | 24 | 62 | 7.8 | 25 | 63 | 7.9 |

TABLE 3-continued

| Example No. | Recording-Reproducing Characteristics | | | | | |
|---|---|---|---|---|---|---|
| (cyanine | (before exposure) | | | (after exposure) | | |
| dye) | 3 T | 14 T | Jitter | 3 T | 14 T | Jitter |
| Example 8 (II-279) | 20 | 55 | 8.1 | 24 | 62 | 9.1 |
| Example 9 (II-289) | 20 | 55 | 8.2 | 24 | 64 | 9.3 |
| Example 10 (II-323) | 15 | 48 | 10.8 | 19 | 55 | 11.2 |
| Com. Ex. 3 (Comp. I) | 10 | 32 | --- | -- | -- | --- |
| Com. Ex. 4 (Comp. J) | 10 | 25 | --- | -- | -- | --- |
| Com. Ex. 5 (Comp. K) | 20 | 62 | 9.2 | 27 | 89 | >20 |

Remarks: "--" and "---" mean that the data cannot be measured.

The results of Table 3 indicate that an optical disc for DVD-R according to the invention gives advantageous high modulations and low jitter. This means that the optical disc of the invention show good recording-reproducing characteristics. Moreover, the optical disc of the invention keeps a low jitter even after exposure to Xe lamp, and this means that the optical disc of the invention has satisfactorily high light-resistance.

What is claimed is:

1. A complex comprising a dye cation and an anionic tetracyanoquinodimethane derivative having the following formula (I):

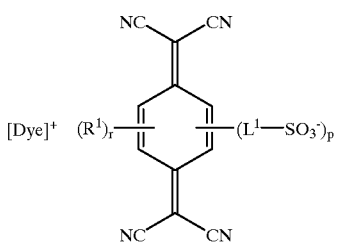

in which [Dye]$^+$ represents a dye cation, $L^1$ is a linking group containing at least one methylene group, $R^1$ is a substituent group, p is an integer of 1 to 4, and r is an integer of 0 to 3 under the condition of 1<p+r<4, provided that a cationic charge of the dye cation and an anionic charge of the anionic tetracyanoquinodimethane derivative are adjusted to make the complex neutral.

2. The complex of claim 1, wherein the group of —$L^1$—$SO_3$— in the formula (I) is represented by the formula of —O—$R^2$—O—$L^2$—$SO_3$— or —O—$R^2$—$OSO_3$— in which $R^2$ is an alkylene group which has one or more substituent groups or has no substituent groups, and $L^2$ is a divalent linking group.

3. The complex of claim 2, wherein the alkylene group of $R^2$ is a linear or cyclic alkylene group containing 1 to 20 carbon atoms, and the substituent group of $R^2$ is selected from those consisting of a linear, branched chain or cyclic alkyl group containing 1 to 20 carbon atoms, an aryl group containing 6 to 18 carbon atoms which has no substituent group or which has one or more substituent groups selected from the group consisting of a halogen atom, an alkyl group having 1 to 6 carbon atoms, and an alkoxy group having 1 to 6 carbon atoms, an aralkyl group containing 7 to 19 carbon atoms which has no substituent group or which has one or more substituent groups selected from the group consisting of a halogen atom, an alkyl group having 1 to 6 carbon atoms and an alkoxy group having 1 to 6 carbon atoms, an alkenyl group containing 2 to 20 carbon atoms, an alkynyl group containing 2 to 20 carbon atoms, a halogen atom, a cyano group, a hydroxyl group, a carboxy group, a sulfo group, an acyl group having 2 to 12 carbon atoms, an alkoxy group having 1 to 12 carbon atoms, an aryloxy group having 6 to 14 carbon atoms, an alkylthio group having 1 to 12 carbon atoms, an arylthio group having 6 to 14 carbon atoms, an alkylsulfonyl group having 1 to 6 carbon atoms, an arylsufonyl group having 6 to 14 carbon atoms, a carbamoyl group having 1 to 10 carbon atoms, an amide group having 1 to 10 carbon atoms, an imide group having 2 to 12 carbon atoms, an acyloxy group having 2 to 10 carbon atoms, an alkoxycarbonyl group having 2 to 10 carbon atoms, and a heterocyclic group having 3 to 12 carbon atoms.

4. The complex of claim 2, wherein —$L^2$— is represented by —CO—G— in which G is a divalent group selected from the group consisting of an alkylene group, an arylene group, an alkenylene group, a alkynylene group, and a combination thereof.

5. The complex of claim 4, wherein the alkylene group contains 1 to 4 carbon atoms, the arylene group contains 6 to 10 carbon atoms, an alkenylene group contains 2 to 4 carbon atoms, and an alkynylene group contains 2 to 4 carbon atoms.

6. The complex of claim 1, wherein the substituent group of $R^1$ is selected from those consisting of a linear, branched chain or cyclic alkyl group containing 1 to 20 carbon atoms, an aryl group containing 6 to 18 carbon atoms which has no substituent group or which has one or more substituent groups selected from the group consisting of a halogen atom, an alkyl group hang 1 to 6 carbon atoms, and an alkoxy group having 1 to 6 carbon atoms, an aralkyl group containing 7 to 19 carbon atoms which has no substituent group or which has one or more substituent groups selected from the group consisting of a halogen atom, an alkyl group having 1 to 6 carbon atoms, and an alkoxy group having 1 to 6 carbon atoms, an alkenyl group containing 2 to 20 carbon atoms, an alkynyl group containing 2 to 20 carbon atoms, a halogen atom, a cyano group, a hydroxyl group, a carboxy group, a sulfo group, an acyl group having 2 to 12 carbon atoms, an alkoxy group having 1 to 12 carbon atoms, an aryloxy group having 6 to 14 carbon atoms, an alkylthio group having 1 to 12 carbon atoms, an arylthio group having 6 to 14 carbon atoms, an alkylsulfonyl group having 1 to 6 carbon atoms, an arylsufonyl group having 6 to 14 carbon atoms, a carbamoyl group having 1 to 10 carbon atoms, an amide group having 1 to 10 carbon atoms, an imide group having 2 to 12 carbon atoms, an acyloxy group having 2 to 10 carbon atoms, an alkoxycarbonyl group having 2 to 10 carbon atoms, and a heterocyclic group having 3 to 12 carbon atoms.

7. The complex of claim 1, wherein p is 2, and r is 0.

8. The complex of claim 1, wherein the dye cation is a cyanine dye cation.

9. The complex of claim 8, wherein the cyanine dye cation has the following formula (II):

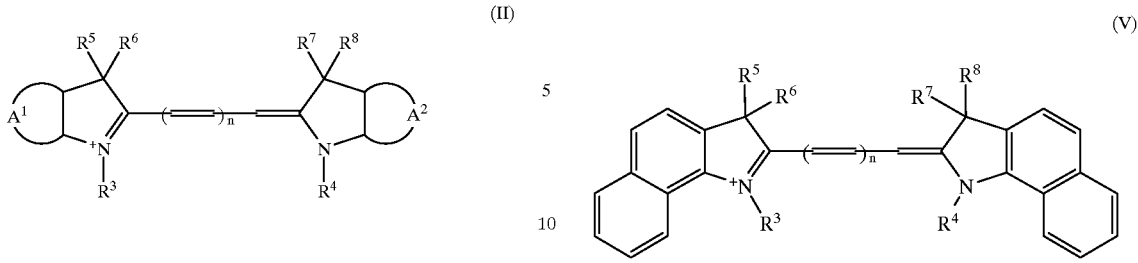

(II)

wherein each of $A^1$ and $A^2$ independently represents a benzene or naphthalene ring which has no substituent group or which has one or more substituent groups, n is an integer of 0 to 2, each of $R^3$ and $R^4$ independently represents a hydrogen atom, an alkyl group, an aralkyl group, or a heterocyclic group, and each of $R^5$, $R^6$, $R^7$ and $R^8$ independently represents an all group which has no substituent group or has one or more substituent groups, provided that the methine group has no substituent group or has one or more substituent groups.

10. The complex of claim 9, wherein the cyanine dye cation has the following formula (III):

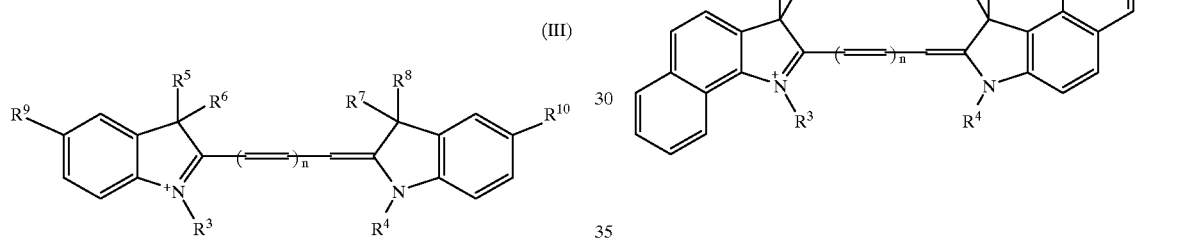

(III)

in which each of $R^3$, $R^4$, $R^5$, $R^6$, $R^7$, $R^8$, and n has the same meaning as defined in claim 9, and each of $R^9$ and $R^{10}$ independently represents a hydrogen atom, an alkyl group containing 1 to 6 carbon atoms, an alkoxy group containing 1 to 6 carbon atoms, or a halogen atom.

11. The complex of claim 9, wherein the cyanine dye cation has the following formula (IV):

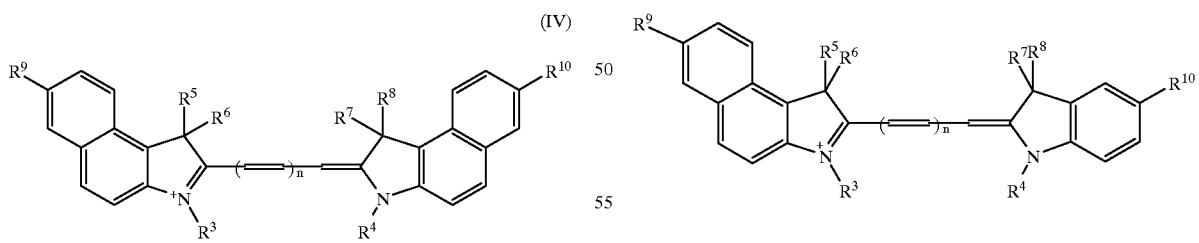

(IV)

in which each of $R^3$, $R^4$, $R^5$, $R^6$, $R^7$, $R^8$, and n has the same meaning as defined in claim 9, and each of $R^9$ and $R^{10}$ independently represents a hydrogen atom, an alkyl group containing 1 to 6 carbon atoms, an alkoxy group containing 1 to 6 carbon atoms, or a halogen atom.

12. The complex of claim 9, wherein the cyanine dye cation has the following formula (V):

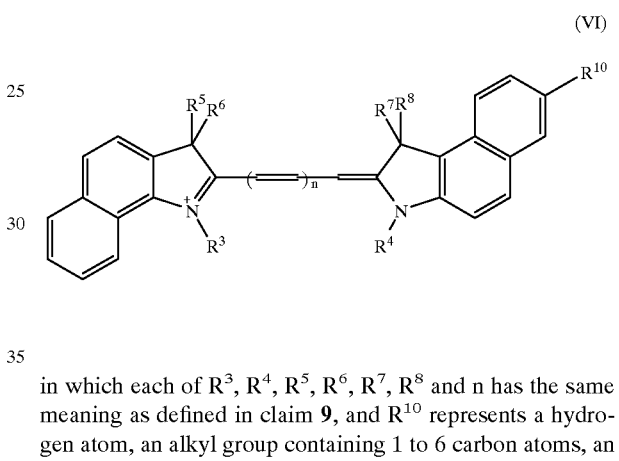

(V)

in which each of $R^3$, $R^4$, $R^5$, $R^6$, $R^7$, $R^8$, and n has the same meaning as defined in claim 9.

13. The complex of claim 9, wherein the cyanine dye cation has the following formula (VI):

(VI)

in which each of $R^3$, $R^4$, $R^5$, $R^6$, $R^7$, $R^8$ and n has the same meaning as defined in claim 9, and $R^{10}$ represents a hydrogen atom, an alkyl group containing 1 to 6 carbon atoms, an alkoxy group containing 1 to 6 carbon atoms, or a halogen atom.

14. The complex of claim 9, wherein the cyanine dye cation has the following formula (VII):

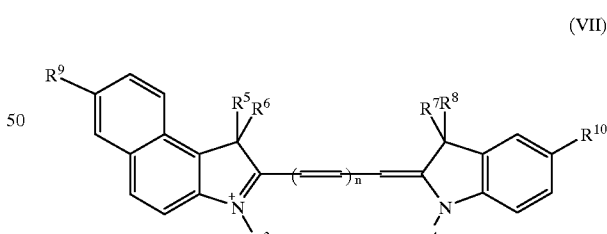

(VII)

in which each of $R^3$, $R^4$, $R^5$, $R^6$, $R^7$, $R^8$, and n has the same meaning, as defined in claim 9, and each of $R^9$ and $R^{10}$ independently represents a hydrogen atom, an alkyl group containing 1 to 6 carbon atoms, an alkoxy group containing 1 to 6 carbon atoms, or a halogen atom.

15. The complex of claim 9, wherein the cyanine dye cation has the following formula (VIII):

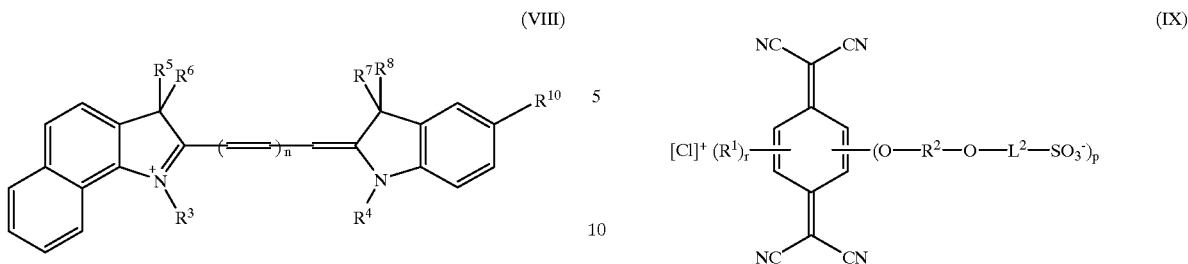

(VIII)

(IX)

in which each of $R^3$, $R^4$, $R^5$, $R^6$, $R^7$, $R^8$, and n has the same meaning as defined in claim 9, and $R^{10}$ represents a hydrogen atom, an alkyl group containing 1 to 6 carbon atoms, an alkoxy group containing 1 to 6 carbon atoms, or a halogen atom.

16. An optical information recording medium comprising a substrate and a recording layer on which information is recordable by irradiation with a laser beam, wherein said recording layer comprises a complex of a dye cation and an anionic tetracyanoquinodimethane derivative having the following formula (I):

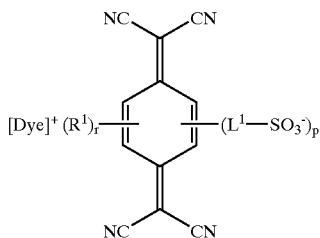

(I)

in which [Dye]+ represents a dye cation, $L^1$ is a linking group containing at least one methylene group, $R^1$ is a substituent group, p is an integer of 1 to 4, and r is an integer of 0 to 3 under the condition of 1<p+r<4, provided that a cationic charge of the dye cation and an anionic charge of the anionic tetracyanoquinodimethane derivative are adjusted to make the complex neutral.

17. The optical information recording medium of claim 16, in which a light-reflecting layer is placed on the recording layer.

18. The optical information recording medium of claim 16, in which the group of —$L^1$—$SO_3$— in the formula (I) is represented by the formula of O $R^2$—O—$L^2$—$SO_3$— or —O—$R^2$—$OSO_3$— in which $R^2$ is an alkylene group which has one or more substituent groups or has no substituent groups, and $L^2$ is a divalent linking group.

19. The optical information recording medium of claim 16, in which the dye cation is a cyanine dye cation.

20. A complex of a cation and an anionic tetracyanoquinodimethane derivative having the following formula (IX):

in which [CI]+ represents a cation, $R^1$ is a substituent group, $R^2$ is an alkylene group which has one or more substituent groups or has no substituent groups, $L^2$ is a single bond or a divalent linking group, p is an integer of 1 to 4, and r is an integer of 0 to 3 under the condition of 1<p+r<4, provided that a cationic charge of the cation and an anionic charge of the anionic tetracyanoquinodimethane derivative are adjusted to make the complex neutral.

21. The complex of claim 20, wherein the alkylene group of $R^2$ is an linear or cyclic alkylene group containing 1 to 20 carbon atoms, and the substituent group of $R^2$ is selected from the group consisting of a linear, branched chain or cyclic alkyl group containing 1 to 20 carbon atoms, an aryl group containing 6 to 18 carbon atoms which has no substituent groups or which has one or more substituent groups selected from the group consisting of a halogen atom, an alkyl group having 1 to 6 carbon atoms, and a alkoxy group having 1 to 6 carbon atoms, an aralkyl group containing 7 to 19 carbon atoms which has no substituent groups or which has one or more substituent groups selected from the group consisting of a halogen atom, an alkyl group having 1 to 6 carbon atoms, and an alkoxy group having 1 to 6 carbon atoms, an alkenyl group containing 2 to 20 carbon atoms, an alkynyl group containing 2 to 20 carbon atoms, a halogen atom, a cyano group, a hydroxyl group, a carboxy group, a sulfo group, an acyl group having 2 to 12 carbon atoms, an alkoxy group having 1 to 12 carbon atoms, an aryloxy group having 6 to 14 carbon atoms, an alkylthio group having 1 to 12 carbon atoms, an arylthio group having 6 to 14 carbon atoms, an alkylsulfonyl group having 1 to 6 carbon atoms, an arylsufonyl group having 6 to 14 carbon atoms, a carbamoyl group having 1 to 10 carbon atoms, an amide group having 1 to 10 carbon atoms, an imide group having 2 to 12 carbon atoms, an acyloxy group having 2 to 10 carbon atoms, an alkoxycarbonyl group having 2 to 10 carbon atoms, and a heterocyclic group having 3 to 12 carbon atoms.

22. The complex of claim 20, wherein the substituent group of $R^1$ is selected from the group consisting of a linear, branched chain or cyclic alkyl group containing 1 to 20 carbon atoms, an aryl group containing 6 to 18 carbon atoms which has no substituent group or which has one or more substituent groups selected from the group consisting of a halogen atom, an alkyl group having 1 to 6 carbon atoms, and an alkoxy group having 1 to 6 carbon atoms, an aralkyl group containing 7 to 19 carbon atoms which has no substituent group or which has one or more substituent groups selected from the group consisting of a halogen atom, an alkyl group having 1 to 6 carbon atoms, and an alkoxy group having 1 to 6 carbon atoms, an alkenyl group containing 2 to 20 carbon atoms, an alkynyl group containing 2 to 20 carbon atoms, a halogen atom, a cyano group, a hydroxyl group, a carboxy group, a sulfo group, an acyl group having 2 to 12 carbon atoms, an alkoxy group having 1 to 12 carbon atoms, an aryloxy group having 6 to 14 carbon atoms, an alkylthio group having 1 to 12 carbon atoms, an arylthio group having 6 to 14 carbon atoms, an alkylsulfonyl group having 1 to 6 carbon atoms, an arylsulfonyl group having 6 to 14 carbon atoms, a carbamoyl group having 1 to 10 carbon atoms, an amide group having 1 to 10 carbon atoms, an imide group having 2 to 12 carbon atoms, an acyloxy group having 2 to 10 carbon atoms, an alkoxycarbonyl group having 2 to 10 carbon atoms, and a heterocyclic group having 3 to 12 carbon atoms.

23. The complex of claim 20, wherein —$L^2$— has a formula of —CO—G— in which G is a divalent group selected from the group consisting of an alkylene group, an arylene group, an alkenylene group, a alkynylene group, and a combination thereof.

24. The complex of claim 23, wherein the alkylene group contains 1 to 4 carbon atoms, the arylene group contains 6 to 10 carbon atoms, an alkenylene group contains 2 to 4 carbon atoms, and an alkynylene group contains 2 to 4 carbon atoms.

* * * * *